US005808860A

United States Patent [19]

Ohgami et al.

[11] Patent Number: 5,808,860

[45] Date of Patent: Sep. 15, 1998

[54] PORTABLE ELECTRONIC APPARATUS WITH DETACHABLY MOUNTED KEYBOARD

[75] Inventors: Keizo Ohgami; Hajime Gushiken, both of Tokyo, Japan

[73] Assignee: Kabushiki Kaisha Toshiba, Kawasaki, Japan

[21] Appl. No.: 797,613

[22] Filed: Feb. 7, 1997

Related U.S. Application Data

[62] Division of Ser. No. 434,668, May 4, 1995, Pat. No. 5,689, 400.

[30] Foreign Application Priority Data

| | | | |
|---|---|---|---|
| May 31, 1994 | [JP] | Japan | 6-118005 |
| May 31, 1994 | [JP] | Japan | 6-118006 |
| Jun. 20, 1994 | [JP] | Japan | 6-137613 |
| Mar. 3, 1995 | [JP] | Japan | 7-044593 |

[51] Int. Cl.[6] ..... H05K 7/14; G06F 1/16

[52] U.S. Cl. ..... 361/680; 361/683

[58] Field of Search ..... 361/679–686; 364/708.1

[56] References Cited

U.S. PATENT DOCUMENTS

| | | | |
|---|---|---|---|
| 3,971,127 | 7/1976 | Giguere et al. | 29/827 |
| 4,388,672 | 6/1983 | Skill | 361/803 |
| 4,399,487 | 8/1983 | Neumann | 361/727 |
| 4,649,381 | 3/1987 | Masuda et al. | 345/102 |
| 4,680,676 | 7/1987 | Petratos et al. | 361/818 |
| 4,746,304 | 5/1988 | Asai | 439/248 |
| 4,788,658 | 11/1988 | Hanebuth | 361/684 |
| 4,978,949 | 12/1990 | Herron et al. | 345/168 |
| 5,030,128 | 7/1991 | Herron et al. | 439/372 |
| 5,031,074 | 7/1991 | Ravid | 361/683 |
| 5,036,313 | 7/1991 | Lin et al. | 361/736 |
| 5,038,308 | 8/1991 | Le et al. | 364/708.1 |
| 5,068,652 | 11/1991 | Kobayashi | 340/815.43 |
| 5,086,509 | 2/1992 | Inubushi et al. | 455/89 |
| 5,090,913 | 2/1992 | Kobayashi | 439/165 |
| 5,103,377 | 4/1992 | Kobayashi et al. | 361/681 |
| 5,136,468 | 8/1992 | Wong et al. | 362/74 |
| 5,175,671 | 12/1992 | Sasaki | 361/686 |
| 5,182,698 | 1/1993 | Kobayashi et al. | 361/686 |
| 5,192,222 | 3/1993 | Krause et al. | 439/347 |
| 5,199,888 | 4/1993 | Condra et al. | 439/142 |
| 5,224,024 | 6/1993 | Tu et al. | 361/831 |
| 5,237,486 | 8/1993 | LaPointe et al. | 361/681 |
| 5,269,598 | 12/1993 | Liu | 312/223.2 |
| 5,283,714 | 2/1994 | Tsai et al. | 361/683 |
| 5,301,132 | 4/1994 | Akahane | 364/708.1 |
| 5,324,204 | 6/1994 | Lwee | 439/64 |
| 5,328,379 | 7/1994 | Kobayashi | 439/165 |
| 5,331,506 | 7/1994 | Nakajima | 361/683 |
| 5,335,141 | 8/1994 | Hosoi | 361/680 |
| 5,336,099 | 8/1994 | Aldous et al. | 439/131 |
| 5,355,278 | 10/1994 | Hosoi et al. | 361/680 |
| 5,373,104 | 12/1994 | Brauer | 174/52.1 |
| 5,373,458 | 12/1994 | Bishay et al. | 364/708.1 |
| 5,455,746 | 10/1995 | Sato et al. | 361/816 |

*Primary Examiner*—Leo P. Picard
*Assistant Examiner*—Jayprakash N. Gandhi
*Attorney, Agent, or Firm*—Finnegan, Henderson, Farabow, Garrett & Dunner, L.L.P.

[57] ABSTRACT

A portable computer has a base unit, a first printed circuit board and a second circuit board. The base unit has a bottom wall and a connector panel which extends upward from a bottom wall. The first printed circuit board is mounted on the bottom wall, and has a first stacking connector. A second stacking connector is connected to the first stacking connector. a reinforcing plate is disposed on an upper surface of the second stacking connector. A bracket is arranged from the connector panel to the upper surface of the second stacking connector. The second circuit board is mounted on an upper surface of the bracket, and disposed above the first printed circuit board. A flexible wiring board is electrically connected to the second stacking connector and the second printed circuit board. The second printed circuit board is electrically connected to the first printed circuit board via the first and second stacking connector and the flexible wiring board.

7 Claims, 53 Drawing Sheets

PORTABLE ELECTRONIC APPARATUS WITH DETACHABLY MOUNTED KEYBOARD

This is a division of application Ser. No. 08/434,668, filed May 4, 1995 now U.S. Pat. No. 5,689,400.

BACKGROUND OF THE INVENTION

1. Field of the Invention

The present invention relates to a portable electronic apparatus such as a portable computer.

2. Description of the Related Art

A laptop, book or notebook computer is easy to carry and can be freely used, even in places where no commercial power supply is available, by using a battery pack incorporated in the computer. The computer has a a base unit for housing a keyboard and a display unit for housing a flat panel display.

The base unit stores electronic components such as a printed circuit board on which are mounted electronic parts, a floppy disk drive and a hard disk drive.

A recent portable computer has a chassis for supporting stacked printed circuit boards. This structure is disclosed in U.S. Pat. No. 5,237,486 by LaPointe et al.

But in this structure, the use of the chassis represents an increase in the number of components, the manufacturing cost and the weight of the computer. In addition, the use of the chassis creates the need for space for mounting the chassis inside of the base unit.

Also, a recent portable computer has a card insertion slot, an ejector for pushing out from the card insertion slot a card-like electrical part and a lock lever for locking the movement of the card-like electrical part. The card insertion slot is disposed in a side wall of the portable computer. This structure is disclosed in U.S. Pat. No. 5,336,099 by Aldous et al. The ejector and the lock lever are disposed adjacent to the card insertion slot. This structure is disclosed in U.S. Pat. No. 5,324,204 by Lwee. In this structure, the operator can't recognize a lock state of the ejector easily by viewing from the front of the portable computer.

Therefore, if the release button is pushed while the lock lever is in the lock position, an excessive force may be applied to the connecting portion between the card-like electronic part and the card connector, and the card-like electronic part and the connector may be damaged. In addition, the excessive force may be applied to the pushing piece, and the pushing piece may be damaged. Therefore, the function of the ejector may be degraded.

Further, a recent portable computer includes a microphone for recording the voice of the operator. The microphone is disposed in a corner portion of the base unit. However, because an upper surface of the base unit is mostly occupied by the keyboard, and the circuit boards and a plurality of components are mounted inside of a center portion of the base unit in a high density, the head of the microphone is exposed upward from the base unit. In this structure, the microphone may not efficiently record the voice of the operator, because the microphone is not directed forward source of the voice.

Further, a portable computer may have a ridge or protrusion portion. The ridge portion projects upward from the rear end of the upper surface of the base unit. The display unit is rotatably connected to the base unit through the ridge portion. An icon display for displaying contents of operation states of the computer, is arranged on the ridge portion. An inside of the ridge portion is hollow. A light emitting diode(LED) and a LED circuit board are disposed in the ridge portion. In addition, a sub-battery and a core for a cable which is connecting between the base unit and the display unit are disposed in the ridge portion. These components are screwed onto an inner surface of the ridge portion. Such structure is disclosed in U.S. Pat. No. 5,068,652 by kobayashi. In this structure, many bosses and screws are needed for holding each components. Therefore, the number of manufacturing steps are increased, and the weight and the cost of the computer are increased. Furthermore, in this arrangement, it is difficult to achieve a high density arrangement in the ridge portion because the bosses and the screws occupy significant space.

In addition, in a portable computer the keyboard may be fixed to the base unit through many bosses of the base unit and screws. Such structure is disclosed in U.S. Pat. No. 5,335,141 by Hosoi. In this structure, many bosses and screws are needed for fixing the keyboard. Therefore, the number of manufacturing steps are increased, and the weight and the cost of the computer are increased. Furthermore, in this structure, it is difficult to achieve a high density arrangement in the base unit because the bosses and the screws occupy significant space.

Additionally, a recent portable computer can connect to the expansion unit for expanding a function of the computer through a first expansion connector and a second expansion connector. The external expansion unit has a positioning member for positioning the computer in a left and right direction. This structure is disclosed in U.S. Pat. No. 5,182,698 by Kobayashi et al. However, in this structure the computer can't be positioned with respect to the external expansion unit because the computer can't be positioned in an up and down direction with respect to the external expansion unit.

SUMMARY OF THE INVENTION

The present invention has been made in consideration of the above situation, and has as an object to provide a structure for supporting a plurality of printed circuit board without a special chassis.

It is also an object of the present invention to provide a portable electronic apparatus for which the operator can recognize the lock state of an ejector easily.

It is another object of the present invention to provide a portable electronic apparatus which can efficiently record the voice of the operator.

It is further object of the present invention to provide a structure having components disposed inside of a ridge portion.

It is an additional, object of the present invention to provide a portable electronic apparatus in which a keyboard can be mounted without the screws, and can be easily assembled.

It is yet another object of the present invention to provide a structure by which a portable computer and an external expansion unit can be easily connected together.

According to the present invention, there is provided a portable electronic apparatus comprising a housing, a support panel, a first printed circuit board, connecting means, a support member and a second printed circuit board. The housing including a bottom wall. The support panel including a receiving portion. The first printed circuit board mounted on the bottom wall. Connecting means electrically connected to the first printed circuit board, including an upper portion. The support member disposed between the receiving portion of the support panel and the upper portion of the connecting means, and above the first printed circuit board. The second printed circuit board mounted on the support member, and connected to the first printed circuit board through the connecting means.

Also according to the present invention, there is provided a portable electronic apparatus comprising a housing, a receptacle portion, an ejecting mechanism and a lock member. The housing includes a first side wall having a first surface and an insert slot and a second side wall having a second surface, and the second side wall continuous with the first side wall. The receptacle portion for receiving a card-like electronic device, and communicating with the insert slot. The ejecting mechanism for pushing the card-like electronic device out of the insert slot, the ejecting mechanism including a pushing piece for contacting the inserted card-like electronic device, an operation lever for operating the ejecting mechanism and a link mechanism Linking the pushing piece and the operation lever. The lock member including a third surface, the lock member disposed in a corner defined by the first and second side walls, the lock member being slidable between a lock position wherein movement of the ejecting mechanism is locked and a release position wherein the ejecting mechanism is unlocked, and the third surface being flush with the second surface when the lock member is located on the lock position, and the third surface of the lock member projecting from the second surface when the lock member is located in the release position.

Further according to the present invention, there is provided. A portable electronic apparatus comprising a base unit, a display unit, a hinge device and a microphone. The base unit including a leg mounting portion having a first side opening and a keyboard. The display unit including a leg portion having a second side opening, and a third opening. The hinge device including a first bracket fixed to the leg portion of the display unit, a second bracket fixed to the base unit and a hinge shaft supported by the first and second brackets and passing through the first and second side openings, so that the leg portion of the display unit is rotatably mounted on the leg mounting portion of base unit between a closed position wherein the display unit covers the keyboard and an opened position wherein the keyboard is exposed. The microphone disposed in the leg portion of the display unit, and adjacent to the first bracket, the microphone through the third opening, the third opening being directed forward the user when the display unit is in the opened position.

Additionally according to the present invention, there is provided a portable electronic apparatus comprising a base unit, a printed circuit board, a holder and a plurality of functional components. The base unit including a lower housing and an upper housing detachably fixed to the lower housing, the upper housing having an upwardly projecting hollow ridge. The printed circuit board disposed in the lower housing. The holder disposed between the hollow ridge and the lower housing, and having an upper surface and a plurality of engaging pieces projecting from the upper surface. The functional components detachably supported by the engaging pieces, and electrically connected to the printed circuit board.

Also according to the present invention, there is provided a portable electronic apparatus comprising a lower housing, a rear upper housing, a keyboard and a front upper housing. The lower housing including a front portion and a rear portion. The rear upper housing detachably fixed on the rear portion, and including a keyboard mounting portion having a rear receiving portion and a front receiving portion. The keyboard detachably mounted on the keyboard mounting portion, the keyboard including a plurality of keys, a rear engaging piece engaged to the rear receiving portion and a front engaging piece engaged to the front receiving portion. The front upper housing detachably fixed to the front portion, and including a retaining portion cooperating with the front receiving portion for retaining the front engaging piece.

Further according to the present invention, there is provided an electronic system comprising a portable electronic apparatus, an external expansion unit, a hook and an operation lever. The portable electronic apparatus including a bottom surface having a positioning hole and a rear surface having an engaging portion and a first expansion connector. The external expansion unit including a mounting surface opposing the bottom surface of the portable electronic apparatus and a connector mounting surface opposing the rear surface of the portable electronic apparatus, the connector mounting surface having a second expansion connector electrically and detachably connectable to the first expansion connector and an opening. The hook arm unit including a base, an engaging projection disposed on the base and a hook arm portion, the hook arm unit slidably disposed between a waiting position wherein the engaging projection projects from the opening and a connecting position wherein the first expansion connector is connected to the second expansion connector, the engaging projection engaging the positioning hole of the portable electronic apparatus, the hook arm portion being rotatably connected to the hook arm unit between a hooked position wherein the hook arm portions hooks the engaging portion of the portable electronic apparatus and a released position wherein the hook arm portions with draws from the hooked position. The operation lever rotatably supported to the external expansion unit between a first position in which the hook arm unit is in the waiting position and the hook arm portion is in the released position and a second position in which the hook arm unit is slid to the connecting position.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILS DESCRIPTION OF THE PREFERRED EMBODIMENT

Figure 1:
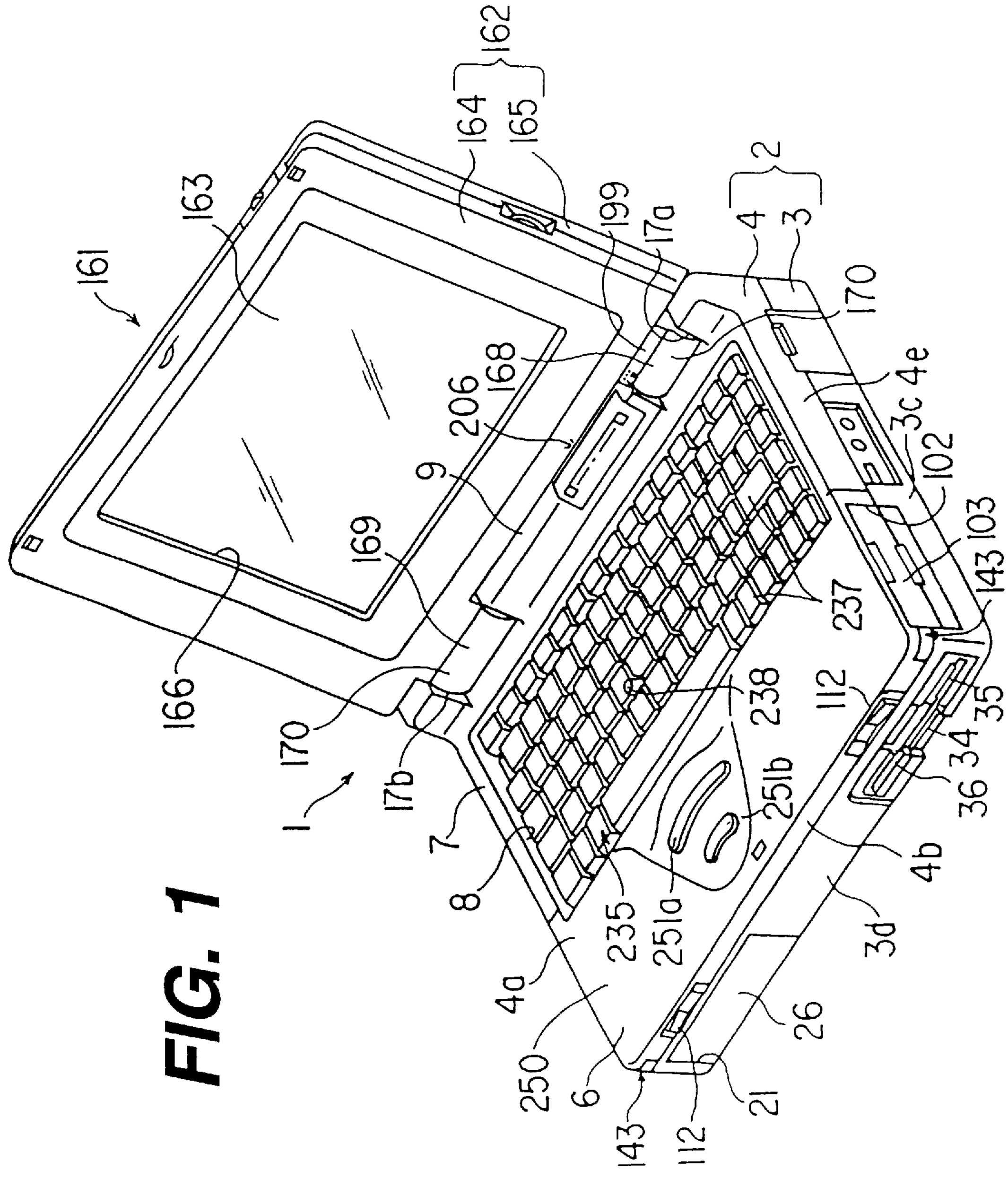
FIG. 1 is a perspective view showing a portable computer while a display unit is open.

FIG. 1 shows a note or book type portable computer 1. The portable computer 1 has a flat, box-like base unit 2. The base unit 2 includes a lower housing 3 and an upper housing 4 detachably fitted on the lower housing 3. The lower housing 3 and the upper housing 4 are made of a synthetic resin material. The lower housing 3 includes a bottom wall, and walls that are continuous with the bottom wall, i.e., a left side wall and right side wall 3*c*, and front wall 3*d*.

The upper housing 4 includes a flat upper wall 4*a*, and walls that are continuous with the upper wall 4*a*, i.e., front and rear walls 4*b*, and a left side wall and right side wall 4*e*. The front wall 4*b*, the left side wall and the right side wall 4*e* of the upper housing 4 are continuous with the front wall 3*d*, the left wall and the right wall 3*c* of the lower housing 3, respectively. The front wall 3*d* cooperates with the front wall 4*b* to form a front surface of the base unit 2. The left and right walls 3*c* cooperate with the left and right walls 4*e* to form side surfaces of the base unit 2, respectively. The upper housing 4 includes a front upper housing 6 and a rear upper housing 7. The front upper housing 6 is detachably fitted to the rear upper housing 7.

A keyboard mounting portion 8 for mounting the keyboard is disposed on an upper surface of the rear upper housing 7. A ridge or protrusion portion 9 is arranged on the rear end portion of the rear upper housing 7.

Figure 6:
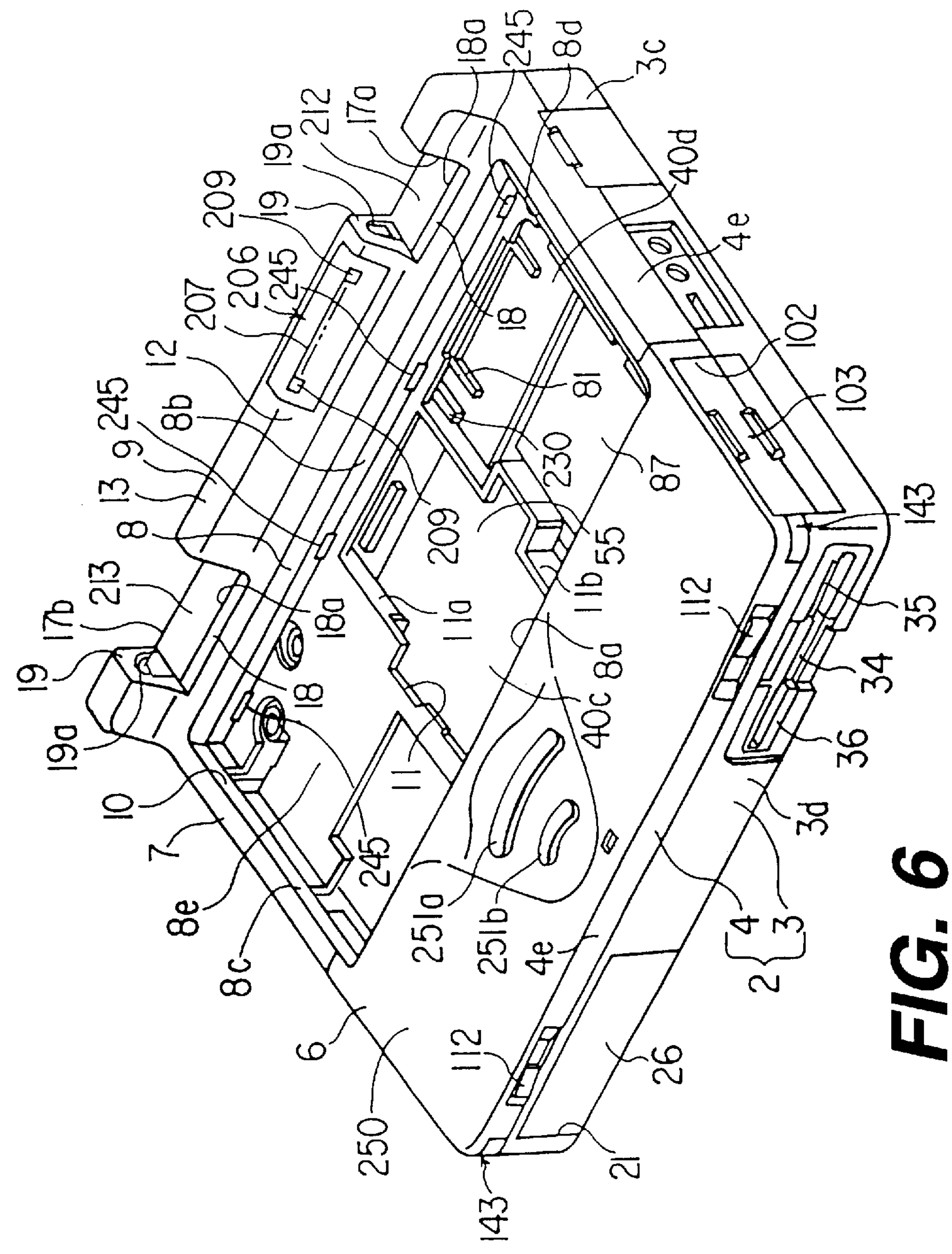
FIG. 6 is a perspective view of the base unit of the computer.
Figure 8:
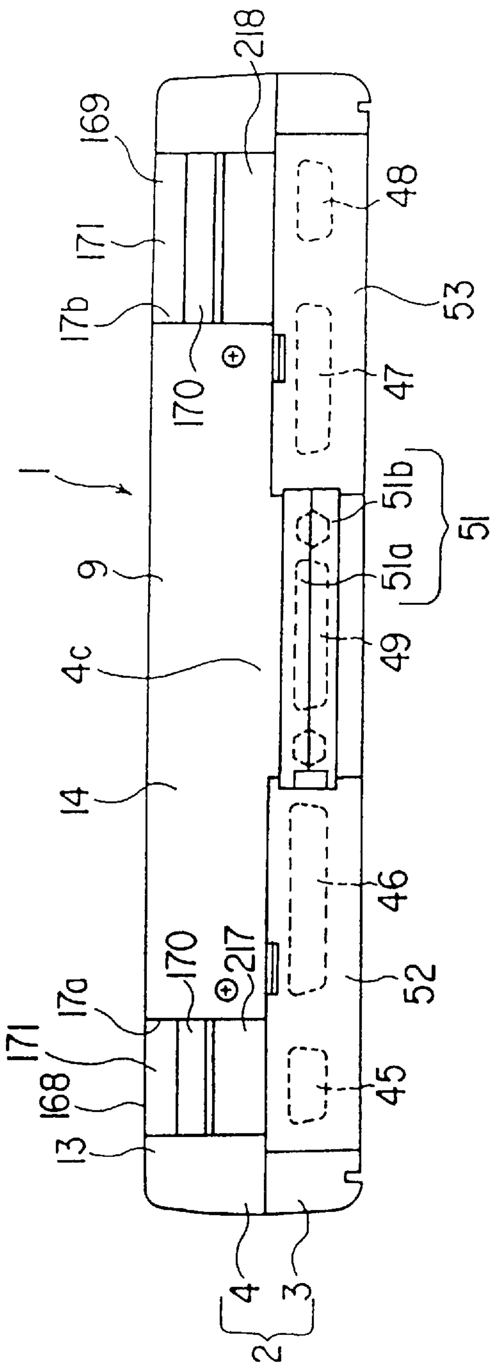
FIG. 8 is a rear view showing the computer in a state wherein the second connector cover and the third connector cover are closed.

As shown in FIGS. 6 and 8, the keyboard mounting portion 8 including a rectangular opening 10 opened in the keyboard mounting portion 8. The keyboard mounting portion 8 has a front side wall 8*a*, a rear side wall 8*b*, a left side wall 8*c*, a right side wall 8*d* and a bottom wall 8*e* that is continuous with the side walls 8*a*, 8*b*, 8*c* and 8*d*. The bottom wall 8*e* confronts the opening 10. A center portion of the bottom wall 8*e* has an opening 11 that opens continuous into the base unit 2. A width of the ridge portion 9 is approximately the same as a width of the upper housing 4. The ridge portion 9 includes a front surface 12 extending upward from the upper surface of the rear upper housing 7, an upper surface 13 extending in a rear direction from an end portion of the front surface 12 and a rear surface 14 extending downward from an end portion of the upper surface 13. The inside of the ridge portion 9 is hollow and opens downward from the upper housing 4. The rear surface 14 is continuous with the rear wall 4*c* of the upper housing 4.

The ridge portion 9 has a first leg mounting portion 17*a* and a second leg mounting portions 17*b*. The first and second leg mounting portions 17*a*, 17*b* are spaced apart along the ridge portion 9. The leg mounting portions 17*a*, 17*b* are continuously open in the forward, upward and backward direction of the ridge portion 9. The leg mounting portions 17*a*, 17*b* have a bottom surface 18 that is continuous with the rear upper housing 7 and left and right side surfaces 19 continuous with the bottom surface 18. The bottom surfaces 18 each have a bottom opening 18*a* which opens to the inside of the base unit 2. The side surfaces 19 each have a side opening 19*a* which opens to the inside of the base unit 2.

Figure 4:
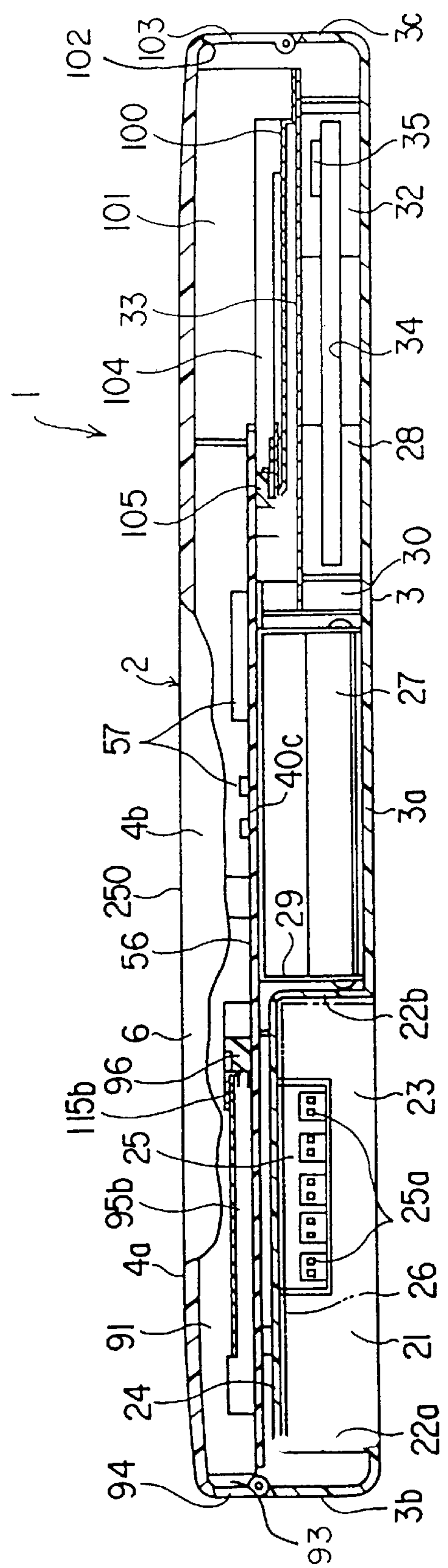
FIG. 4 is a sectional view taken along line A—A in FIG. 3.

As shown in FIG. 1, the lower housing 3 includes a battery receptacle 21 in a front-left portion of the lower housing 3. As shown in FIG. 4, the battery receptacle 21 is defined by left and right side walls 22*a*, 22*b* continuous with the bottom wall 3*a*, a rear side wall 23 continuous with rear ends of the side walls 22*a*, 22*b* and an upper wall 24 continuous with upper ends of the side walls 22*a*, 22*b* and the rear side wall 23. The battery receptacle 21 is opened between the front and bottom surfaces of the lower housing 3. The walls 22*a*, 22*b*, 23 and 24 separate the battery receptacle 21 and an inside of the base unit 2.

A power supply connector 25 is disposed on the rear side wall 23. The connector 25 has a plurality of contact terminals 25*a*. The battery supply connector 25 is exposed on the battery receptacle 21.

As shown in FIG. 1, a battery pack 26 is detachably installed in the battery receptacle 21 from a front direction of the lower housing 3. The battery pack 26 serves as a driving power supply when the computer 1 is used in a place where no commercial power supply is available.

The battery pack 26 has a plurality of signal and power terminals (not shown) on it. When the battery pack 26 is installed in the battery receptacle 21, each of the terminals of the battery pack 26 contact the contact terminals 25*a*, respectively.

As shown in FIG. 4, a hard disk drive (HDD) unit 27 and a floppy disk drive (FDD) unit 28 are disposed in the front portion of the lower housing 3. The FDD unit 28 is disposed in a front-right portion of the lower housing 3, the HDD unit 27 is disposed between the battery pack 26 and the FDD unit 28. The HDD unit 27 is disposed in a front-center portion of the lower housing 3. The HDD unit 27 is held by a bracket 29. The bracket 29 is fixed to a boss 30 which extends from the bottom wall 3*a* by screws. The FDD unit 28 has a box-like case 32. The case 32 is screwed on the bottom wall 3*a* through the bracket 33. The case 32 has an insert port 34 for receiving a floppy disk and a button 35 on a front surface of case 32 for ejecting the floppy disk.

As shown in FIG. 1, the housing 3 has an opening 36 for exposing the insert port 34 and the button 35.

Figure 3:
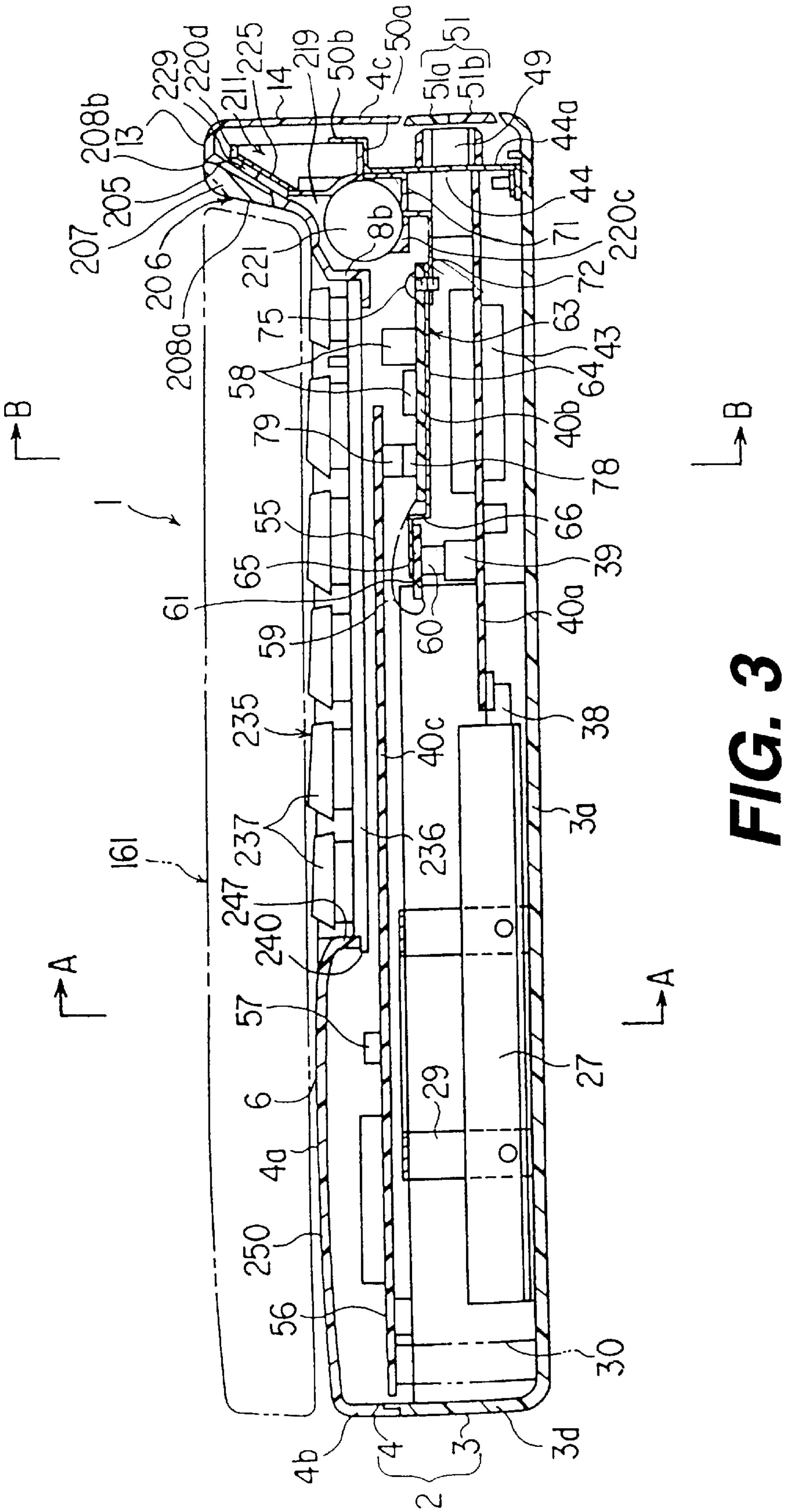
FIG. 3 is a cutaway side view showing a base unit of the computer.
Figure 5:
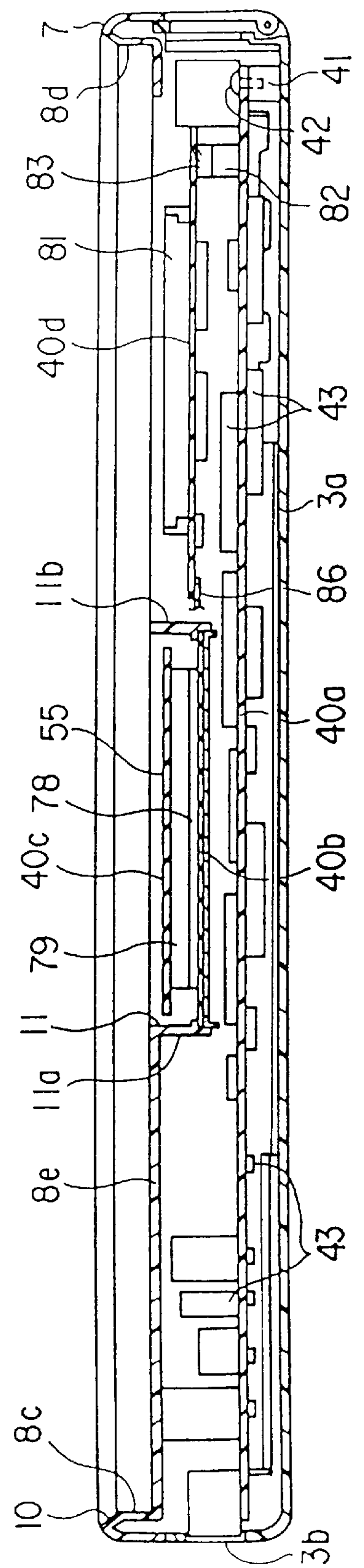
FIG. 5 is a sectional view taken along line B—B in FIG. 3.

As shown in FIGS. 3 and 5, first, second, third and fourth printed circuit boards (PCBs) 40*a*, 40*b*, 40*c* and 40*d*, respectively, are disposed in the rear portion of the lower housing 3.

Figure 9:
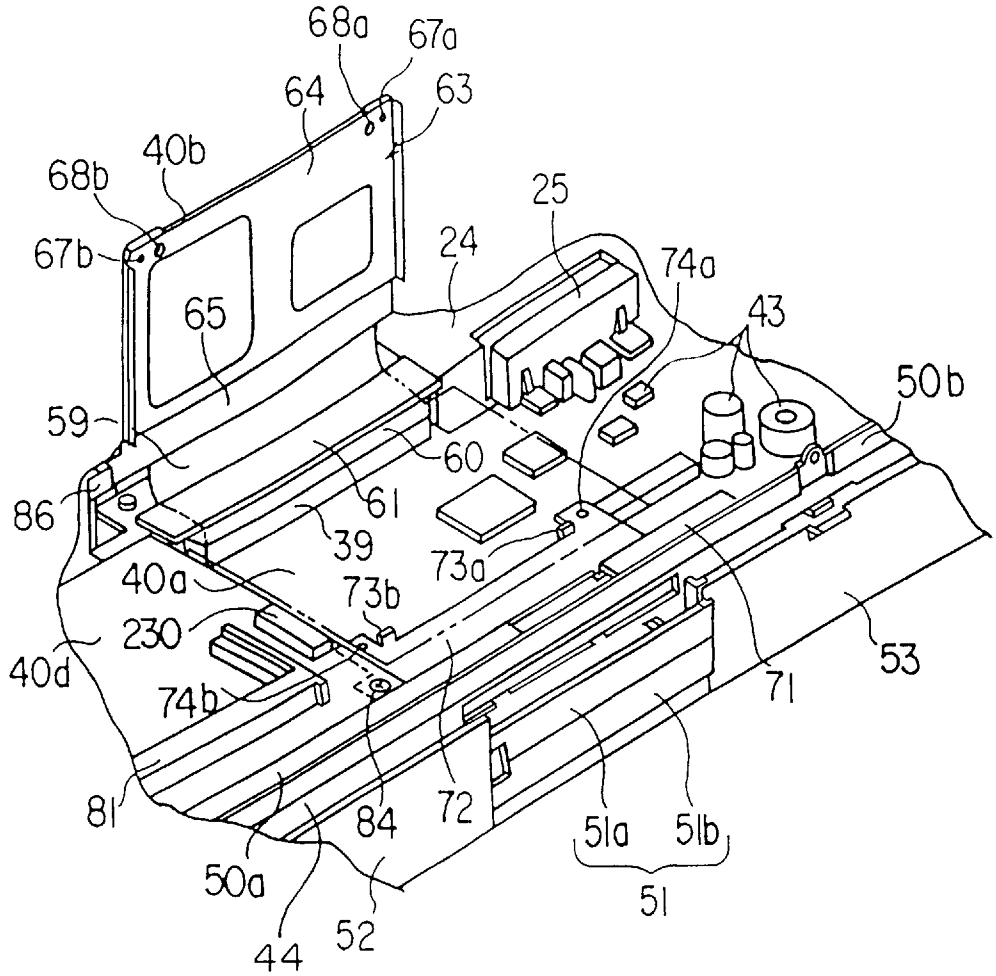
FIG. 9 is a perspective view showing the relationship between a bracket which supports a second circuit board and a support metal member of a connector panel.

The PCBs 40*a*, 40*b* and 40*d* are disposed behind the battery pack 26, the HDD unit 27 and the FDD unit 28. The PCBs 40*a*, 40*b*, 40*c* and 40*d* are disposed to be spaced apart from each other in the vertical direction. The PCBs 40*a*, 40*b*, 40*c* and 40*d* are disposed in parallel with the bottom wall 3*a*, respectively. The width of first PCB 40*a* is approximately the same as the width of the lower housing 3. The first PCB 40*a* is fixed to a boss portion 41 of the bottom wall 3*a* by screws 42. A plurality of electronic components such as IC chips are mounted on the upper and the under surfaces of the first PCB 40*a*. The connector 25 and a first stacking connector 39 are located on the upper surface of the first PCB 40*a* (the connector 25 is shown in FIG. 9).

In this embodiment, the first PCB 40*a* is a system PCB, the HDD unit 27 is connected to a front portion of the first PCB 40*a* through a connector 38. A metal connector panel 44 is engaged in a rear portion of the first PCB 40*a*. The width of the connector panel 44 is approximately the same as the width of the first PCB 40*a*. The connector panel 44 extends upward from the first PCB 40*a*.

Figure 7:
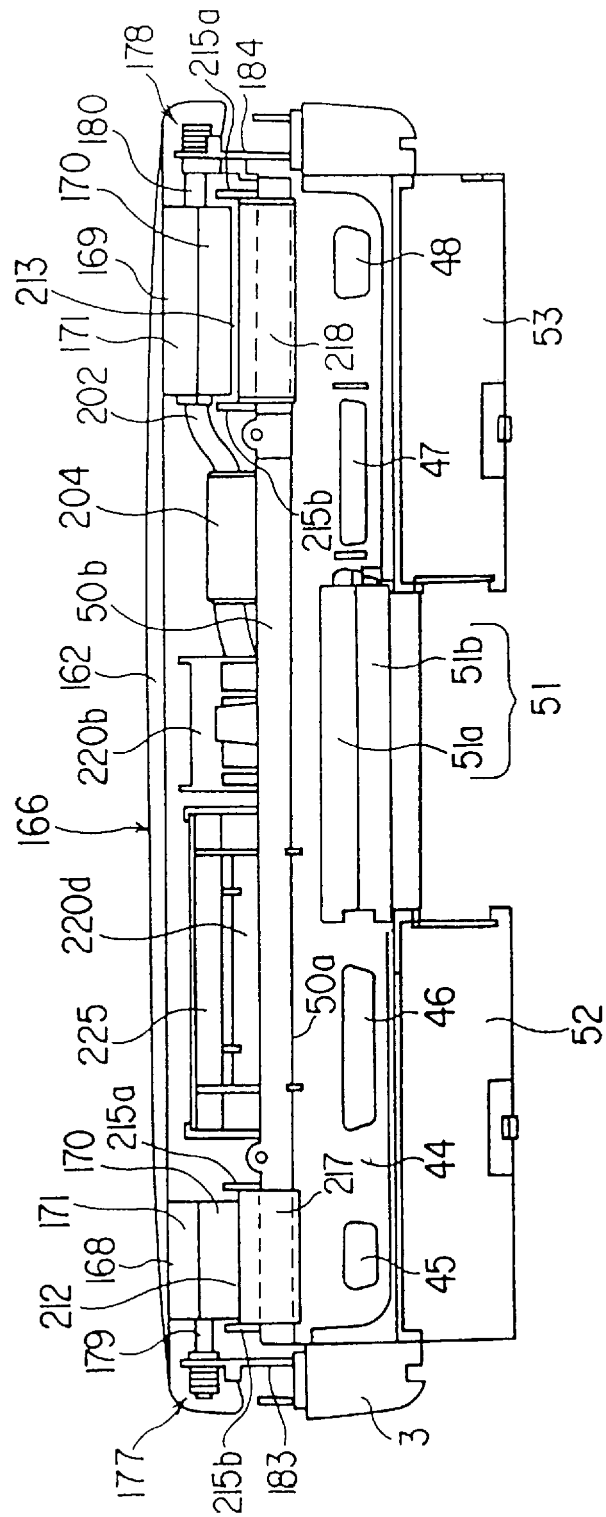
FIG. 7 is a rear view showing the computer in a state wherein a second connector cover and a third connector cover are opened.

As shown in FIG. 7 and 8, the connector panel 44 holds an RGB connector 45 for connecting an external CRT display, a parallel connector 46 for connecting a PRINTER or an external FDD unit, an interface connector 47 for connecting an optical disk drive (ODD) unit or an external HDD unit, an RS232C connector 48 for connecting a peripheral device having an interface of the RS232C standard and a first expansion connector 49 for connecting an external expansion unit. The ports and the connectors 45, 46, 47, 48 and 49 are disposed along a lateral direction of the connector panel 44. The first expansion connector 49 is disposed in substantially the center of the connector panel 44. The connectors 45, 46, 47, 48 and 49 are electrically connected to the first PCB 40*a*. The connecting portions between the connectors 45, 46, 47, 48 and 49 and the first PCB 40*a* are covered with the connector panel 44 from the back. The connectors 45, 46, 47, 48 and 49 are exposed on a rear end of the lower housing 3.

As shown in FIG. 3, the connector panel 44 has a leg portion 44*a* which projects down ward from the first PCB 40*a*. The leg portion 44*a* is screwed to the bottom wall 3*a*. The connector panel 44 is vertically disposed to the bottom wall 3*a*.

An upper end of the connector panel 44 protrudes above the lower housing 3. The upper end of the connector panel 44 is disposed in the ridge portion 9. The upper end of the connector panel 44 has a flange 50*a* and a vertical wall 50*b*. The width of the flange 50*a* and wall 50*b* are approximately the same as the width of the connector panel 44.

A first connector cover unit 51 is disposed in a rear side of the connector panel 44. The first connector cover unit 51 includes an upper cover portion 51*a* and a lower cover portion 51*b*. The cover portions 51*a*, 51*b* are rotatable between an opened position wherein the first expansion connector 49 is exposed and a closed position wherein the first expansion connector 49 is covered.

As shown in FIG. 7, a second cover and third cover 52, 53 are disposed in the rear end portion of the lower housing 3. The second cover 52 is rotatably connected to the lower housing 3 between a closed position wherein the ports 46, 48 are covered and an opened position wherein the ports 46, 48 are exposed. The third cover 53 is rotatably connected to the lower housing 3 between a closed position wherein the connectors 45, 47 are closed and an opened position wherein the connectors 45, 47 are exposed. The second and third covers 52 and 53 are flush with the first cover 51 and the rear side wall 4*c*, when the second and third covers 52 and 53 are rotated to the closed position.

As shown in FIG. 3, the third PCB 40*c* is located above the first PCB 40*a* and has a first PCB portion 55 and a second PCB portion 56. The first PCB portion 55 is disposed above the first PCB 40*a* The second PCB portion 56 is disposed above the HDD unit 27. A large number of circuit parts 57, e.g., IC chips and capacitors, are mounted on the first PCB portion 55. The second PCB portion 56 extends in the lateral direction of the lower housing 3 from the first PCB portion 55. Left and right end portions of the second PCB portion 56 are disposed above the battery receptacle 21 and the FDD unit 28.

As shown in FIG. 4, the left end portion of the second PCB portion 56 is screwed to the ceiling wall 24 of the battery receptacle 21 and the boss 30 of the lower housing 3.

As shown in FIG. 3, the second PCB 40*b* electrically interconnects the first PCB 40*a* and the third PCB 40*c*. The second PCB 40*b* is disposed between the first PCB 40*a* and the first PCB portion 55 of the third PCB 40*c*. The supporting structure of the second PCB 40*b* will be described with respect to FIGS. 9 and 10. A large number of circuit parts 58, e.g., IC chips and capacitors, are mounted on the second PCB 40*b*. A flexible wiring board 59 is connected to the second PCB. A second stacking connector 60 is connected to an end portion of the flexible wiring board 59. The second stacking connector 60 is removably engaged to a first stacking connector 39 of the first PCB 40*a*. With this engagement, the first PCB 40*a* is electrically connected to the second PCB 40*b*.

A connecting portion between the second stacking connector 60 and the flexible wiring board 59 is covered with a reinforcing panel 61. The reinforcing plate 61 has a belt-like shape. The reinforcing plate 61 extends over the second stacking connector 60. The reinforcing plate 61 is integrally fixed with the second PCB 40*b* via a metal bracket 63. The bracket 63 integrally has a first portion 64 which supports the second PCB 40*b*, a second portion 65 which overlaps with the reinforcing plate 61 and a third portion 66 which mechanically connects the first portion 64 and the second portion 65. The second PCB 40*b* is mounted on the first portion 64 of the bracket 63. A location of the first portion 64 is lower than a location of the second portion 65. The location of second PCB 40*b* is the same as that of the reinforcing plate 61.

As shown in FIG. 9, the rear end portions of the second PCB 40*b* and a first portion 64 have a pair of left and right screw holes 67*a*, 67*b* and engaging holes 68*a*, 68*b*. A metal support plate 71 is fixed to a front surface of the connector panel 44. The support plate 71 is integrally formed to the connector panel 44. The support plate 71 has a receiving portion 72 which supports the rear end portion of the second PCB 40*b*. The width of the receiving portion 72 is approximately the same as the width of the second PCB 40*b*. The receiving portion 72 projects forward from the connector panel 44. The receiving portion 72 is disposed above the first PCB 40*a*. The first portion 64 of the bracket 63 overlaps with the upper surface of the receiving portion 72. The receiving portion 72 has a pair of engaging pieces 73*a* and 73*b* and screw holes 74*a* and 74*b*, respectively. The engaging pieces 73*a* and 73*b* are bent upward at the left and right side portions of the receiving portion 72. When the first portion 64 of the bracket 63 is piled up on the upper surface of the receiving portion 72, the engaging pieces 73*a* and 73*b* engage the engaging holes 68*a* and 68*b*, respectively.

With this engagement, the second PCB 40*b* and the bracket 63 are positioned. The screw holes 67*a* and 67*b* and the screw holes 74*a* and 74*b* are positioned.

The rear end portion of the second PCB 40*b* is screwed at the screw holes 74*a* and 74*b* by the screws 75. The second PCB 40*b* is bridged between the reinforcing plate 61 and the metal support plate 71 of the connector panel 44.

Figure 10:
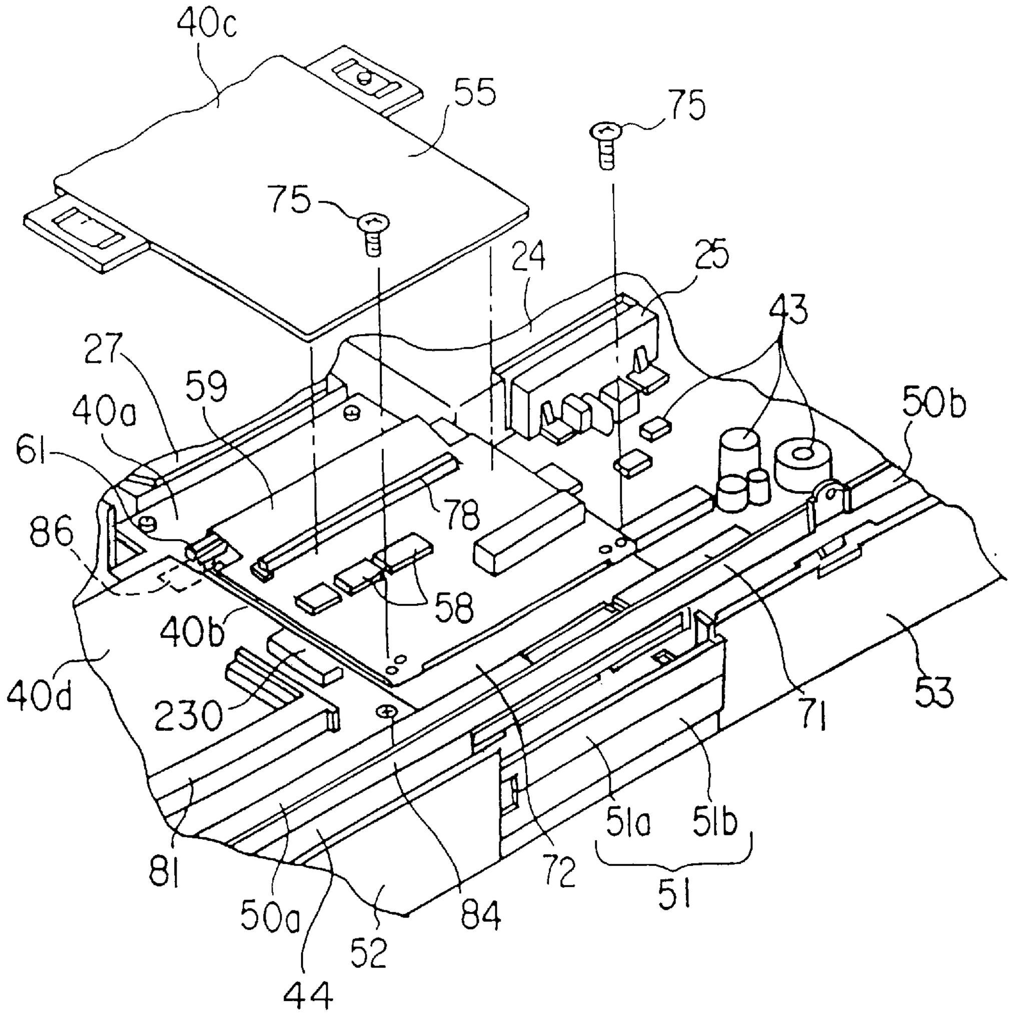
FIG. 10 is perspective view showing a state wherein a second circuit board and a third circuit board are incorporated.

As shown in FIG. 10, a third stacking connector 78 is disposed on the upper surface of the second PCB 40*b*. The third stacking connector 78 is disposed adjacent to the reinforcing plate 61. As shown in FIG. 3, the third stacking connector 78 extends upward from the second PCB 40*b*. A fourth stacking connector 79 is disposed on the lower surface of the third PCB 40*c*. The fourth stacking connector 79 is detachably engaged to the third stacking connector 78. The second PCB 40*b* is electrically connected to the third PCB 40*c* via the third and fourth stacking connectors 78 and 79.

As shown in FIGS. 5 and 6, the rear half portion of the first circuit portion 55 is exposed through the opening 11 of the upper housing 4.

The bottom wall 8*e* has a pair of support walls 11*a*, 11*b* extending downward from the bottom wall 8*e*. The support wall 11*a*, 11*b* hook the left and right side edge of the first PCB portion 55, respectively. A plurality of memory chips are mounted on the fourth PCB 40*d*. The fourth PCB 40*d* has a card connector 81 which is electrically connected to the memory card. As shown in FIG. 5, the fourth PCB 40*d* is located at a right side of the second PCB 40*b*. A fifth stacking connector 82 is provided on the upper-right portion of the first PCB 40*a*. A sixth stacking connector 83 is provided on the under surface of the fourth PCB 40*d*. The connector 83 is connected to the connector 82. The first PCB 40*a* is electrically connected to the fourth PCB 40*d* via the connectors 82, 83.

As shown in FIG. 9, the rear end portion of the fourth PCB 40*d* is screwed to the receiving portion 72 by a screw 84.

In this embodiment, as shown in FIG. 9, the second portion 65 of the bracket 63 has a support piece 86. The support piece 86 extends toward the right side of the base unit 2. The support piece 86 is opposite to the front-left portion of the fourth PCB 40*d*. The front-left portion of the fourth PCB 40*d* is overlaid on the front-right portion of the support piece 40*d*.

The right edge portion of the fourth PCB 40*d* is supported by the fifth and sixth stacking connector 82, 83. The left edge portion of the fourth PCB 40*d* is supported by the bracket 86 and the support plate 71.

The fourth PCB 40*d* is disposed behind the FDD unit 28.

As shown in FIG. 6, a fifth printed circuit board (PCB) 87 as a sound board is disposed above the upper surface of the FDD unit 28. The fifth PCB 87 is disposed adjacent to the front position of the fourth PCB 40*d*.

According to the above arrangement, the second PCB 40*b* is supported between the support plate 71 which is fixed to the connector panel 44 and the reinforcing plate 61 of the second stacking connector 39. The second PCB 40*b* is located above the first PCB 40*a* via the bracket 63.

With this structure, the second PCB 40*b* is located above the first PCB 40*a* by the reinforcing plate 61 of the second stacking connector 60 and the connector panel 44 for supporting the connectors 45, 46, 47, 48 and 49.

The computer 1 does not need a special chassis for mounting PCBs. Therefore, the number of components of the computer 1 can be decreased, and the weight and cost of the computer 1 can be reduced.

The computer 1 does not need a special area for storing the PCBs 40*a* 40*b*, 40*c* and 40*d* in the lower housing. Therefore, the size of each of the PCBs 40*a*, 40*b*, 40*c* and 40*d* of the computer 1 can be larger, and the size of the lower housing 3 of the computer 1 can be reduced.

In addition, with above structure, the connector panel 44 is supported on the first PCB 40*a*. Therefore, the second and fourth PCBs 40*b* and 40*d* are supported by the first PCB 40*a* and the connector panel 44, can be assembled into one unit before mounting on the lower housing 3.

Accordingly, the assembled unit of PCBs 40*a*, 40*b*, 40*c* and 40*d* can be easily mounted on the lower housing 3 as compared with a case wherein the PCBs 40*a*, 40*b*, 40*c* and 40*d* are mounted one by one on the lower housing 3.

In addition, the bracket 63 has the first portion 64 which supports the second PCB 40*b* and the second portion 65 which overlaps the reinforcing plate 61. The first portion 64 is located at a lower position than the second portion 65.

Accordingly, the second. PCB 40*d* is not set at a height of the first and second stacking connector 39 and 60, and can be located in the lower position adjacent to the first PCB 40*a*. A space between the first and second PCBs 40*a* and 40*b* can be reduced. The PCBs 40*a*, 40*b* and 40*c* are overlapped in triple steps without a special chassis. A height of the overlapped PCBs 40*a*, 40*b* and 40*c* can be reduced by the bracket 63. Therefore, a height of the base unit 2 can be reduced. The bracket 63 has the support piece 86 which projects toward the right direction. The left edge of the PCB 40*d* overlaps the upper surface of the support piece 86. For this reason, the fourth PCB 40*d* adjacent to the second PCB 40*b* is supported by the bracket 63.

Accordingly, the computer 1 does not need a special bracket and mounting pedestals for supporting the fourth PCB 40*d*. Therefore, the number of components of the computer 1 can be decreased, and the structure of the lower housing 3 can be simplified.

With the above structure, the third and fourth stacking connectors connecting the second and third PCBs 40*b* and 40*c* are located in the position adjacent to the reinforcing plate 61. Therefore, when the fourth stacking connector 79 is connected to the third stacking connector 78, the pushing force is mostly received by the connected first and second stacking connectors 39 and 60 and the reinforcing plate 61.

Accordingly, the pushing force is not concentrated on the second PCB 40*b*, and the second PCB 40*b* is protected from breakage and transformation thereof. Each of the third stacking connector 78 and the fourth stacking connector 79 can be effectively connected.

As shown in FIG. 4, the second PCB portion 56 of the third PCB 40*c* is located at a lower portion of the front upper housing 6. The left edge of the second PCB portion 56 overlaps the ceiling wall 24. A first card receptacle 91 is provided between the second PCB portion 56 and front upper housing 6. A card-like electronic part such as an IC card or memory card stores an application program. The first card receptacle 91 is located above the battery receptacle 21. The first card receptacle 91 includes a card insertion slot 93 into which is detachably inserted the card-like electronic parts 92. The card insertion slot 93 is formed on the left side surface of the base unit 2.

Figure 12:
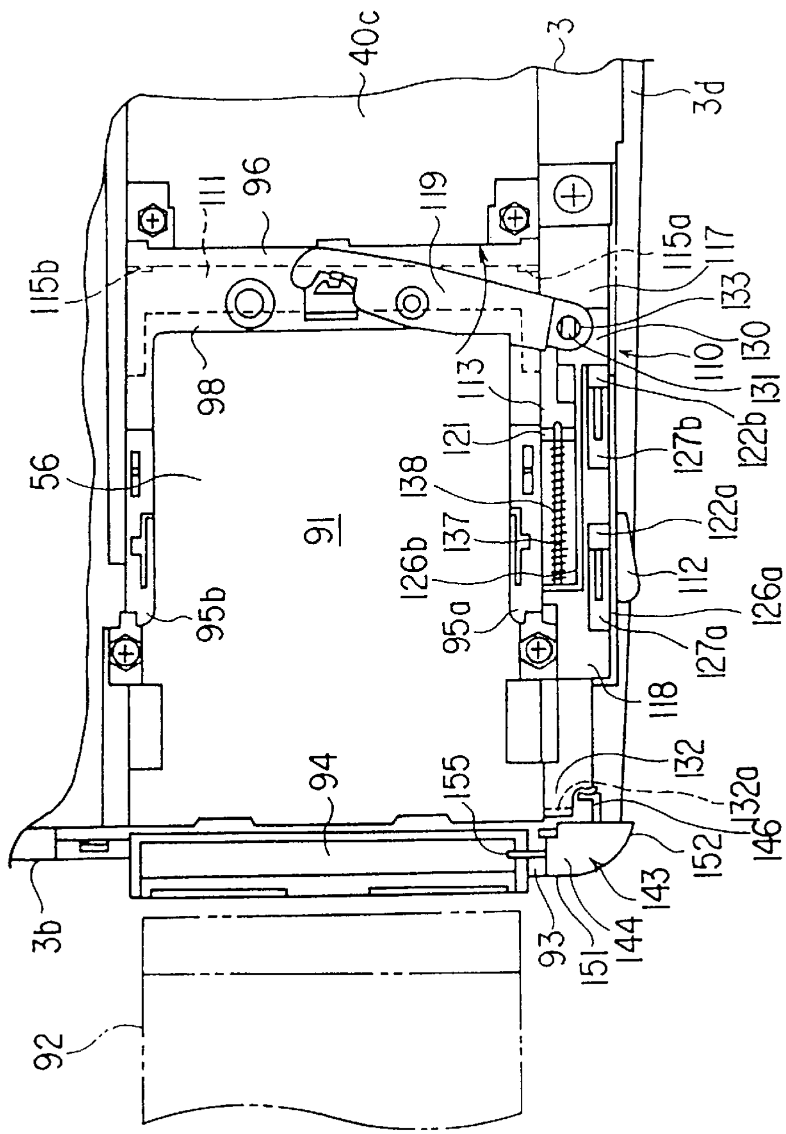
FIG. 12 is a plan view showing the first card receptacle.
Figure 13:
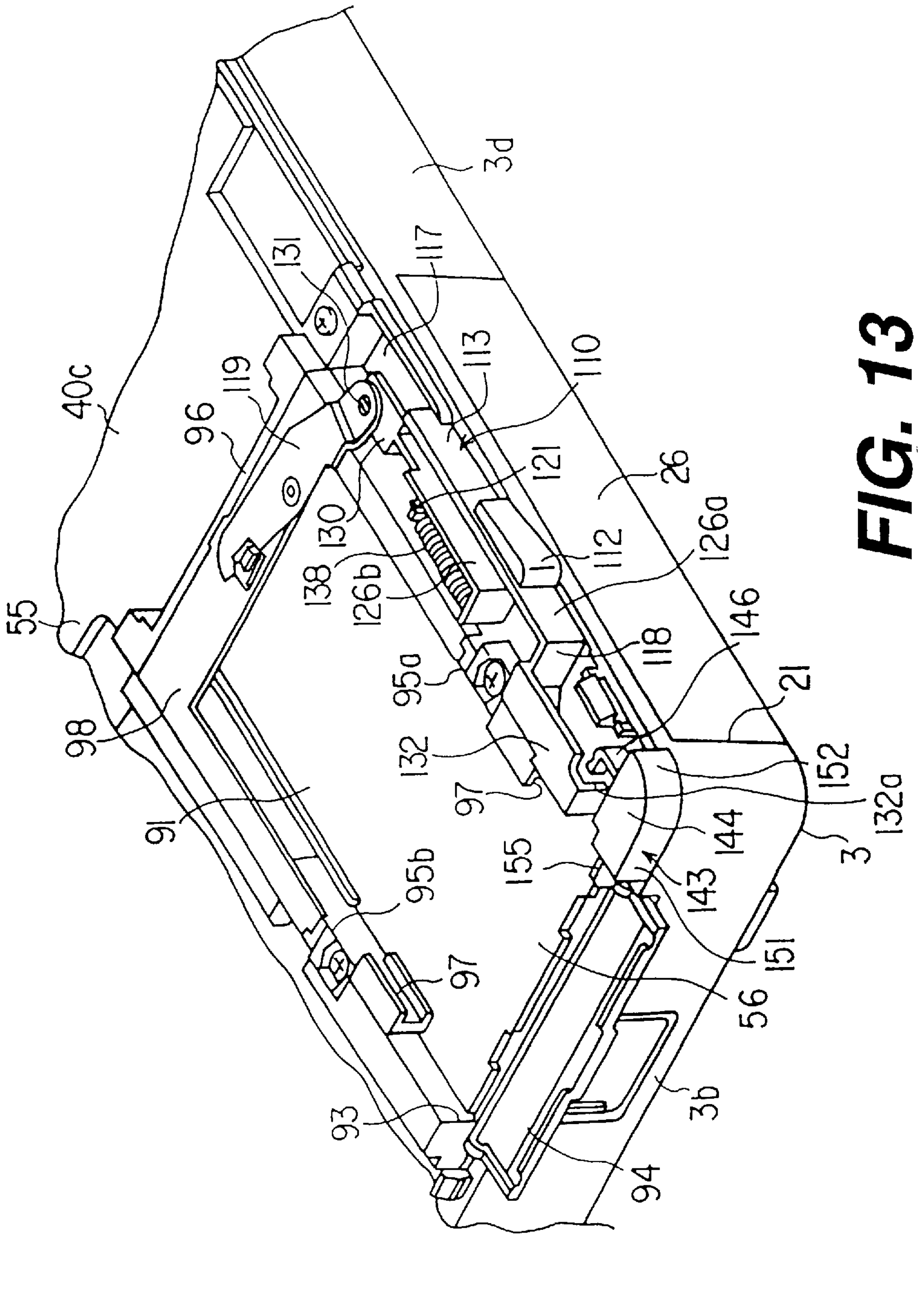
FIG. 13 is a perspective view showing the first card receptacle in a state wherein a lock lever has released a lock of the ejector and slid to a the releasing position.

As shown in FIGS. 12 and 13, the card insertion slot 93 is adjacent to the corner portion defined by the left side surface and the front surface of the base unit 2. A first card cover 94 is disposed at the left side surface of the lower housing 3. The card insertion slot 93 is covered with a first card cover 94 which is rotatable between an opened position wherein the card insertion slot 93 is exposed and a closed position wherein the card insertion slot 93 is closed.

The upper surface of the second PCB portion 56 confronts the first card receptacle 91. A pair of guide rails 95*a* and 95*b* and a first connector 96 which is continuous with one edge of the guide rails 95*a* and 95*b* are mounted on the upper surface of the second PCB portion 56. The guide rails 95*a* and 95*b* extend from the position which is adjacent to the card insertion slot 93 to the end portion of the first card receptacle 91. The guide rails 95*a* and 95*b* have guide recesses 97 which slidably engage the left and right edge of the card-like electronic parts 92, respectively. The guide recesses 97 guide the card-like electronic part 92 to the first connector 96. The guide recess 97 of the guide rail 95*a* is opposites to the guide recess 97 of the guide rail 95*b*. The first connector 96 has a plurality of terminals (not shown) opposite to the card insertion slot 93.

While the card-like electronic part 92 is connected to the first connector 96, the card-like electronic part 92 does not project from the card insertion slot 93, and is completely stored in the first card receptacle 91. A metal support plate 98 is mounted between the upper surface of the first connector 96 and the upper surface of the guide rails 95*a* and 95*b*.

As shown in FIG. 4, a shield plate 100 of metal is mounted on the right end of the second PCB portion 56. The shield plate 100 extends from the right end of the second PCB portion 56 to the position adjacent to the left side surface of the base unit 2. The shield plate 100 is fixed to the upper surface of the bracket 33 of the FDD unit 28.

A second card receptacle 101 is formed between the shield plate 100 and the front upper housing 6. A card-like electronic part which is different from the kind of card-like electronic part 92 is inserted in the second card receptacle 101. The second card receptacle 101 is disposed above the FDD unit 28. The second card receptacle 101 includes a card insertion slot 102 into which is detachably inserted the card-like electronic part. The card insertion slot 102 is formed on the right side surface of the base unit 2.

Figure 11:
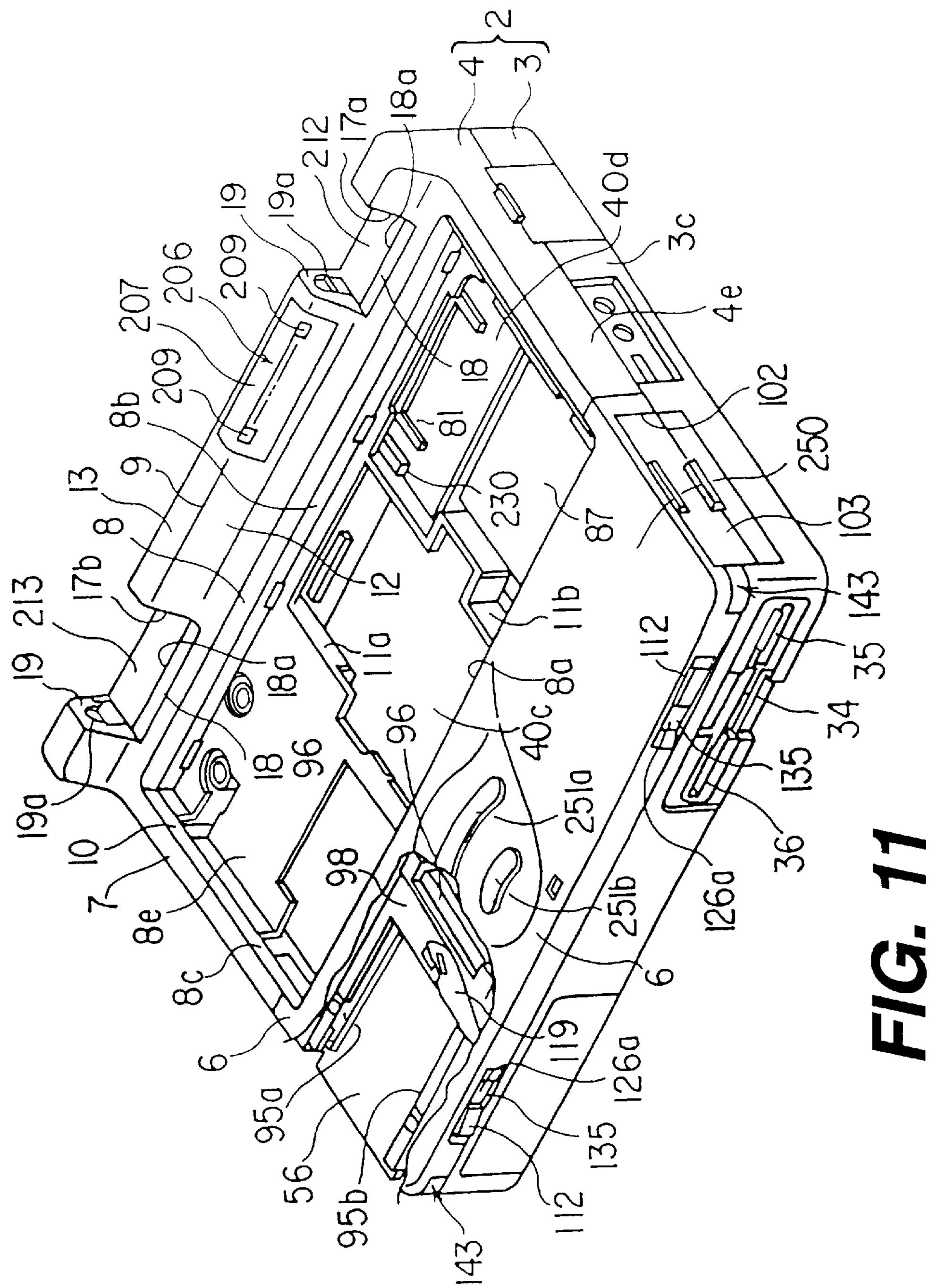
FIG. 11 is a perspective view showing the computer in a state wherein a portion of a first card receptacle is exposed.

As shown in FIG. 11, the card insertion slot 102 is adjacent to the corner portion defined by the right side surface and the front surface of the base unit 2. A second card cover 103 is disposed to the right side surface of the lower housing 3. The card insertion slot 102 is covered with the second card cover 103 which is rotatable between an opened position wherein the card insertion slot 102 is exposed and a closed position wherein the card insertion slot 102 is closed.

As shown in FIG. 4, a pair of guide rails 104 (only one of them is shown) for slidably guiding the card-like electronic part 92 are disposed in the second card receptacle 101. A second connector 105 for electrically connecting the card-like electronic part 92 to the computer 1 is disposed in the second card receptacle 101. The guide rails 104 are mounted between the upper surface of the shield plate 100 and the under surface of the second PCB portion 56. The second connector 105 is mounted on the right end of the second PCB portion 56 and opposite to the card insertion slot 102.

As shown in FIG. 12, an ejector 110 is disposed in the first receptacle 91. The ejector 110 ejects the card-like electronic part 92. The same type of ejector 110 is disposed in the second card receptacle 101. The ejector 110 includes a slide plate 111 which is supported on the under surface of the support plate 98, an operation lever 112 which is operated by the operator and a link mechanism 113 which links the slide plate 111 and the operation lever 112. The slide plate 111 is supported to the support plate 98 between the guide rails 95*a* and 95*b*. The slide plate 111 has a pair of pushing pieces 115*a* and 115*b* which extend downward thereof. The pushing pieces 115*a* and 115*b* are located on a front of first connector 96. When the card-like electronic part 92 is inserted in the first card receptacle 91, the pushing pieces 115*a* and 115*b* are attached to the front edge of the card-like electronic part 92. The link mechanism 113 includes a base 117 made of a synthetic resin material, a slider 118 which is supported on the upper surface of the base 117 and a rotate lever 119 which links the slider 118 and the slide plate 111.

Figure 15:
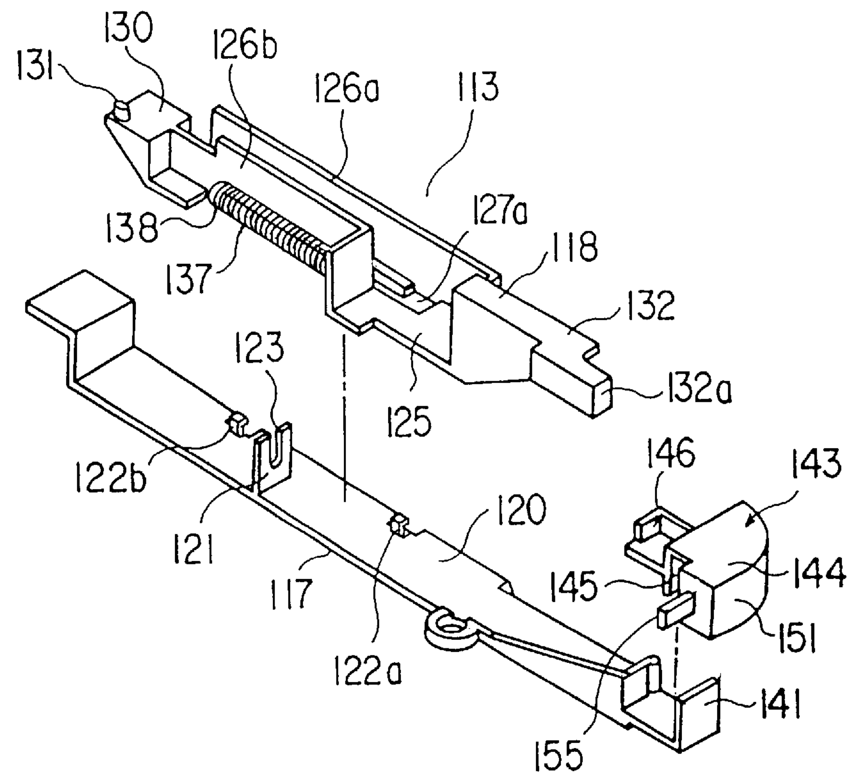
FIG. 15 is an exploded view of an ejector mechanism.

As shown in FIG. 15, the upper surface of the base 117 has a flat slide guide surface 120. A spring receiver 121 and a pair of engaging projections 122*a* and 122*b* are located on the slide guide surface 120. The spring receiver 121 extends upward from the slide guide surface 120. The spring receiver 121 has a guide slit 123. The guide slit 123 is opened on the upper edge of the spring receiver 121. The engaging projections 122*a* and 122*b* are separated from each other. Each of projections 122*a* and 122*b* extends above the slide guide surface 120.

The slider 118 includes a bottom wall 125 which is slidably located on the slide guide surface 120, and first and second side walls 126*a* and 126*b* which are continuous with the bottom wall 125. The bottom wall 125 has a pair of engaging slits 127*a* and 127*b*. The slits 127*a*, 127*b* are formed along a longitudinal axis of the slider 118. The engaging slits 127*a* and 127*b* are separated from each other. The engaging projections 122*a* and 122*b* are slidably engaged to the engaging slits 127*a* and 127*b*, respectively.

With this engagement, the slider 118 is slidably supported on the base 117 in the longitudinal direction. A pedestal portion 130 is integrally formed on one edge of the bottom wall 125. An engaging projection 131 is formed on the upper surface of the pedestal portion 130. A lock portion 132 is integrally formed on the other edge of the bottom wall 125. The lock portion 132 has a lock wall 132*a* which extends in an up and down direction. The rotate lever 119 is located between the pedestal portion 130 and the slide plate 111. The center portion of the rotate lever 119 is pivotably supported on the support plate 98. One edge of the rotate lever 119 is linked to the slide plate 111. The other edge of the rotate lever 119 is located on a front of one of the guide rail 95*a*. A link hole 133 opens on the other edge of the rotate lever 119. The engaging projection 131 is pivotably engaged to the link hole 133.

According to the above structure, the rotate lever 119 is pivoted at a link portion of the rotate lever 119 and the support plate 98, when the slider 118 is slid in the left and right direction. With this pivoting, the slide plate 118 is slid in the opposite direction respect to the slider 118.

Accordingly, the slider 118 is slidably moved between a waiting position wherein the pushing pieces 115*a* and 115*b* are positioned in a front of the first connector 96 and a pushing position wherein the pushing pieces 115*a* and 115*b* push toward the card insertion slot 93 toward card-like electronic part 92.

The first and second side walls 126*a* and 126*b* of the slider 118 are located between the front surface of the front upper housing 6 and guide rail 95*a*, and oppose each other. The first side wall 126 is located inside of the front surface of the front upper housing 6. The operation lever 112 is integrally formed in the front surface of the first side wall 126*a* of the slider 118.

As shown in FIG. 11, the front surface of the front upper housing 6 has an opening 135. The opening 135 extends in the lateral direction. The opening 135 is a rectangular opening corresponding to the sliding of the slider 118. The first side wall 126*a* covers the opening 135 from inside of the front upper housing 6. The operation lever 112 is exposed via the opening 135. The second side wall 126*b* of the slider 118 has an integral guide bar 137. The guide bar 137 extends parallel to the side wall 126*b*. The edge of the guide bar 137 is slidably inserted to the guide slit 123 of the spring receiver 121. A coil spring 138 is disposed around the circumferential surface of the guide bar 137. The coil spring 138 is compressed between the second side wall 126*b* and the spring receiver 121. With this compression, the slider 118 is pressed toward the waiting position, and always held in the waiting position.

As shown in FIG. 15, the base 117 has an integral support piece 141 at the edge opposite the pedestal portion 130 of the slider 118. The support piece 141 extends upward, and extends along the back-to-front direction. A lock lever 143 is made of a synthetic resin material, and is supported in the support piece 141. The lock lever 143 locks the sliding of the slider 118. The lock lever 143 includes an operate block 144. An engaging slit 145 is formed in the operate block 144. The support piece 141 is slidably engaged in the engaging slit 145 in the back-to-front direction. A lock piece 146 is integrally formed in the operate block 144. The lock piece 146 confronts a lock wall 132*a* of the slider 118, when the slider 118 is slid to the waiting position.

According to the above structure, the lock lever 143 is slidably supported to the base 117 between a lock position wherein the lock piece 146 hooks to the lock wall 132*a* of the slider 118 and a release position wherein the lock piece 146 is released from the lock position. The sliding direction of the lock lever 143 and the sliding direction of the slider 118 are perpendicular to each other.

Figure 16:
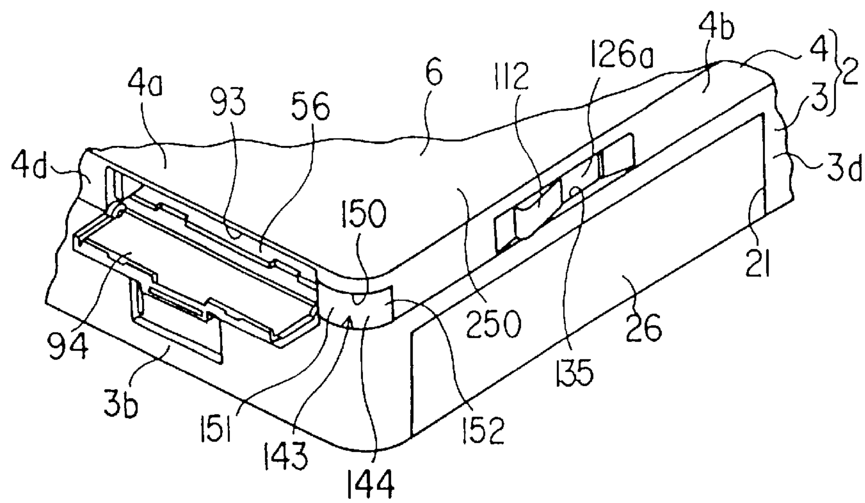
FIG. 16 is a perspective view showing the computer in a state wherein the lock lever is slid to the locking position.

As shown in FIG. 16, the operate block 144 is located at a corner portion defined by the front surface and left side surface of the front upper housing 6. An opening 150 for exposing the operate block 144 is formed in the corner portion. The opening 150 is opened between the front surface and left side surface of the front upper housing 6. The opening 150 is continuous with the card insertion slot 93. The operate block 144 includes a first surface 151 which is continuous with the left side surface of the front upper housing 6 and a second surface which is continuous with the front surface of the front upper housing 6. The first and second surfaces 151 and 152 are continuous with each other. The first and second surface 151 and 152 are continuous with the left and the front surfaces of the front upper housing 6, respectively, when the lock lever 143 is located in the lock position. The lock lever 143 forms part of the front upper housing 6.

Figure 17:
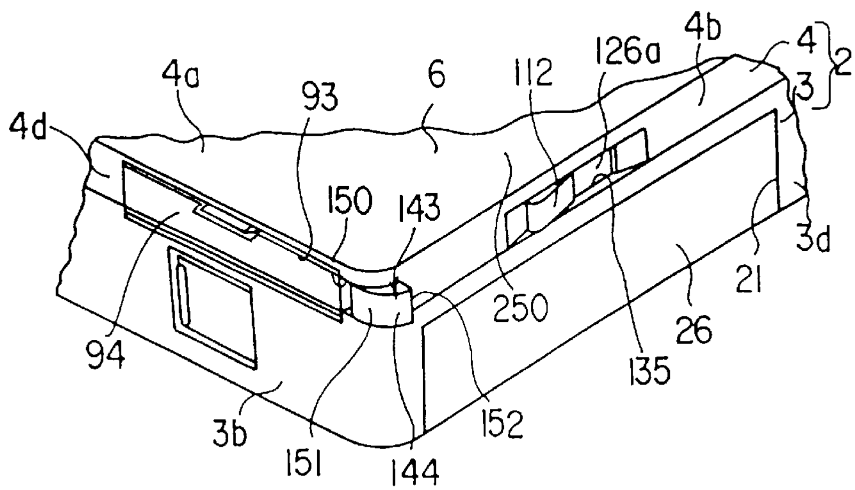
FIG. 17 is a perspective view showing the portable computer in a state wherein the lock lever is slid to the releasing position.

As shown in FIG. 17, the second surface 152 projects forward of the base unit 2 from the front surface of the front upper housing 6, when the lock lever 143 is slid in the release position.

As shown in FIG. 12, the operate portion 144 of the lock lever 143 has a metal stopper piece 155 in the end thereof adjacent to the card insertion slot 93. The stopper piece 155 projects into the card insertion slot 93, and opposite to the back end of the card-like electronic part inserted in the first card receptacle 91, when the lock lever 143 is slid in the lock position.

Figure 14:
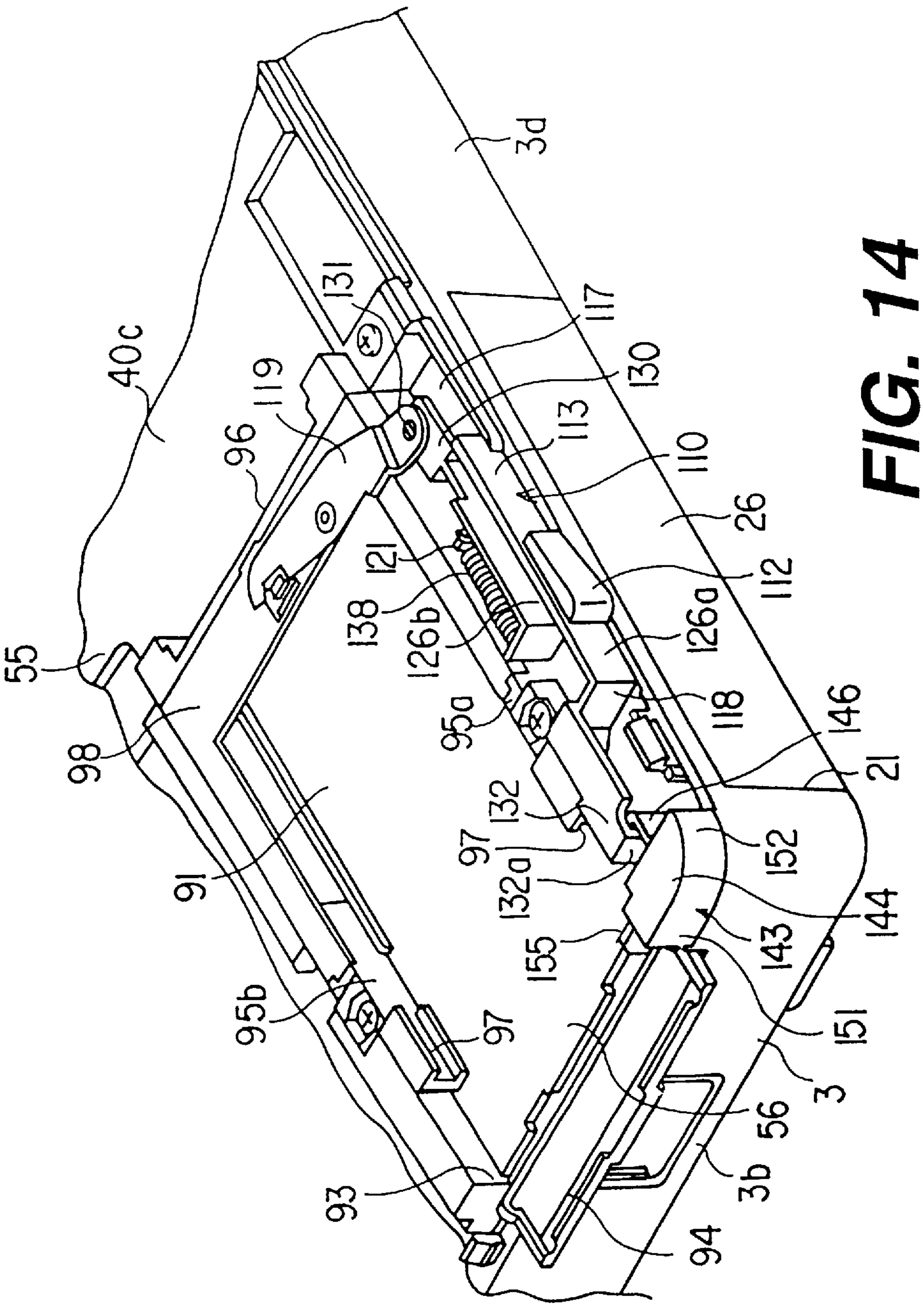
FIG. 14 is a perspective view showing the first card receptacle in a state wherein the lock lever has locked the ejector and slid to a locking position.

With the above structure, as shown in FIG. 14, in the position in which the card-like electronic part 92 is stored in the first card receptacle 91, when the lock lever 143 is slided in the lock position, the lock piece 146 is hooked to lock wall 132*a* of the slider 118. In this case, the lock piece 146 hooks from the perpendicular direction with respect to the slide direction of the slider 118 in the lock wall 132*a*. Therefore, the sliding movement of the slider 118 is restrained by the lock piece 146. Accordingly, while the first card-like electronic part 92 is connected to the first connector 96, the movement of the slider 118 is inhibited by the lock lever 143. Therefore, if the operation lever 112 is slided toward the pushing position by mistake, the lever 112 can't move. For this reason, the slider 118 and the slide plate 111 are kept in a hold state, and the lock lever 143 prevents the first card-like electronic part 92 and the first connector 96 from being broken by mistaken operation.

In addition, since the pushing pieces 115*a* and 115*b*, the connect portion between the slide plate 111 and the rotate lever 119 and the connect portion between the pedestal portion 130 and the rotate lever 119 do not receive excessive force from the lock lever 143, they are not broken by mistaken operation.

Furthermore, when the lock lever 143 is slid in the lock position, the stopper piece 155 projects into the card insertion slot 93, and opposes the rear end portion of the card-like electronic part 92. For this reason, the card-like electronic part 92 is held in the first card receptacle 91 by the stopper piece 155. Accordingly, the lock lever 143 prevents breaking of the ejector 110 and the card-like electronic part 92.

For removing the card-like electronic part 92 which is stored in the first receptacle portion 91, first, the lock lever 143 is slid toward the release position, and the lock of the slider 118 is released. Second, the operation lever 112 is slid from the waiting position to the pushing position. Thereupon, as shown in FIG. 12 by an arrow, the rotate lever 119 is rotated counterlockwise, and the slide plate 111 is slid toward the card-like electronic part 92. With this sliding, the card-like electronic part 92 is pushed by the pushing pieces 115*a* and 115*b* so that the card-like electronic part 92 separates from the first connector 96.

As a result, the end portion of the card-like electrical part 92 is projected outward of the base unit 2 from the card insertion slot 93. For this reason, the card-like electronic part 92 can be removed from the first card receptacle 91.

As shown in FIG. 17, the lock lever 143 is slid to the release position, the second surface 152 of the lock lever 143 projects forward of the corner portion of the front upper housing 6. Therefore, since the second surface 152 of the lock lever 143 is not continuous with the front surface of the front upper housing 6, the operator can know from the front of the base unit 2 a state of whether the operation lever 112 is locked or unlocked.

In this case, since the lock lever 143 projects forward of the front upper housing 6, the lock lever 143 does not need a special space for allowing the slide movement of the lock lever 143 inside of the base unit 2, and the size of the computer 1 can be decreased.

In addition, the lock lever 143 which locks the operation lever 112 is supported on the base 117 of the link mechanism 113, and the lock lever 143 and the link mechanism 113 can be assembled as one unit. Accordingly, the lock lever 143 and the link mechanism 113 can be mounted in the lower housing 3*a* once, and the computer 1 can be easily assembled.

As shown in FIG. 1, a display unit 161 is supported on the base unit 2. The display unit 161 includes a box-like housing 162 and a liquid crystal display (LCD) 163 located inside of the housing 162. The housing 162 includes a front housing 164 and a rear housing 165. The front housing 164 has a display window 166 through which is exposed the LCD 163.

The housing 162 includes a first leg portion 168 and a second leg portion 169. The first and second leg portions 168 and 169 respectively have a front portion 170 which is continuous with the front housing 164 and a rear portion 171 which is continuous with the rear housing 165. The first and second leg portions 168 and 169 are arranged in a position corresponding to the leg mounting portions 17*a* and 17*b*, respectively. The first and second leg portions 168 and 169 respectively have left and right side surfaces 175*a* and 175*b* facing to the first and second leg mounting portions 17*a* and 17*b*, respectively. Openings 176 (FIG. 20) are opened in the left side surface 175*a* of the first leg portion 168 and the right side surface 175*b* of the second leg portion, respectively. The openings 176 are continuous with the side openings 19*a* of the leg mounting portions 17*a* and 17*b*.

Figure 20:
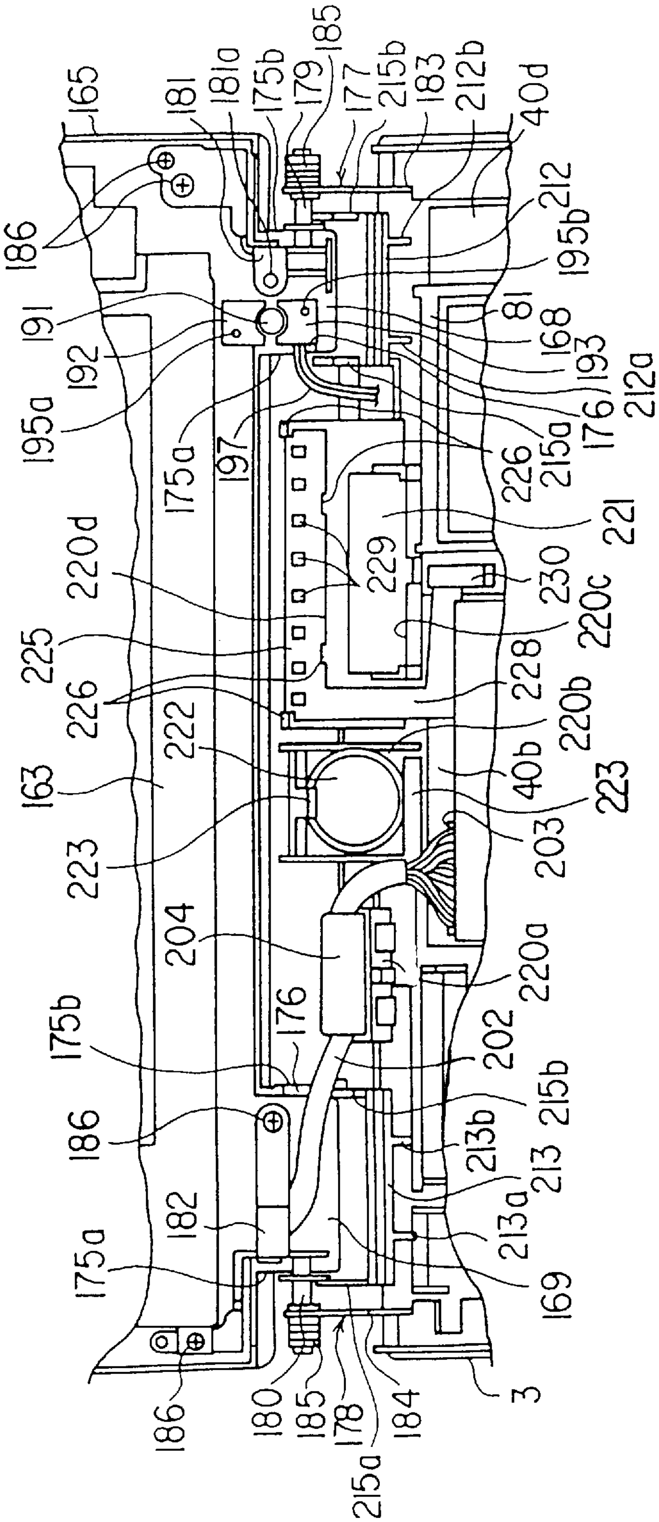
FIG. 20 is a front view showing a state wherein a plurality of functional components are supported on a holder.

As shown in FIG. 20, the first and second leg portions 168 and 169 are supported on the lower housing 3 via first and second hinge devices 177 and 178. The hinge devices 177 and 178 include hinge shafts 179 and 180, first brackets 181 and 182 fixed continuous with one end of the hinge shafts 179 and 180, second brackets 183 and 184 rotatably fixed continuously with another end of the hinge shafts 179 and 180 and a plurality of spring washers 185 which restrain pivoting of the hinge shafts 179 and 180, respectively.

The hinge devices 177 and 178 are arranged in the right side of the first leg portion 168 and the left side of the second leg portion 169, respectively. The hinge devices 179 and 180 are disposed between the leg mounting portions 17*a* and 17*b* and the leg portions 168 and 169, respectively. For this reason, the hinge shafts 179 and 180 are passed through the openings 175*a* and 175*b* of the outer sides of the leg portions 168 and 169 and the side surface 19 of the leg mounting portions 17*a* and 17*b*. One end of each hinge shaft 179 and 180 is inserted into the leg portions 168 and 169, respectively. The first brackets 181 and 182 are fixed on an inner surface of the rear housing 165 and an inner surface of the rear portion 171 via screws 186, respectively. The second brackets 183 and 184 are fixed on the bottom wall 3*a* of the lower housing 3 with the first PCB 40*a* via screws (not shown), respectively.

Figure 2:
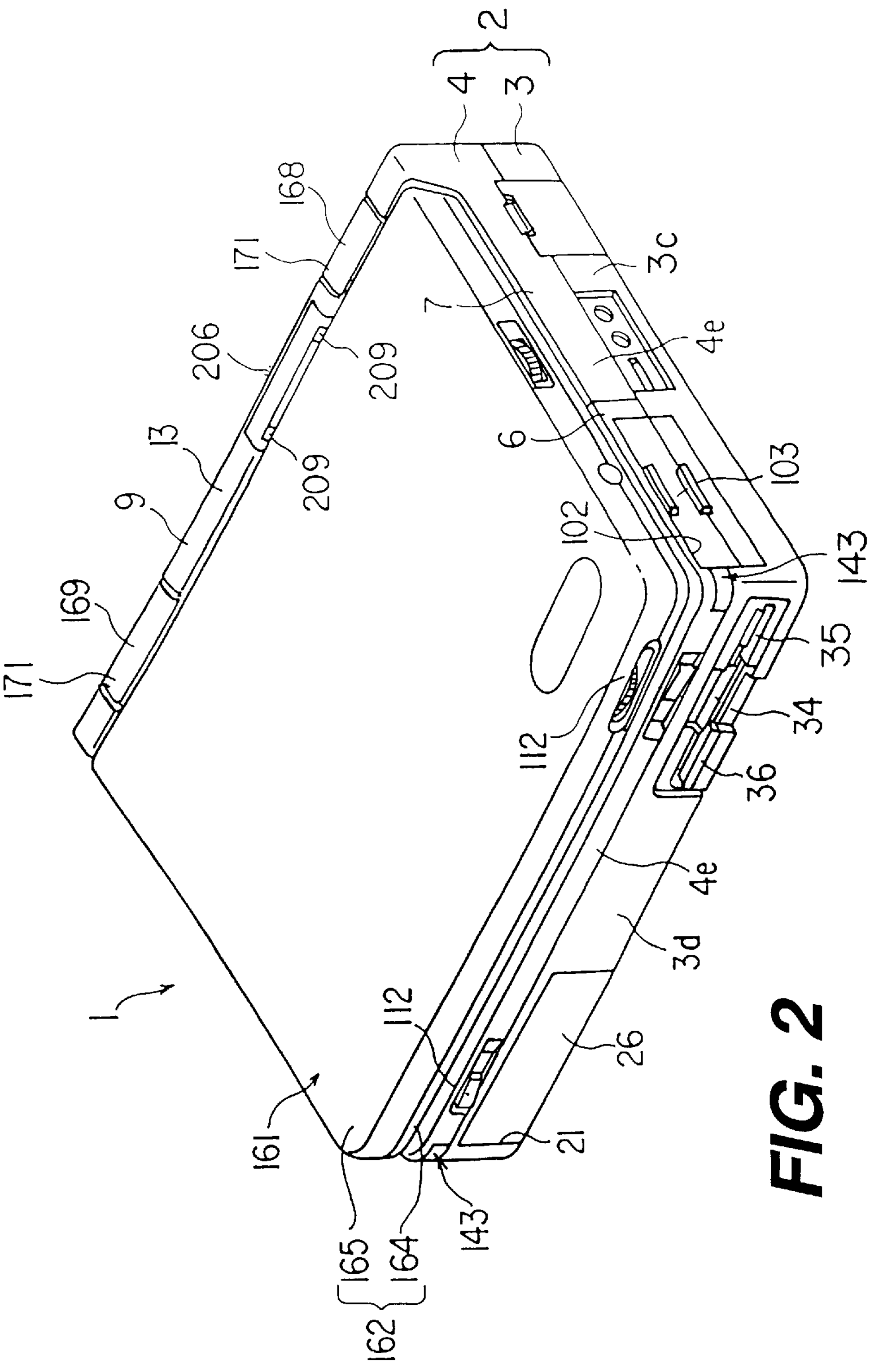
FIG. 2 is a perspective view showing the computer while the display unit is closed.

For this reason, as shown in FIG. 2, the display unit 161 is rotatably mounted on the base unit 2 between a first position wherein it covers the base unit 2, a second position wherein it is positioned up right behind the keyboard mounting portion 8 and a third position wherein the display unit 161 is tilted approximately horizontally. When the display unit 161 is rotated to the first position, an outer surface of the housing 162 is continuous with the front, left and right side surfaces and the upper surface of the ridge portion 9.

Figure 19:
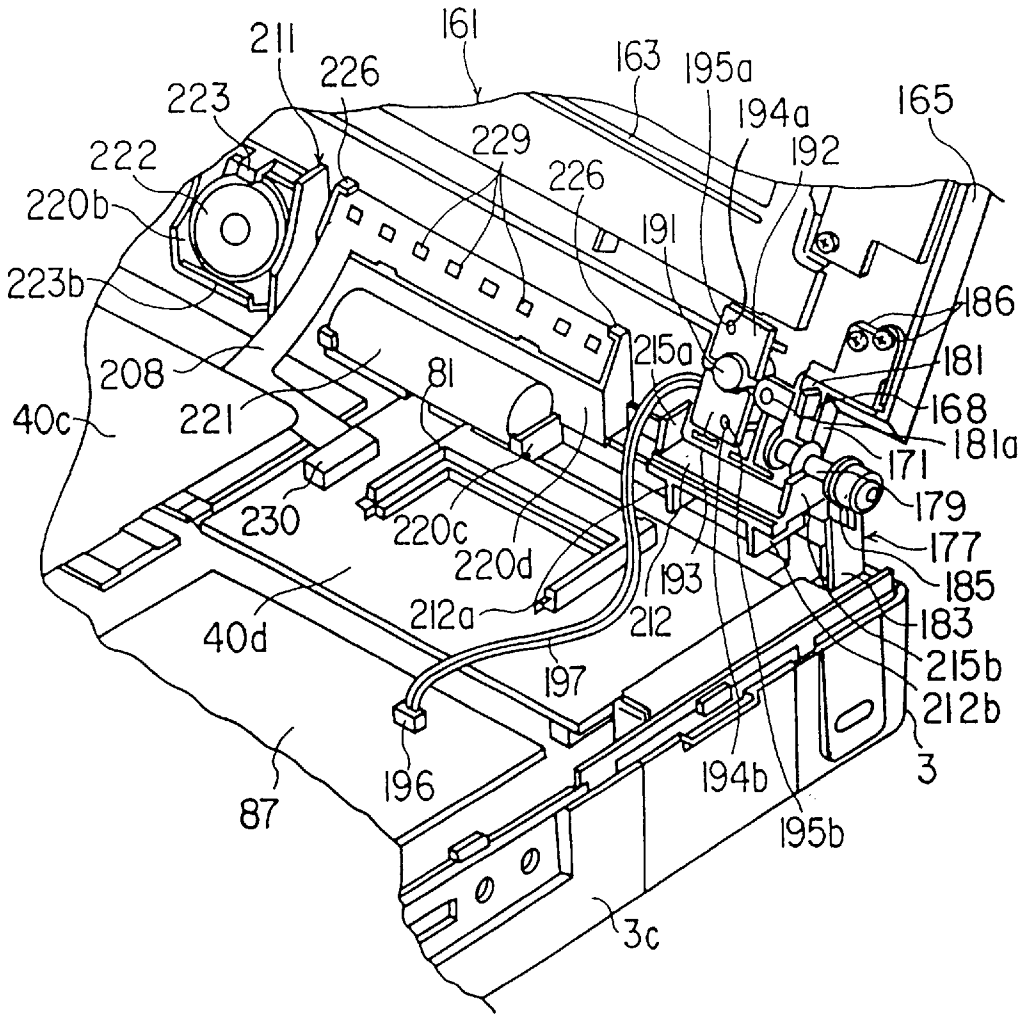
FIG. 19 is a perspective view showing a routing of a cable connected to the microphone.

As shown in FIGS. 19 and 20, the first leg portion 181 has a left half area and a right half area therein. The first hinge device 177 is disposed in the right half area. A cylindrical microphone 191 is disposed in the left half area. The microphone 191 is provided for collecting sounds such as the voice of an operator, and supported in a holder 192 made of a synthetic resin material. The holder 192 has a wall portion 193. The wall portion 193 faces the inner surface of the rear portion 171. The wall portion 193 has a pair of engaging holes 194*a* and 194*b*. The rear portion 171 has a pair of engaging projections 195*a* and 195*b*. The holder 192 is fixed in the left half area, the engaging projections 195*a* and 195*b* are inserted in the engaging holes 194*a* and 194*b*. For this reason, the microphone 191 is supported inside the rear portion 171.

Figure 18:
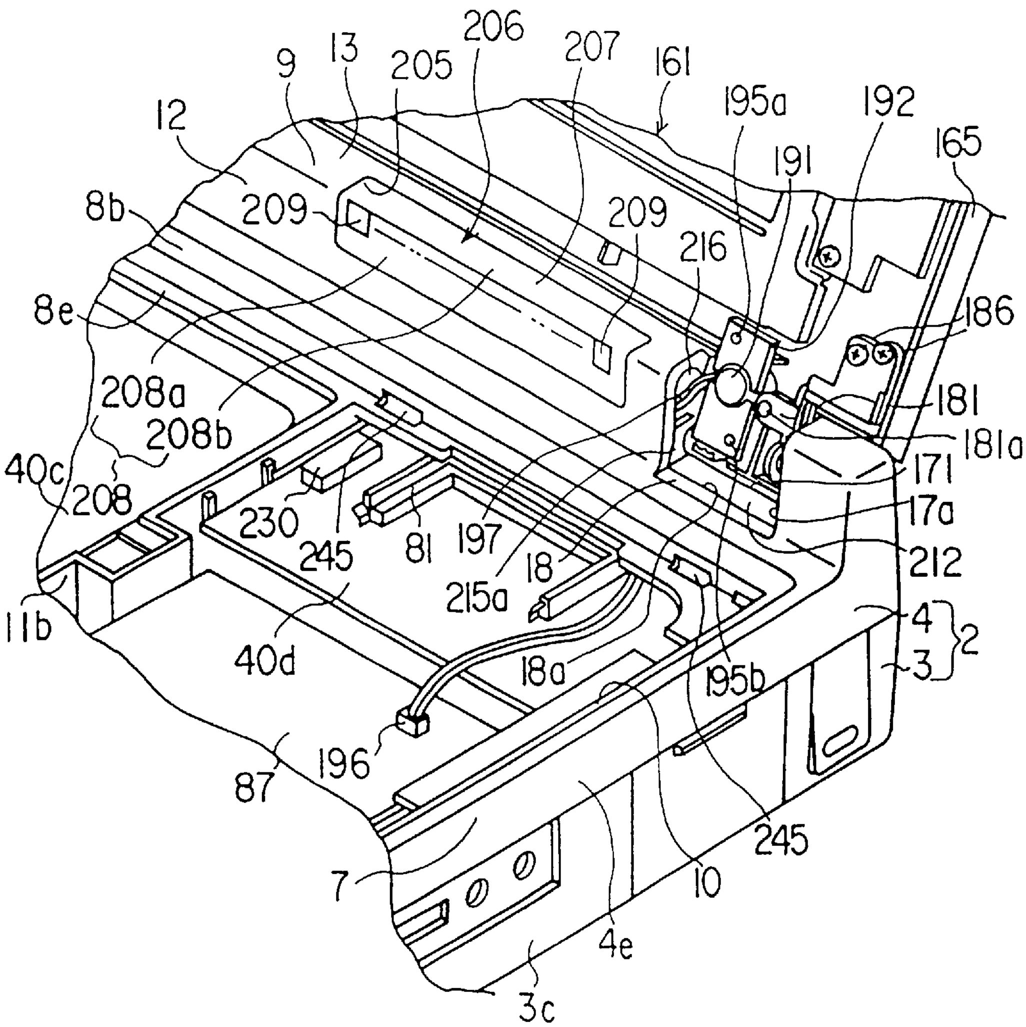
FIG. 18 is a perspective view showing a state wherein a microphone is mounted in a first pivotal leg portion.

As shown in FIGS. 18 and 19, the first bracket 181 has a screw hole 181*a* The screw hole 181*a* is located to the right side of the microphone 191. A cable 197 is connected to the microphone 191. One end of the cable 197 is connected to a connector 196. The cable 197 passes inside of the base unit 2 via the left side opening 176 of the first leg portion 168 and the side opening 19*a* of the leg mounting portion 17*a* The cable 197 passes from the microphone 191 to the fifth PCB 87 above the first PCB 40*a* in the base unit 2. The connector 196 is connected to the fifth PCB 87. The microphone 191 is electrically connected to the fifth PCB 87.

Figure 22:
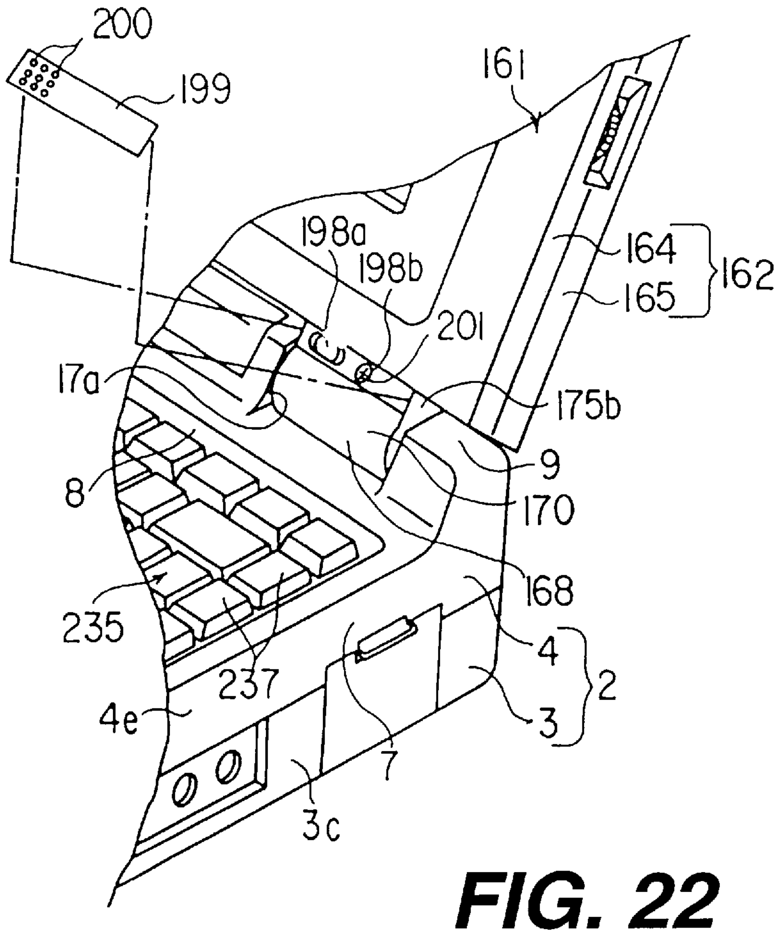
FIG. 22 is a perspective view showing a connecting portion between the computer and the display unit.
Figure 23:
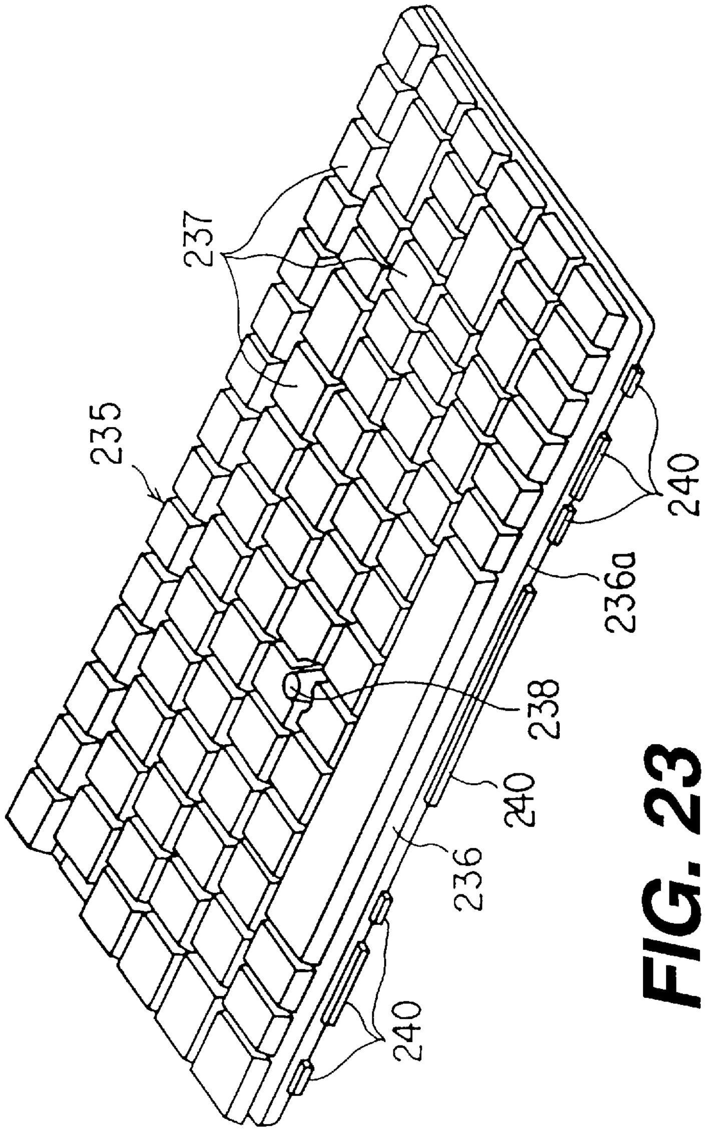
FIG. 23 is a perspective view showing a keyboard unit.

As shown in FIG. 22, the front portion 171 of the first leg portion 168 has first and second holes 198*a* and 198*b*. The first and second holes 198*a* and 198*b* are opened at intervals in the lateral direction of the front portion 170. The first hole 198*a* faces the microphone 191. The second hole 198*b* faces to the screw hole 181*a* of the first bracket 181. As shown in FIG. 22, a screw 201 is screwed into the rear portion 171 via the second hole 198*b* and the screw hole 181*a*. Accordingly, the front portion 170 of the first leg portion 168 is fixed to the rear portion 171 of the first leg portion 168 via the screw 201. A panel cover 199 is disposed on the front surface of the front portion 170. The panel cover 199 covers the first and second holes 198*a* and 198*b* and the head portion of the screw 201. The panel cover 199 has a plurality of small holes 200. The small holes 200 are located on a portion corresponding to the first hole 198*a*.

As shown in FIG. 18, when the display unit 161 is rotated to the second position, the first and second leg portions are erected with respect to the base unit 2. Accordingly, the microphone 191 face to the operator via the fist hole 198*a* and the small holes 200.

With this structure, the microphone 191 is located in a propagation direction of the voice of the operator. The voice of the operator can be certainly and efficiently picked up by the microphone 191. In addition, the microphone 191 is separated from the base unit which may be mounted on a desk, and is located above of the desk. For example, if the desk is hit by the operator, the microphone 191 will not collected noise from the desk.

Furthermore, with above structure, the first leg portion 168 is mounted on the first leg mounting portion 17*a* of the base unit 2. The opening 176 of left side surface 175*a* of the first leg portion 168 is continuous with the side opening 19*a* of the first leg mounting portion 17*a*. Accordingly, as shown in FIG. 18, the cable 197 which is connected to the microphone 191 can pass inside of the base unit 2 from inside of the first leg portion 168 to the opening 176 and the side opening 19*a*. The cable 197 is easily passed. A length of the cable 197 can be reduced, the outer appearance of the computer 1 is improved, and a special cover for covering the cable 197 is not required.

In addition, since only the first bracket 181 which supports one end of the hinge shaft 179 is disposed inside of the first leg portion 168, a gap is formed in the left side portion of the first bracket 181. The microphone 191 can be mounted at the gap.

Accordingly, the housing 162 does not require provide a special space for mounting the microphone 191. Since the holder 192 is engaged in the engaging projections 195*a* and 195*b* of the inner surface of the rear portion 171, the microphone 191 is supported on the first leg portion 168. Accordingly, the microphone 191 can be mounted on the first leg portion .168 without special screws, and the computer 1 can be more easily assembled.

As shown in FIG. 20, a cable 202 passes inside of the second leg portion 169. The cable 202 is connected to the LCD 163. This cable 202 passes inside of the ridge portion 9 via the hole 176 of the second leg portion 169 and the side opening 19*a* of the second leg mounting portion 17*b*. The cable 202 passes from the inside of the ridge portion 9 to the upper surface of the second PCB 40*b*. A connector 203 connected to the end portion of the cable 202 is electrically connected to the second PCB 40*b*. A cylindrical core 204 is arranged inside of the ridge portion 9. The cable 202 passes via the core 204.

As shown in FIGS. 3 and 18, the ridge portion 9 has an icon display mounting port 205. The icon display mounting portion 205 opens on this inner side of the ridge portion 9. The icon display 206 is disposed on the icon display mounting port 205. The icon display 206 is disposed between the first leg mounting portion 17*a* and second leg mounting portion 17*b*. The icon display 206 includes an icon panel 207, and the icon panel 207 is formed of a synthetic resin-material. The icon panel 207 is fixed to the icon mounting portion 205 by means of an adhesive or the like. The icon panel 207 has display surface 208 exposed outward of the ridge portion 9. The display surface 208 includes a first surface 208*a* which is continuous with the front surface of the ridge portion 9 on substantially the same plane and a second surface 208*b* which is continuous with the upper surface 13 of the ridge portion 9 on substantially the same plane. The first surface 208*a* is continuous with the second surface 208*b*. The display surface 208 has a plurality of display portions 209 for displaying an operation state and function of the computer 1 in graphic patterns. The display portions 209 are disposed at intervals in the lateral direction of the ridge portion 9. The display portions 209 extend between the first surface 208*a* and the second surface 208*b*. As shown in FIG. 2, the upper surface 13 of the ridge portion 9 and the display portions 209 are exposed upward of the computer 1, when the display unit 161 is rotated between the opened position and the closed position.

As shown in FIG. 3, a holder 211 is disposed between the ridge portion 9 of the upper housing 9 and the rear end portion of the lower housing 3. The holder 211 including a first cover 212, a second cover 213 and a holder portion 214 linking between the first and second covers 212 and 213, the first and second covers 212 and 213 and the holder portion 214 are integrally formed by using a synthetic resin material. The covers 212 and 213 cover the bottom openings 18*a* of the first and second leg mounting portions 17*a* and 17*b* on the inner side of the upper housing 4, respectively. The covers 212 and 213 are continuous with the upper surface of the upper housing 4 on substantially-the same plane, respectively. The covers 212 and 213 have a pair of side walls 215*a* and 215*b* which extend upward from left and right side portions of the covers 212 and 213, respectively. The side walls 215*a* and 215*b* are engaged to the side openings 19*a* of the first and second leg mounting portions 17*a* and 17*b*, respectively. The side walls 215*a* and 215*b* cooperate with the side openings 19*a* to form cable through holes 216 for the cables 187 and 202 in the side surface 19, respectively (see to FIG. 8).

Bottom surfaces of the covers 212 and 213 each have a pair of positioning projections 212*a*, 212*b*, 213*a*, and 213*b* extending downward from the bottom surface of the covers 212 and 213, respectively.

As shown in FIG. 7, a rear end portion of the covers 212 and 213 have rear end walls 217 and 218 extending downward from the rear end portion of the covers 212 and 213, respectively. The rear end walls 217 and 218 are continuous with the positioning projections 212*a*, 212*b*, 213*a* and 213*b*, respectively.

Figure 21:
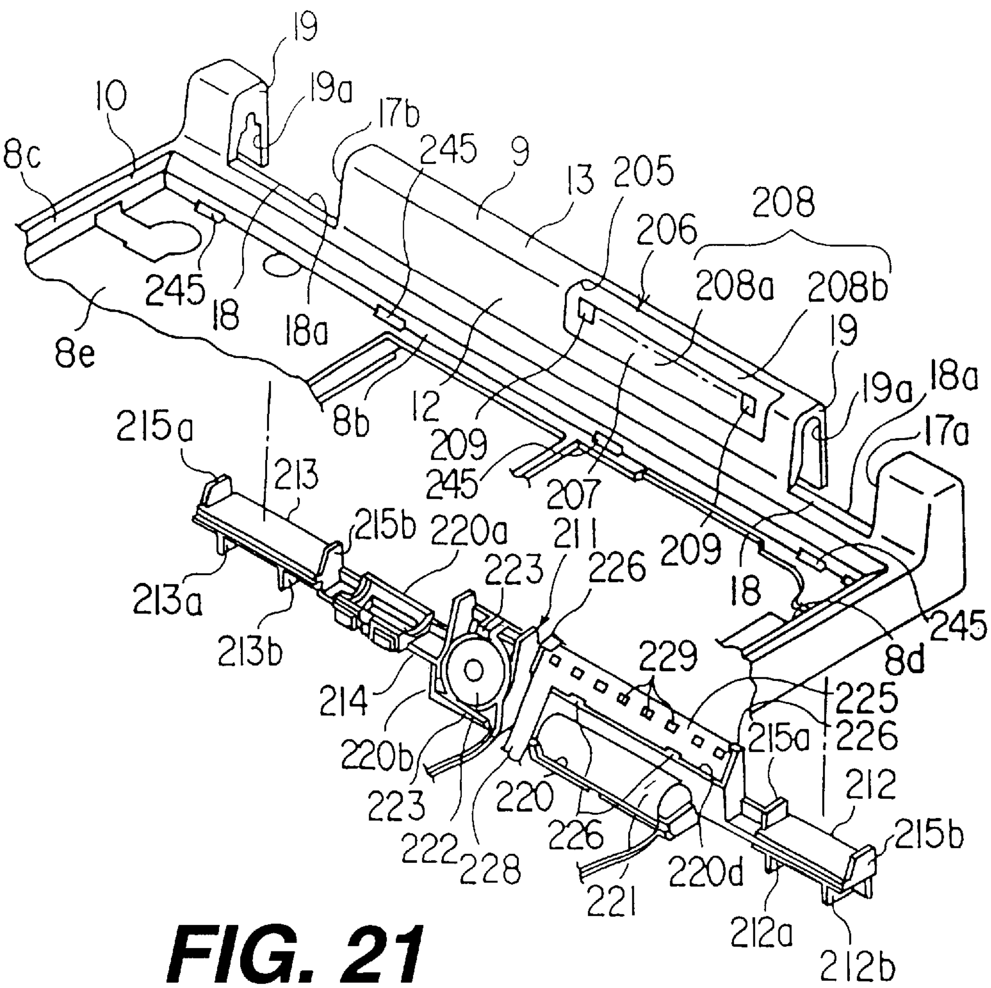
FIG. 21 is a perspective view showing the relationship between an upper housing and the holder.

As shown in FIG. 21, the holder portion 214 of the holder 211 has a first receiving portion 220*a*, a second receiving portion 220*b*, a third receiving portion 220*c* and a fourth receiving portion 220*d*. The first, second and third receiving portions 220*a*, 220*b* and 220*c* are located side by side between the first and second covers 212 and 213, the fourth receiving portion 220*d* is located on the back of the third receiving portion 220*c*.

As shown in FIGS. 3 and 7, the holder 211 is located up on the upper surface of the flange 50*a* of the connector panel 44. In this case, the positioning projections 212*a*, 212*b*, 213*a* and 213*b* are inserted into a plurality of slits of the flange 50*a* , respectively (slits are not shown).

Accordingly, the holder 211 extends between the left and right sides of the lower housing 3.

As shown in FIG. 7, the rear end portions 217,218 of the covers 212, 213 cover the rear surface of the wall 50*b* which is continuous with the flange 50*a*. Accordingly, the holder 211 take up front and back position respect to the lower housing 3. The first and second covers 212,213 of the holder 211 engage the first and second leg mounting portions 17*a*,17*b* of the upper housing 4, when the rear portion of the upper housing is fixed to the lower housing.

In this case, the side walls 215*a*, 215*b* of the first and second covers 212, 213 engage the side openings 19*a* of the first and second leg mounting portions 17*a*, 17*b*, respectively. The first and second covers 212, 213 are disposed between the connector panel 44 and rear upper housing 7 of the upper housing 4, respectively. The holder portion 214 is disposed in the lower position of the ridge portion 9.

As shown in FIG. 3, a receptacle space 219 is formed between the holder portion 214 and the inner surface of the ridge portion 9. The receptacle space 219 is located between the first leg mounting portion and the second leg mounting portions 17*a*, 17*b*. The first, second, third and fourth receiving portions 220*a*, 220*b*, 220*c* and 220*d* are located in the receptacle section.

As shown in FIGS. 20 and 21, the cylindrical core 204 for the cable 202, a sub-battery 221 for setting a resume function and a disk-type speaker 222 are disposed on the receiving portions 220*a*, 220*c* and 220*b*, respectively. The first and third receiving portions 220*a* and 220*c* open upward, holding to the core 204 and the sub-battery 221. The second receiving portion 220*b* which holds the speaker 222, has a plurality of engaging pieces 223. The engaging pieces 223 are integrally formed by using a synthetic resin material. The speaker 222 is detachably held by the engaging pieces 223. The speaker 222 is held in a substantially vertical posture with respect to the second receiving portion 220*b*.

As shown in FIG. 3, the fourth receiving portion 220*d* is disposed in the lower position of the icon panel 207. A diode board 225 is held in the fourth receiving portion 220*d*. The fourth receiving portion 220*d* has a plurality of engaging pieces 226. The peripheral portion of the diode board 225 is detachably held by the engaging pieces 226. The diode board 225 is held in a substantially vertical posture with respect to the fourth receiving portion 220*d*. The front surface of the diode board 225 is adjacent to the icon panel 207. A flexible wiring board 228 is provided on the front surface of the diode board 225. A plurality of light-emitting diodes 229 are disposed at intervals in the lateral direction of the flexible wiring board 228. The light-emitting diodes 229 serve as light sources for the icon display 206 and are disposed at positions opposite to the display portions 209 of the icon panel 207, respectively.

According to the above structure, when the light-emitting diodes (LED) 229 emit light, the corresponding display portions 209 are lit on to display the contents of the operation state and function of the computer 1.

In this embodiment, a diffusion sheet (not shown) is bonded to the surface of the icon panel 207 which confronts the light-emitting diodes 229. Owing to the presence of the diffusion sheet, each display portion 209 does not output light locally but outputs light uniformly through the display portion 209.

As shown in FIGS. 19 and 20, the flexible wiring board 228 is connected to the relay connector 230. According to the external holder 211 described above, the first and second covers 212 and 213 cover the bottom openings 18*a* of the first and second leg mounting portions 17*a* and 17*b*, when the holder 211 is disposed on the lower housing 3, and the upper housing 4 is connected to the lower housing 3.

For this reason, the first and second covers 212 and 213 can be mounted in the base unit 2 at the same time, and the computer 1 can be easily assembled.

In addition, since the first and second covers 212 and 213 form one piece, the number of components of the computer 1 can be decreased.

In addition, since the receiving portion which links the first and second covers 212 and 213 has the first, second, third and fourth receiving portions which support a plurality of function components such as the sub-battery 221 and the speaker 222, such components can be easily mounted onto the holder 221 in a state which supports the components.

Accordingly, the function components can be easily mounted on the inner surface of the ridge portion 9 as compared with a case wherein the function components are mounted one by one on the inner surface of the ridge portion 9 via screws.

Furthermore, the computer 1 does not need a large number of screws which fix the function components and bosses which receive the screws. Therefore, the number of components of the computer 1 can be decreased, the inner structure of the ridge 9 can be simplified and the weight and cost of the computer 1 can be reduced.

The speaker 222 and the diode board 225 held on the third and fourth receiving portions 220*c* and 220*d* via the engaging pieces 223 and 226, the sub-battery 221 and the core 204 of the cable 202 are held on the first and second receiving portions 220*a* and 220*b*, respectively. Therefore, the function components can be held on the holder 211 without using screws, and can be high densely disposed on the receptacle space 219.

In addition, since the first and second hinge devices 177 and 178 which support the display unit 161 are disposed in the left and right side portions of the first and second leg mounting portions 17*a* and 17*b*, respectively, the function components need not be attached to the hinge devices 177 and 178. Therefore, the function components can be easily stored in the receptacle space 219.

As shown in FIG. 1, a keyboard 235 for inputting data or commands, is detachably mounted in the keyboard mounting portion 8 of the upper housing 4. The keyboard 235 has a keyboard panel 236. The keyboard panel 236 has a flat, rectangular, plate-like shape which can be fitted in the keyboard mounting portion 8. The keyboard panel 235 is mounted on the bottom surface 8*e*. A large number of keys 237 and a joy stick 238 as a kind of pointing device are disposed on the upper surface of the keyboard panel 236.

The keyboard panel 236 has a front edge portion 236*a* along the front side wall 8*a* of the keyboard mounting portion 8 and a rear edge portion 236*b* along the rear side wall 8*b* of the keyboard mounting portion 8. A plurality of engaging pieces 240 as the first engaging portions extend from the front edge portion 236*a* of the keyboard panel 236. The engaging pieces 240 are disposed at intervals in the lateral direction of the keyboard panel 236. A plurality of engaging pieces 241 as the second engaging portions extend from the rear edge portion 236*b* of the keyboard panel 236. The engaging pieces 241 are disposed at intervals in the lateral direction of the keyboard panel 236.

Figure 25:
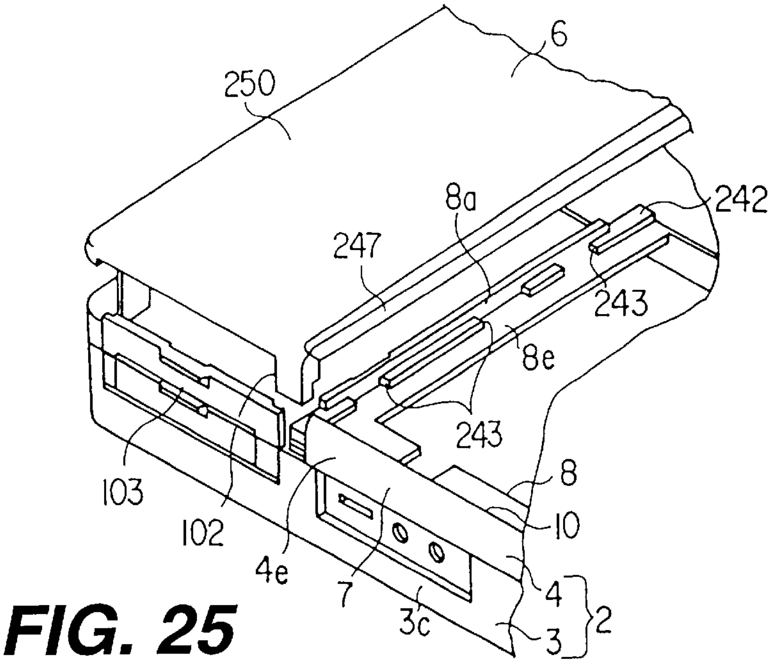
FIG. 25 is a perspective view showing a state wherein a front portion of an upper housing is removed from a lower housing.
Figure 26:
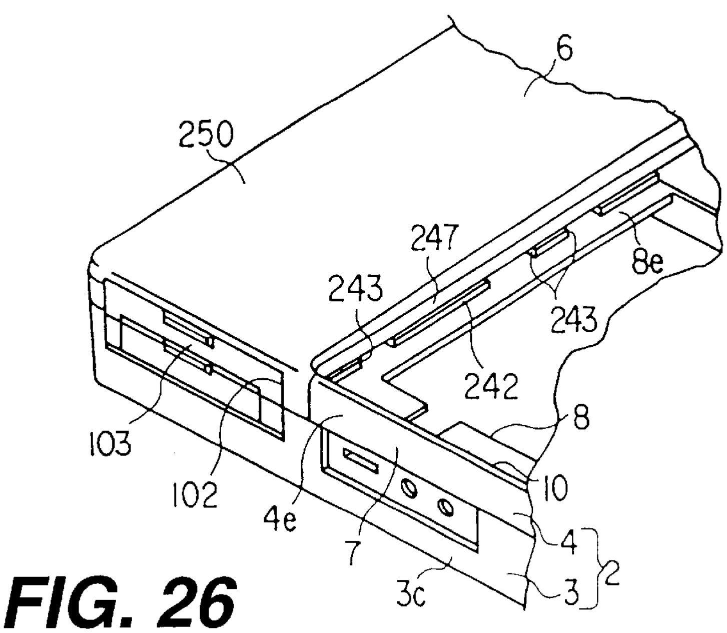
FIG. 26 is a perspective view showing a state wherein a front portion of the upper housing is mounted on the lower housing.

As shown in FIG. 25, a pedestal portion 242 as a rib shape, is disposed at a corner portion defined by the front side wall 8*a* and the bottom surface 8*e* of the keyboard mounting portion 8. The width of the pedestal portion 242 is approximately same as the width of the keyboard mounting portion 8. The pedestal portion 242 has a plurality of engaging recesses 243. The engaging recesses 243 are disposed at intervals in the lateral direction of the pedestal portion 242. The engaging recesses 243 are continuous with an upper surface and a rear surface of the pedestal portion 242. The first engaging pieces 240 are inserted into the engaging recesses 243, respectively, when the keyboard 235 is mounted on the keyboard mounting portion 8. The upper surface of the first engaging pieces 240 are continuous with the upper surface of the pedestal portion 242 on the same plane.

Figure 24:
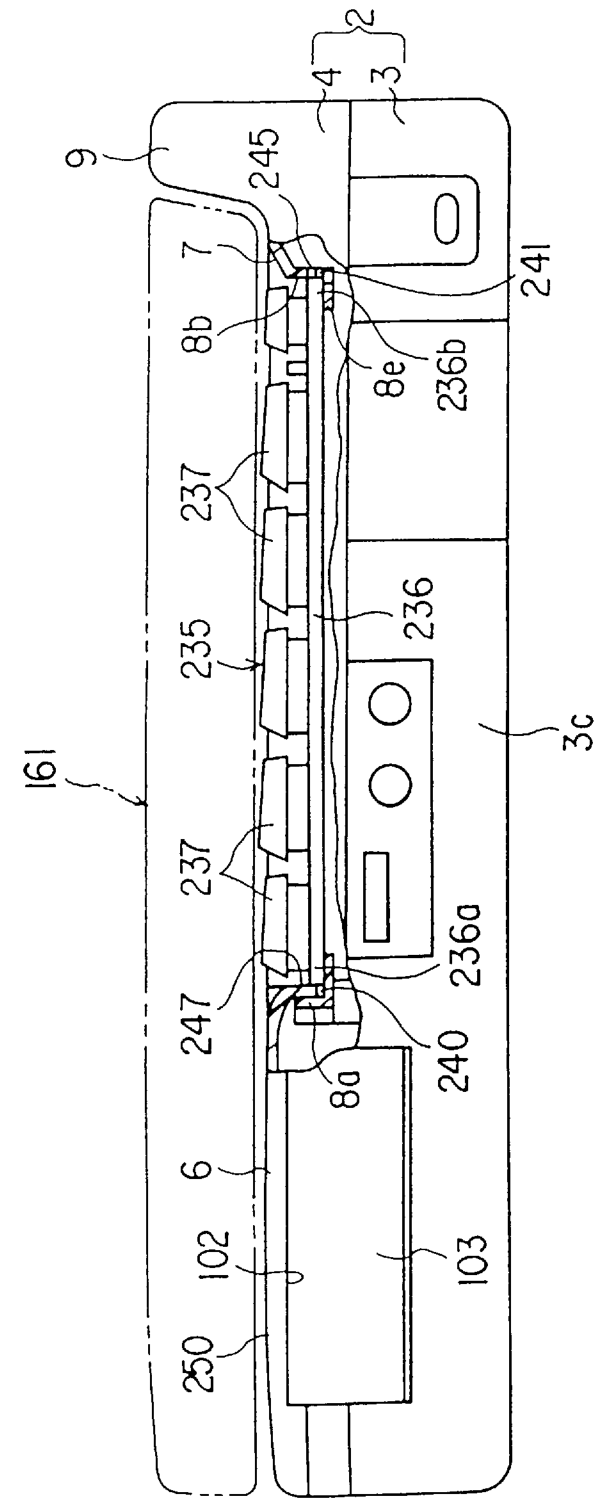
FIG. 24 is a partially cutaway side view showing a keyboard mount portion of the computer.

As shown in FIGS. 21 and 24, a plurality of engaging ports 245 are provided at a corner portion defined by the side wall 8*b* and the bottom wall 8*e* of the rear portion of the keyboard mounting portion 8. The engaging ports 245 are disposed at intervals in the lateral direction of the corner portion. The second engaging pieces 241 of the keyboard panel 236 are insertable into the engaging ports 245, respectively.

The front upper housing 6 of the upper housing 4 has a lamp wall 247 in the front edge which is continuous with the keyboard mounting portion 8. A width of the clamp wall 247 is approximately the same as a width of the front upper housing 6. As shown in FIG. 24, when the front upper housing 6 is fixed on the lower housing 3, the under edge of the clamp wall 247 is attached to the front side wall 8*a* of the keyboard mounting portion 8 and the upper surface of the pedestal portion 242.

The front upper housing 6 is located in front of the keyboard 235. An upper surface of the front upper housing 6 serves as a flat hand rest portion 250. The hand rest portion 250 allows an operator to put his/her hands thereon during an input operation. A pair of operation buttons 251*a* and 251*b* are arranged in a row on the central portion of the hand rest portion of the front upper housing 6. The operation buttons 251*a* and 251*b* arranged in the front-to-back direction for cancel and execute commands displayed on the LCD 163, and are respectively pressed by a finger tip of the operator.

The keyboard 235 is mounted in the keyboard mounting portion 8 according to the following procedure.

The rear upper housing 7 of the upper housing 4 mounts on the lower housing 3, and the front upper housing 6 releases from the lower housing 3, before the mounting of the keyboard.

In the state of the above arrangement, keyboard 235 is mounted on the keyboard mounting portion 8.

Figure 27:
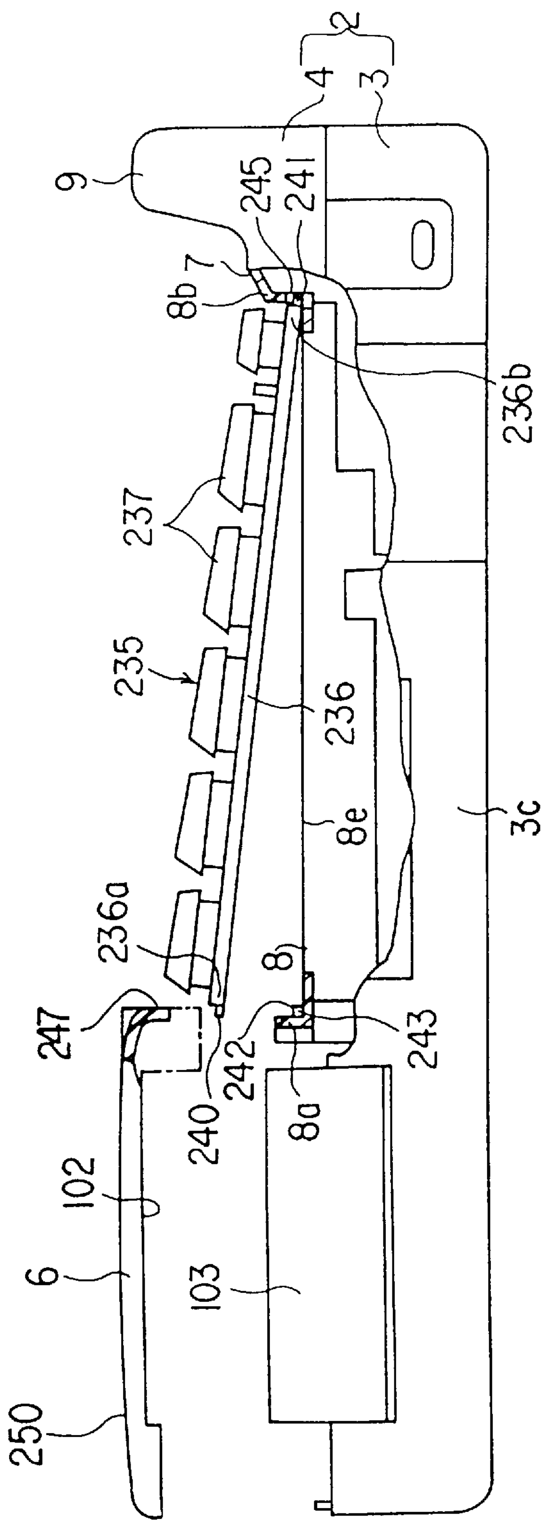
FIG. 27 is a side view showing a state wherein the keyboard is mounted on the base unit.

As shown in FIG. 27, the keyboard 235 is obliquely inserted downward into the keyboard mounting portion 8 with the rear edge portion of the keyboard panel 236 being the leading end. With this insertion, the second engaging pieces 241 are hooked with the engaging ports 245 first.

Subsequently, the keyboard 235 is pivoted downward about the hooking portions between the second engaging pieces 241 and the engaging ports 245 to fit the keyboard panel 236 on the bottom wall 8*e* of the keyboard mounting portion 8.

With this pivot, the first engaging pieces 240 of the keyboard panel 236 are engaged in the engaging recesses 243 of the keyboard mounting portion 8.

Subsequently, the front upper housing 6 of the upper housing 4 is mounted on the lower housing 3. The top of the clamp wall 247 of the front upper housing 6 is attached to the rear surface of the side wall 8*a*, the top surfaces of the pedestal portion 242 and the first engaging pieces 240. In this condition, the first engaging pieces 240 are clamped between the clamp wall 247 and the bottom wall 8*e* of the keyboard mounting portion 8.

When the keyboard 235 is completely mounted in the keyboard mounting portion 8 in this manner, the front upper housing 6 mounts on the front portion of the lower housing 3. The front upper housing 6 is fixed to the lower housing 3 and rear upper housing 7 via screws (not shown). The front and rear edges of the keyboard 235 are supported in the front and rear sides 8*a* and 8*b* of the keyboard mounting portion 8.

With this structure, since the keyboard 235 is supported in the mounting portion 8 by hooking the front and rear edges 236*a* and 236*b* of the keyboard 235 in the front and rear side walls 8*a* and 8*b* of the keyboard mounting portion 8, in the mounting of the keyboard 235, screws are not need. Therefore, the number of components of the computer 1 can be decreased. Since boss portions for receiving screws are not needed, the structure of the base unit can be simplified.

Also, since a screwing operation is not needed to mount the keyboard 235 in the keyboard mounting portion 8, the keyboard 235 can be mounted, and the computer 1 can be easily assembled.

In addition, in this embodiment, the engaging recess 343 in which the first engaging piece 240 of the keyboard panel 236 is engaged is formed at the corner portion defined by the front side wall 8*a* and the bottom wall 8*e* of the keyboard mounting portion 8. Therefore, keyboard panel 236 is positioned in the left and right direction with respect to the keyboard mounting portion 8, and can be prevented to separating from the keyboard mounting portion 8 and to inclining of the keyboard 235.

The portable electronic apparatus is not only defined with respect to a note or book type portable computer but also can be constructed as a note or book type portable word processor.

Figure 28:
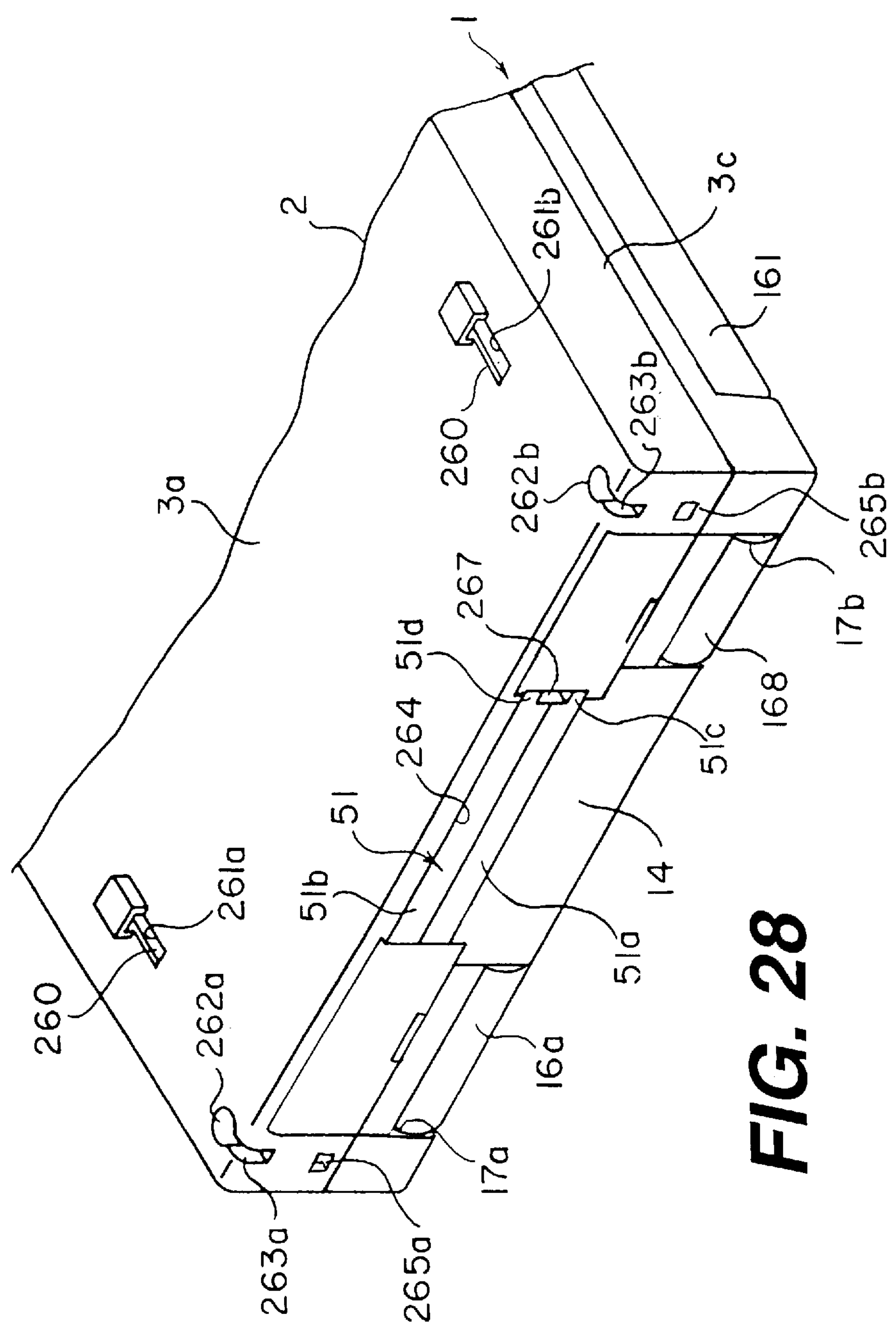
FIG. 28 is a perspective view showing the rear end portion of the computer when viewed from the bottom side of the computer.
Figure 49:
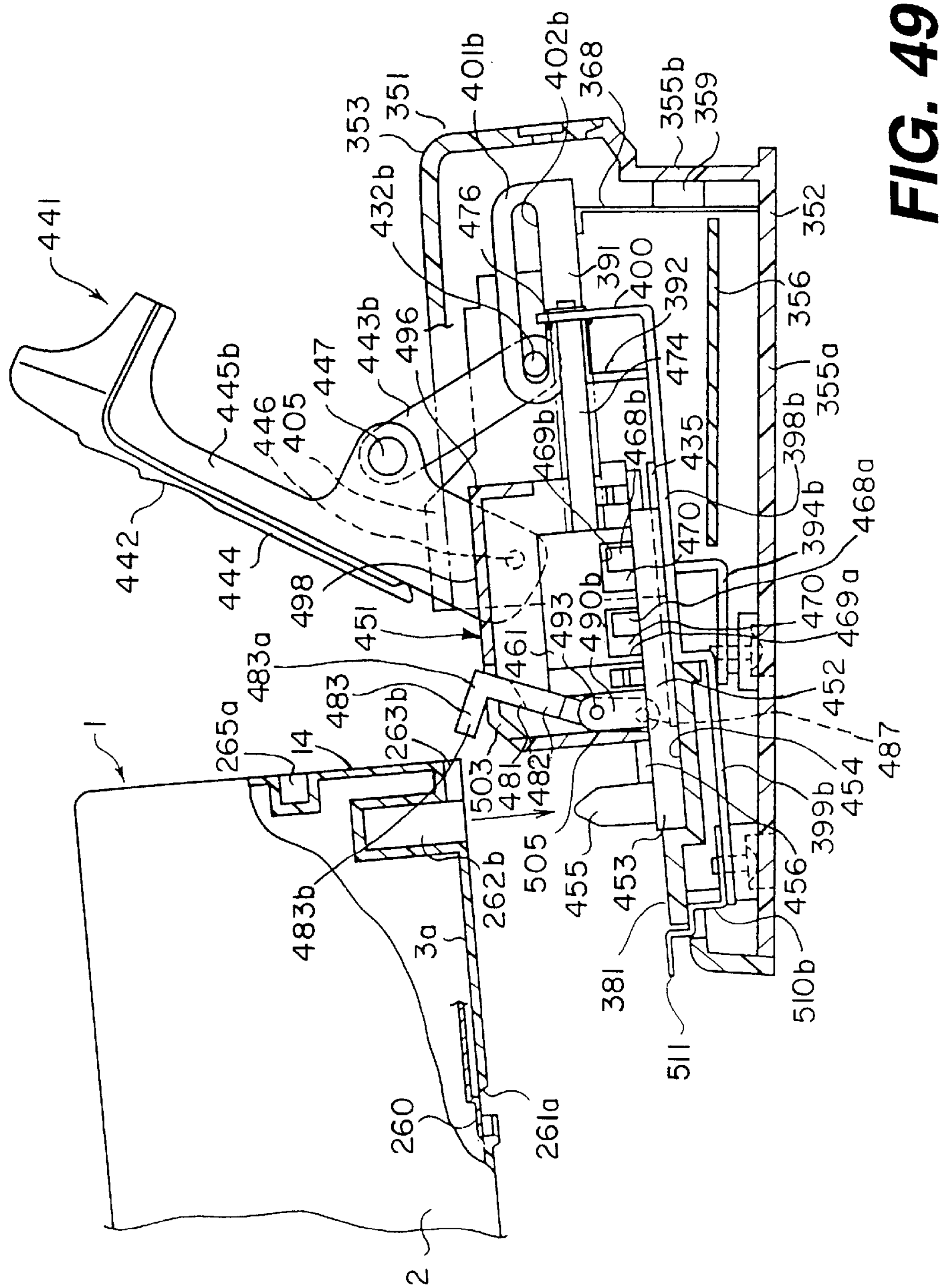
FIG. 49 is an exploded view showing a state wherein the hook arm unit is slid to the second position.

As shown FIGS. 28 and 49, a pair of left and right engaging holes 262*a* and 262*b* are formed in the rear end portion of the bottom wall 3*a*. The engaging holes 262*a* and 262*b* are adjacent to the rear surface 14 and left and right side surfaces 3*b* and 3*c*. The engaging holes 262*a* and 262*b* respectively have engaging slit 263*a* and 263*b*. A pair of left and right engaging ports 261*a* and 261*b* are formed in the rear end portion of the bottom wall 3*a*. As shown FIGS. 28 and 49, metal terminal pieces 260 are arranged in the opening ends of the engaging ports 261*a* and 261*b*. The metal terminal pieces 260 extend into the bottom surface 3*a*. With this structure, the metal terminal pieces 260 are exposed via the engaging ports 261*a* and 261*b*.

Figure 32:
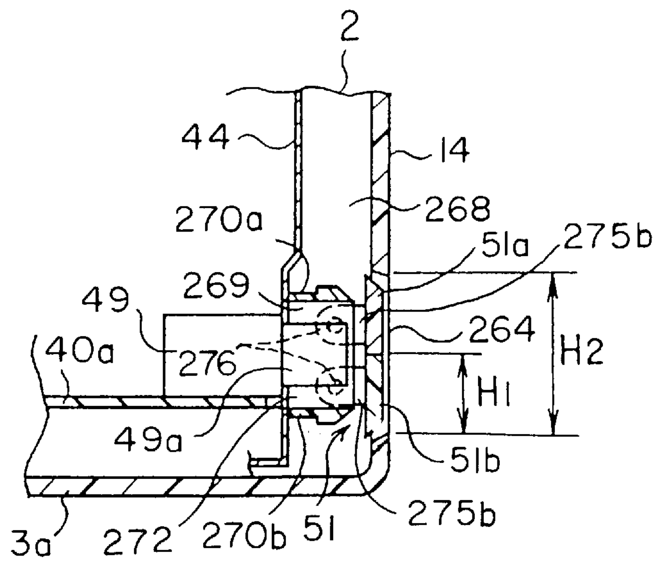
FIG. 32 is an exploded view showing the computer in a state wherein the upper cover and under cover are closed.

As shown FIG. 32, the first PCB 40*a* is mounted-in the base unit 2. The first PCB is located parallel to the bottom surface 3*a* The rear edge portion of the first PCB 40*a* is adjacent to the rear surface 14 of the base unit 2. The first PCB 40*a* has a printed circuit pattern for grounding (not shown). The metal terminals 260 are respectively connected to the grounding pattern of the first PCB 40*a*.

Figure 29:
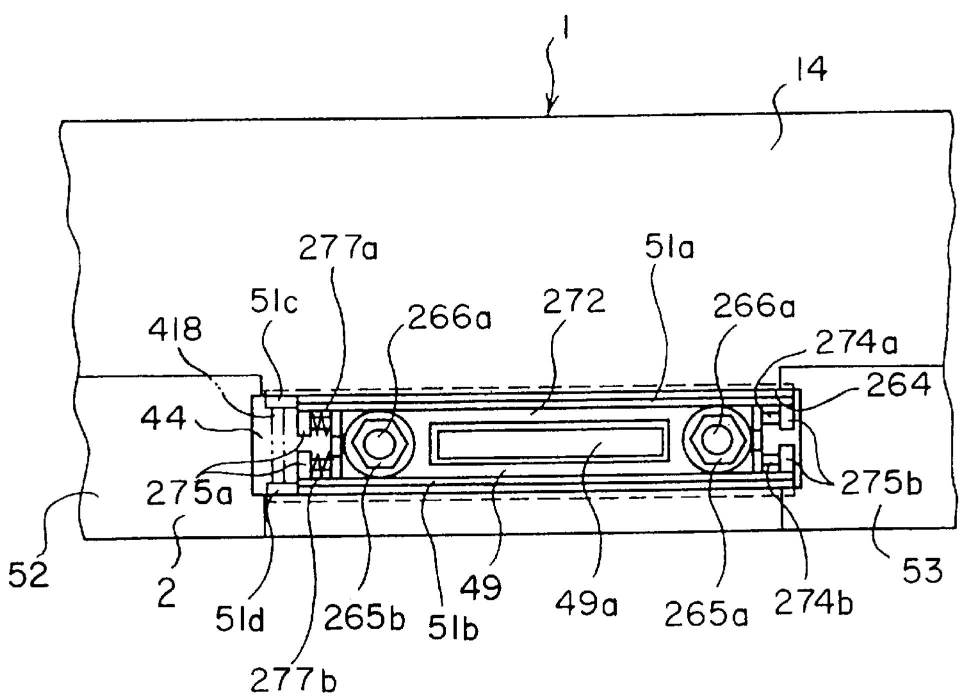
FIG. 29 is a rear view showing a mount portion of a first expansion connector of the computer.

The first expansion connector 49 for expanding the function of the computer 1 is arranged on the rear end portion of the first PCB 40*a*. As shown in FIG. 29, the first expansion connector 49 has a connector body 49*a* and a pair of nuts 265*a* and 265*b* which are located on the left and right side portion of the connector main body 49*b*. The nuts 265*a* and 265*b* respectively have a positioning holes 266*a* and 266*b*. The first expansion connector 49 is adjacent to the rear surface 2*b* of the base unit 2.

Figure 33:
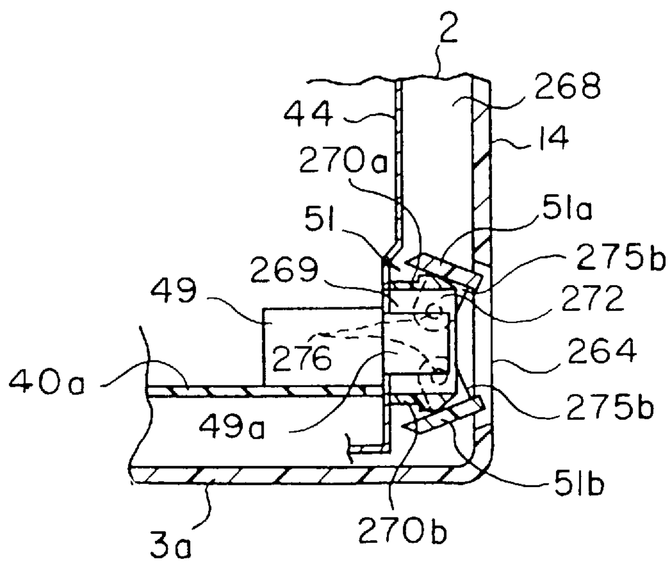
FIG. 33 is an exploded view showing the computer in a state wherein the upper and under covers are opened.

The connector panel 44 is arranged in the base unit 2. The connector panel 44 is opposite to the rear surface 14 of the base unit 2. The connector panel 44 covers the connecting portion between the first PCB 40*a* and the first expansion connector 49 from the back. As shown in FIGS. 32 and 33, a predetermined space 268 is formed between the connector panel 44 and the rear surface 14 of the base unit 2.

As shown in FIGS. 28 and 29, a connector port 264 opens on the center portion of the rear surface 14 of the base unit 2. The connector port 264 is opposite to the first expansion connector 49. The connector cover unit 51 is exposed via the connector port 264.

Figure 30:
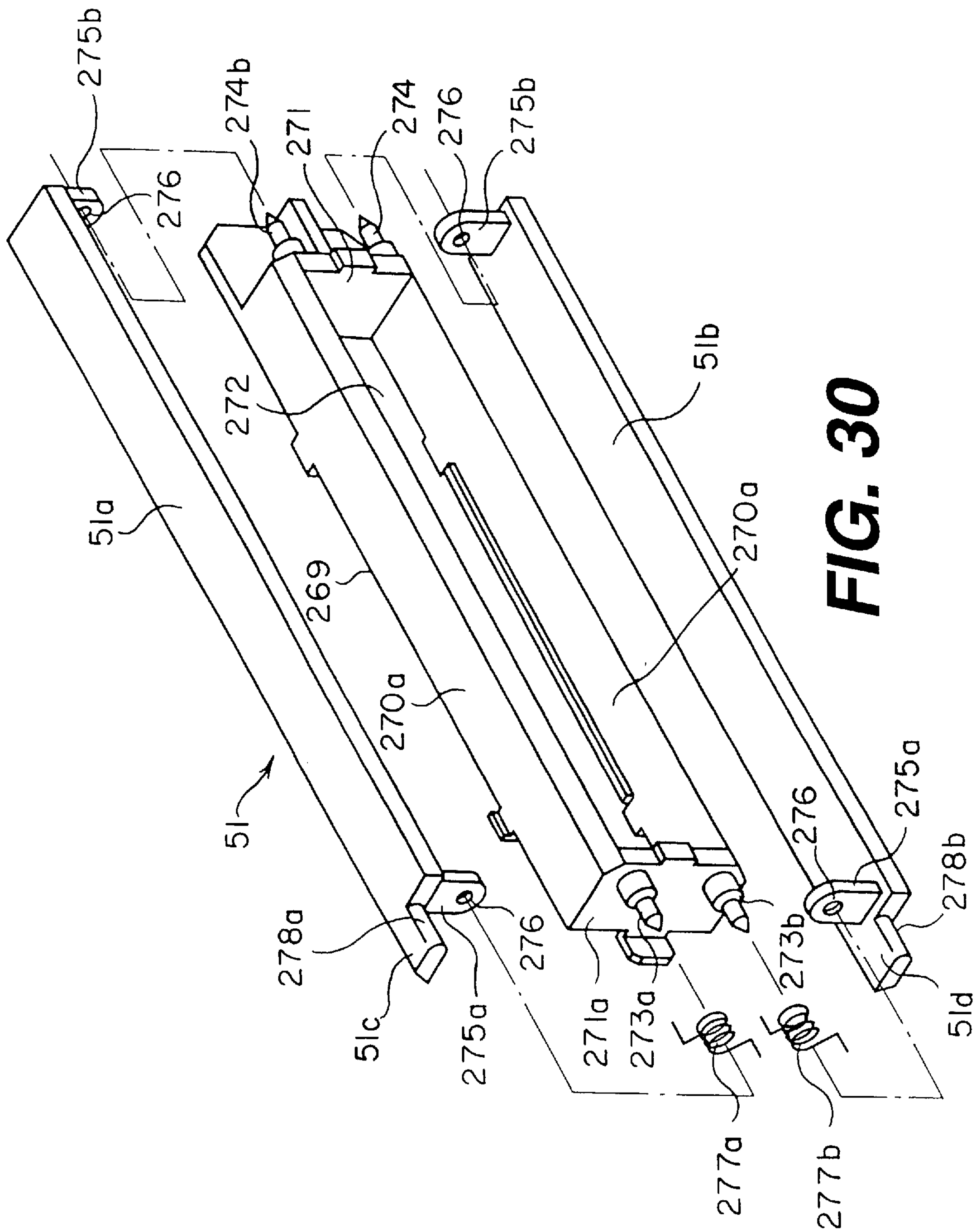
FIG. 30 is an exploded view showing a cover unit, FIG. 31(*a*) is a perspective view showing the cover unit in a state wherein an upper cover and an under cover are closed, FIG. 31(*b*) is a perspective view showing the cover unit in a state wherein the upper and under covers are opened by a cover opening member.
Figure 31A:
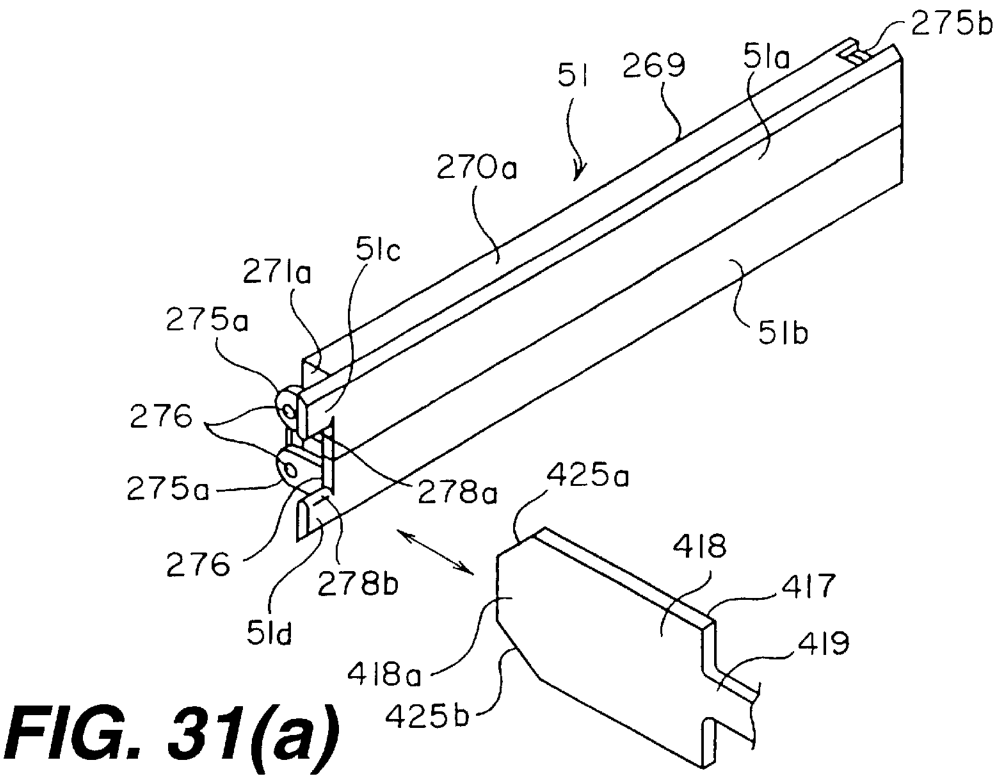
Figure 31B:
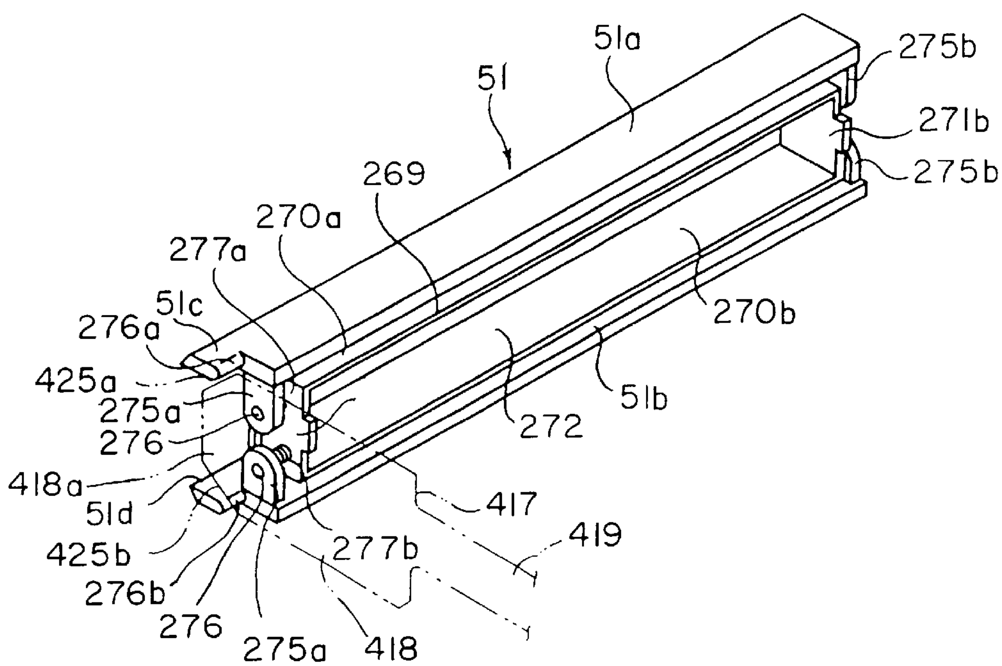

As shown in FIGS. 30, 31(*a*) and 31(*b*), the connector cover unit 51 has a frame 269 and an upper cover 51*a* and a lower cover 51*b* supported on the frame 269. The upper and lower covers 51*a* and 51*b* are made of a synthetic resin material. The frame 269 includes a pair of upper and lower walls 270*a* and 270*b* and a pair of left and right side walls 271*a* and 271*b* which are continuous with the left and right edges of the upper and lower walls 270*a* and 270*b*, respectively. The frame 269 is supported on the connector panel 44. With this support, the frame 269 is arranged in the space 268. The frame 269 includes an area 272 surrounded by the upper and lower walls 270*a* and 270*b* and the left and right side walls 271*a* and 271*b*. The first expansion connector 49 is inserted into the area 272.

The left and right side walls 271*a* and 271*b* have outer surfaces, respectively. The outer surfaces of the left and right side walls 271*a* and 271*b* respectively have a pair of pivots 273*a* and 273*b* and 274*a* and 274*b*.

The pivots 273*a*, 273*b*, 274*a* and 274*b* respectively extend along an axis of the frame 269. The H1 high of the covers 51*a* and 51*b* are half of the H2 high of the connector port 264.

The covers 51*a* and 51*b* respectively include a pair of support pieces 275*a* and 275*b*. The support pieces 275*a* and 275*b* extend in the cross direction with respect to the covers 51*a* and 51*b*. The support pieces 275*a*and 275*b* respectively have a pair of openings 276 on the top of them. The pivots 273*a*, 273*b*, 274*a* and 274*b* are pivotably inserted in the openings 276, respectively. In this inserting, the upper and lower covers 51*a* and 51*b* are supported on the frame 269.

According to the above structure, as shown in FIG. 31(*a*), the cover 51*a* cooperates with the cover 51*b* for covering the area 272. The cover is rotatably supported on the frame 269 between a closed position wherein the area 272 is closed and an open position wherein the area 272 is exposed.

When the covers 51*a* and 51*b* are rotated the closed position, the covers 51*a* and 51*b* are continuous with the rear surface 14 of the base unit 2 in the same plane. When the covers 51*a* and 51*b* are rotated to the opening position, the covers 51*a* and 51*b* are located in the space 268 in a parallel posture along the upper and lower walls 270*a* and 270*b*, and are removed from inside of the connector port 264.

According to the above structure, as shown in FIG. 29, the connector port 264 is opened. The first expansion connector 49 is exposed in the rear surface 14 of the base unit 2.

Coil springs 277*a* and 277*b* are arranged on the pivots 273*a*, 273*b*, 274*a* and 274*b*, respectively. The coil springs 277*a* and 277*b* bias the covers toward the closed position. Accordingly, the covers 51*a* and 51*b* are always located in the closed position, and cover the first expansion connector 49.

As shown in FIGS. 28 and 31(*a*), opening guide portions 51*c* and 51*d* are formed on one edge of the covers 51*a* and 51*b*. The opening guide portions 51*c* and 51*d* are continuous with the covers 51*a* and 51*b*, respectively. The opening guide portion 51*c* cooperates with the opening guide portion 51*d* for forming an insert port 267. The insert port 267 is located between the opening guide portions 51*c* and 51*d*.

As shown in FIG. 29, the insert port 267 is located near one edge of the first expansion connector 49. The insert port 267 is faces the connector panel 44 inside the connector port 264. The opening guide portions 51*c* and 51*d* include a peripheral edge portion having an upper edge and a lower edge. The-upper and lower edges respectively have guide surfaces 278*a* and 278*b*. The guide surfaces 278*a* and 278*b* are curved in the form of an arc.

In this embodiment, as shown in FIGS. 28 and 49, the base unit 2 of the computer 1 has a pair of left and right engaging recesses 265*a* and 265*b* in the rear surface 14. The engaging recesses 265*a* and 265*b* are arranged above the engaging slits 263*a* and 263*b*.

When the computer 1 having the above arrangement is to be connected to a plurality of peripheral device, an external expansion unit 350 as a first embodiment like the one shown in FIGS. 28 to 53 is used.

Figure 40:
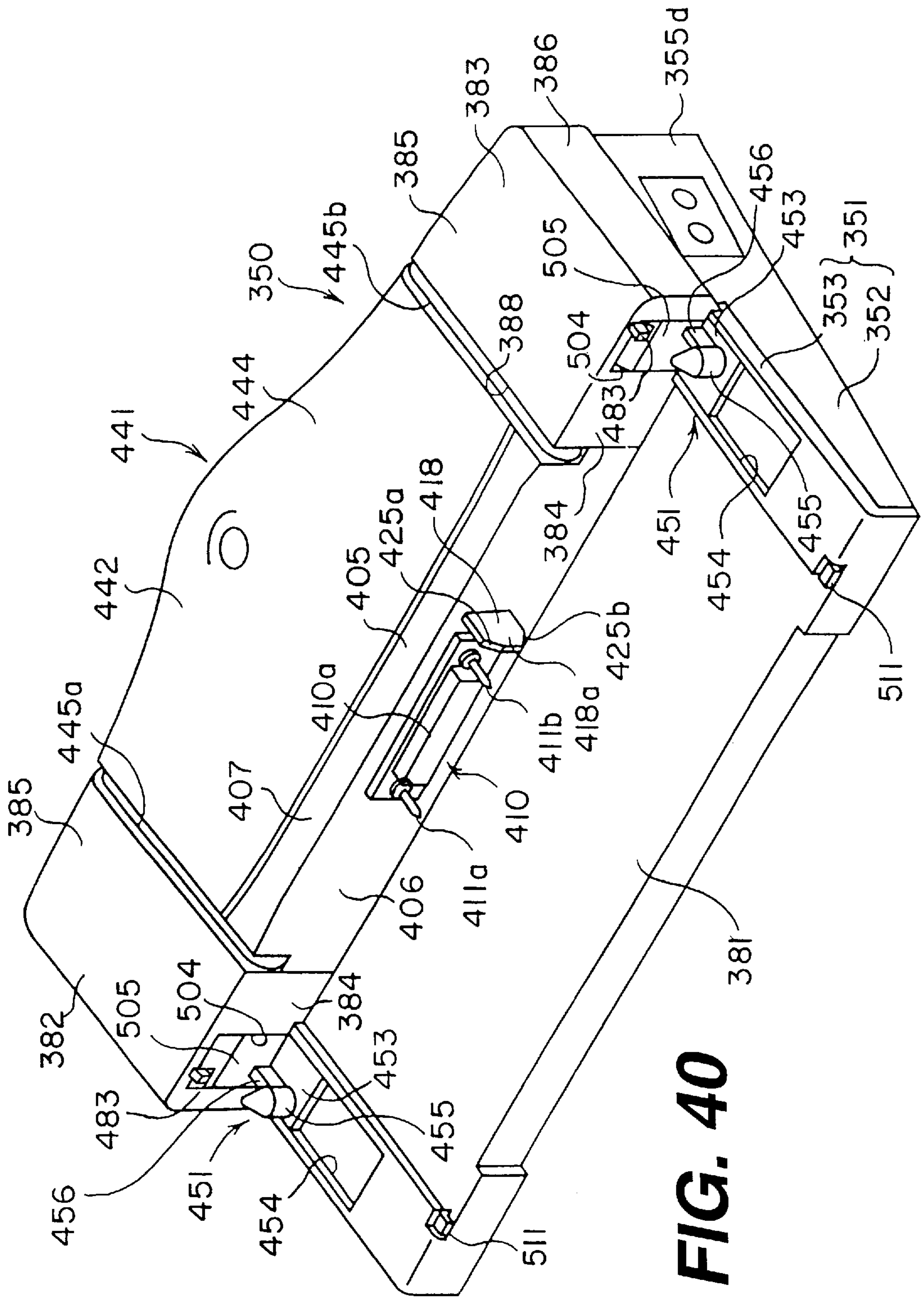
FIG. 40 is a perspective view showing the external expansion unit in a state wherein a hook arm unit is slide to a first position.

The external expansion unit 350 is connected to the rear portion of the computer 1, and has a housing 351 like the one shown in FIG. 40. The housing 351 includes a lower housing 352 and an upper housing 353 fitted on the lower housing 352. These lower and upper housings 352 and 353 are made of a synthetic resin material.

Figure 42:
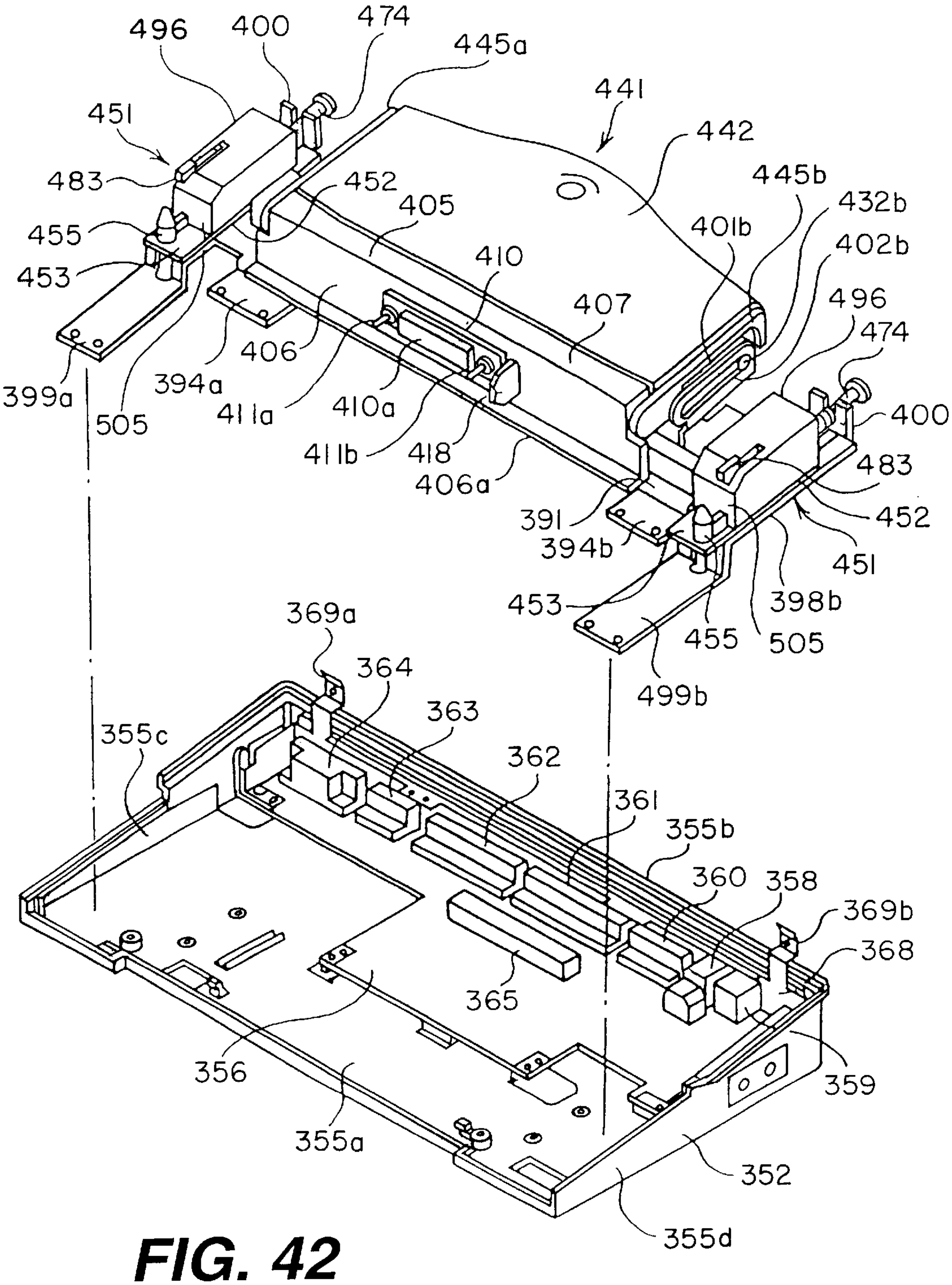
FIG. 42 is an exploded view showing the external expansion unit.
Figure 43:
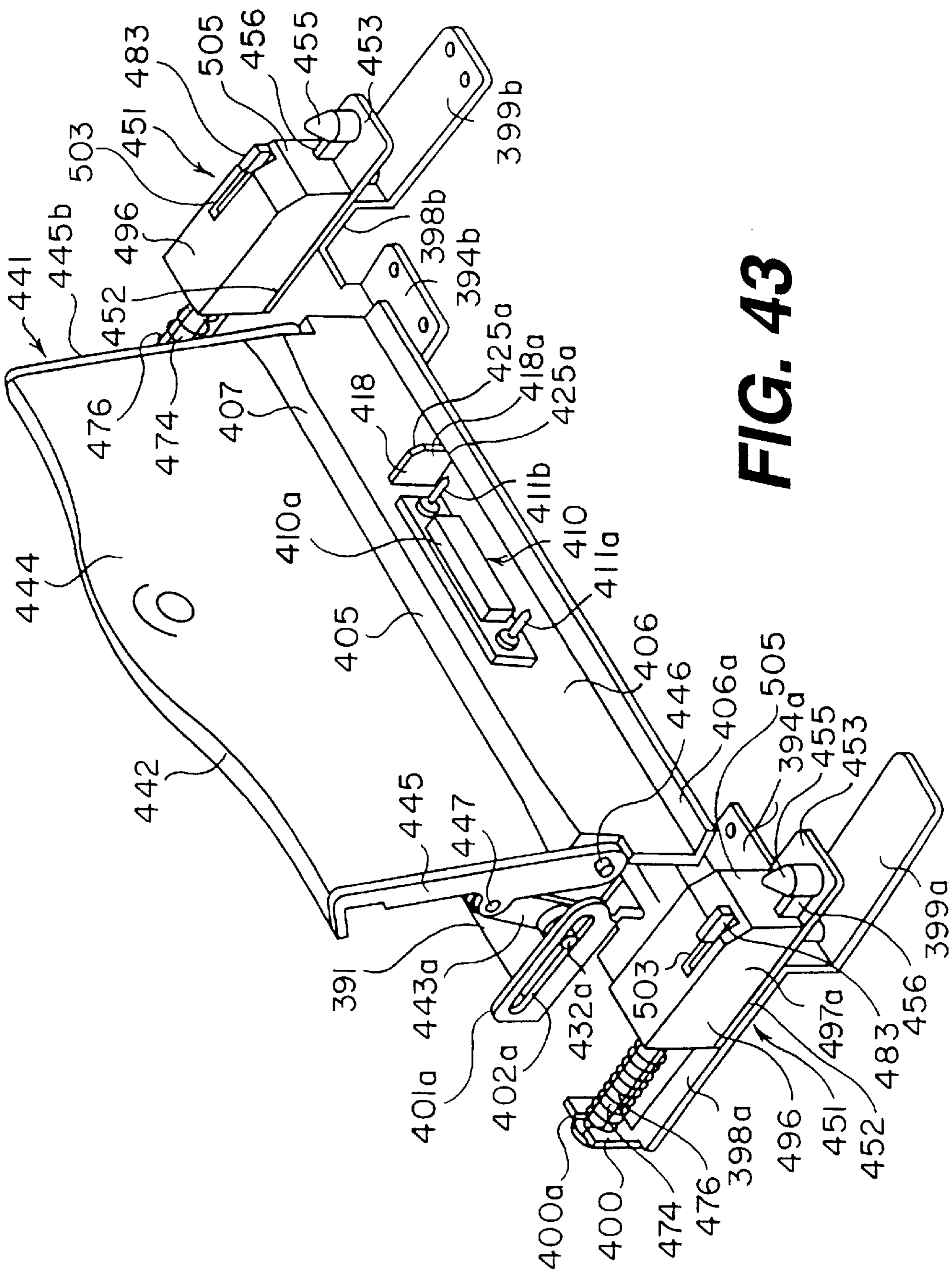
FIG. 43 is a perspective view showing a state wherein an operation lever is slid to a removed position, and the hook arm unit is slided to a second position.

As shown in FIG. 42, the lower housing 352 includes a rectangular, flat bottom wall 355*a*, and walls which are continuous with the bottom wall 355*a*, i.e., a rear wall 355*b* and a left and a right side walls 355*c* and 355*d*. A printed circuit board (PCB) 356 is located on the rear half portion of the lower housing 352. The rear, left and right side edges of the PCB 356 are adjacent to the rear and side walls 355*b*, 355*c* and 355*d*.

Figure 39:
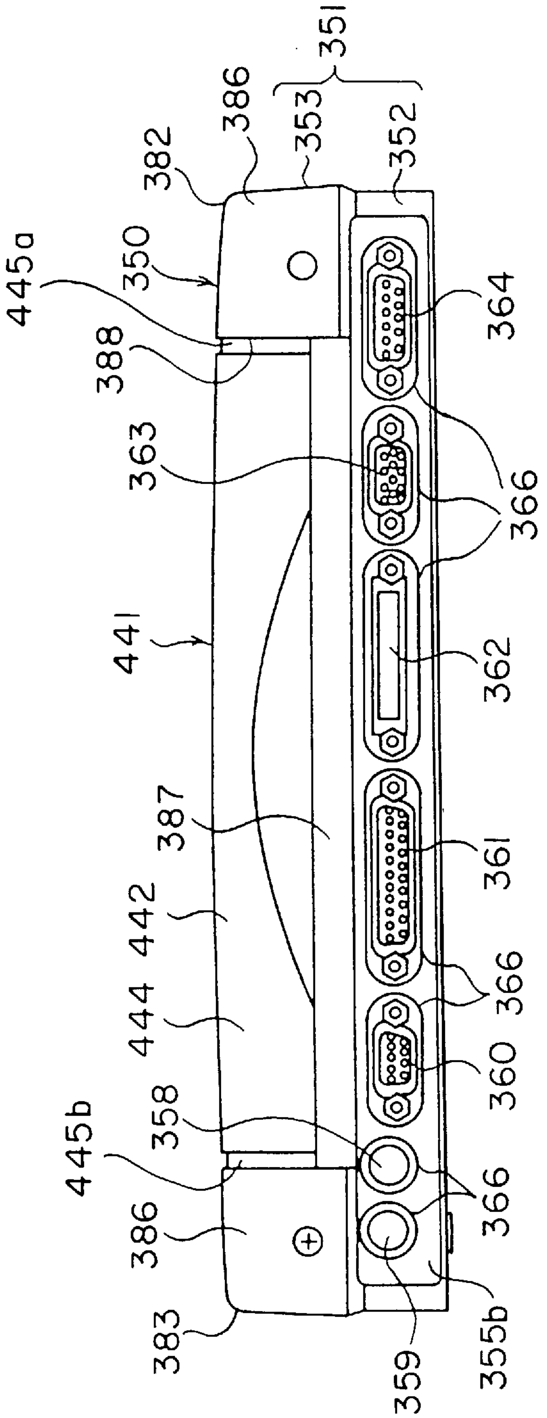
FIG. 39 is a rear view showing the external expansion unit.

For example, expansion connectors 358 and 359, a connection port 360, a first parallel port 361, an interface contour 362, a RGB connector 363 and a second parallel port 364 are laterally arranged on the rear end portion of the PCB 356. The expansion connectors 358 and 359 are connectable to connect a mouse and an external keyboard. The connection port 360 is connect able to an external device having an interface connector complying with the RS232c standard. The first parallel port 361 is connectable to a PRINTER or a external FDD. The interface connector 362 is connectable to a peripheral device such as a CD-ROM drive device. The RGB connector 363 is connectable to an external CRT display. The second parallel port 364 allows connection of an external CD-ROM driving device. A first relay connector 65 is arranged on the center portion of the PCB 356. The first relay connector 65 is electrically connected to the ports 360, 361 and 364 and the connectors 358, 359, 362 and 363 via a wiring pattern (not shown) printed on the PCB 356. The ports 360, 361 and 364 and the connectors 358, 359, 362 and 363 are adjacent to the rear wall 355 of the lower housing 352. As shown in FIG. 39, a plurality of extraction ports 366 are formed in the rear wall 355*b* of the lower housing 352. The ports 360, 361 and 364 and the connectors 358, 359, 362 and 363 are exposed behind the housing 351 via the extraction ports 366. A connector panel 368 made of metal is mounted on the rear end portion of the PCB 356. The connector panel 368 is screwed to the bottom wall 355*a*. The connector panel 368 is arranged in a vertical posture with respect to the PCB 356. The connector panel 368 covers the connecting portions between the PCB 356, the ports 360, 361 and 364 and the connectors 358, 359, 362 and 363 from the back. The connector panel 368 has a pair of support pieces 369*a* and 369*b*. The support pieces 369*a* and 369*b* are integrally formed on the connector panel 368. The support pieces 369*a* and 369*b* extend upward from the left and right end portions of the connector panel 368.

As shown in FIG. 40, the upper housing 353 has a mounting surface 381 on which the computer 1 is mounted, and a pair of left and right stopper portions 382 and 383 which are continuous with the rear end of the mounting surface 381. The mounting surface 381 is continuously open to the front side and left and right sides of the housing 351. The mounting surface 381 has a size substantially corresponding to the rear half portion of the bottom wall 3*a* of the computer 1. With this structure, while the computer 1 is mounted on the mounting portion 381, the front half portion of the computer 1 protrudes from the front end of the upper housing 353 toward the operator side.

Figure 38:
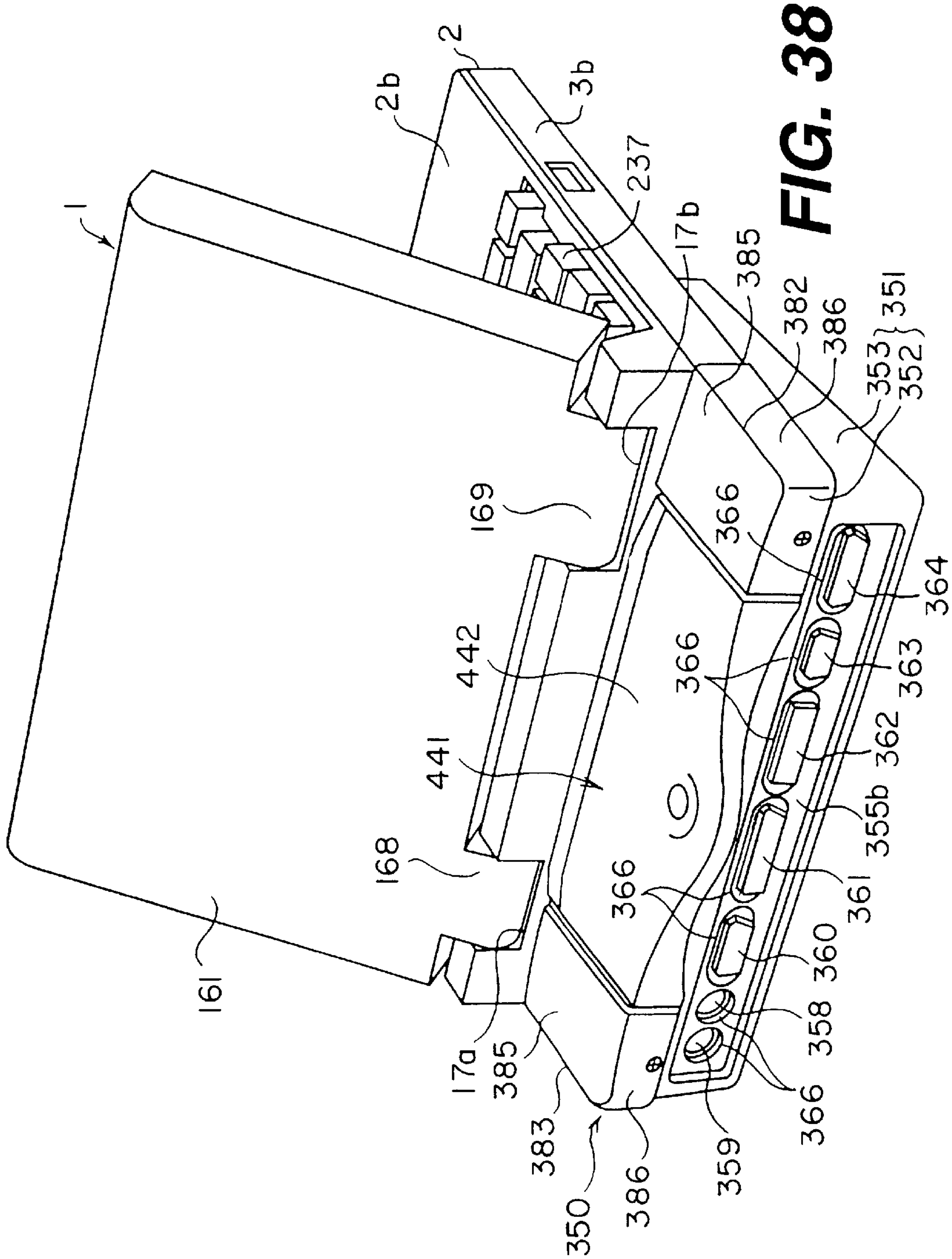
FIG. 38 is a perspective view showing a state wherein the computer is connected to an external expansion unit.

Since the stopper portions 382 and 383 have the same structure, one stopper portion 382 will be described as representative. As shown in FIGS. 38 and 40, the stopper portion 382 has a substantially vertical stopper surface 384 which is continuous with the mounting surface 381, a flat upper surface 385 which is continuous with the upper end of the stopper surface 384 and a circumferential surface 386 which is continuous with the upper surface 385 and the stopper surface 384. The circumferential surface 386 is continuous with the rear wall 355*b* and the side walls 355*c* and 355*d*. As shown in FIG. 39, the rear end portions of the stopper portions 382 and 383 are integrally coupled to each other via a coupling wall 387. The coupling wall 387 is continuous with the rear wall 355*d* of the lower housing 352. The upper housing 353 has an opening portion 388 defined by the rear edge portion of the mounting surface 381, the left and right stopper portions 382 and 383, and the coupling portion 387. The upper housing 353 is coupled to the lower housing 352 by screwing the left and right stopper portions 382 and 383 to the support pieces 369*a* and 369*b* of the connector panel 368 and also screwing the two side portions of the front end of the mounting surface 381 to the bottom wall 355*a* of the lower housing 352.

Figure 44:
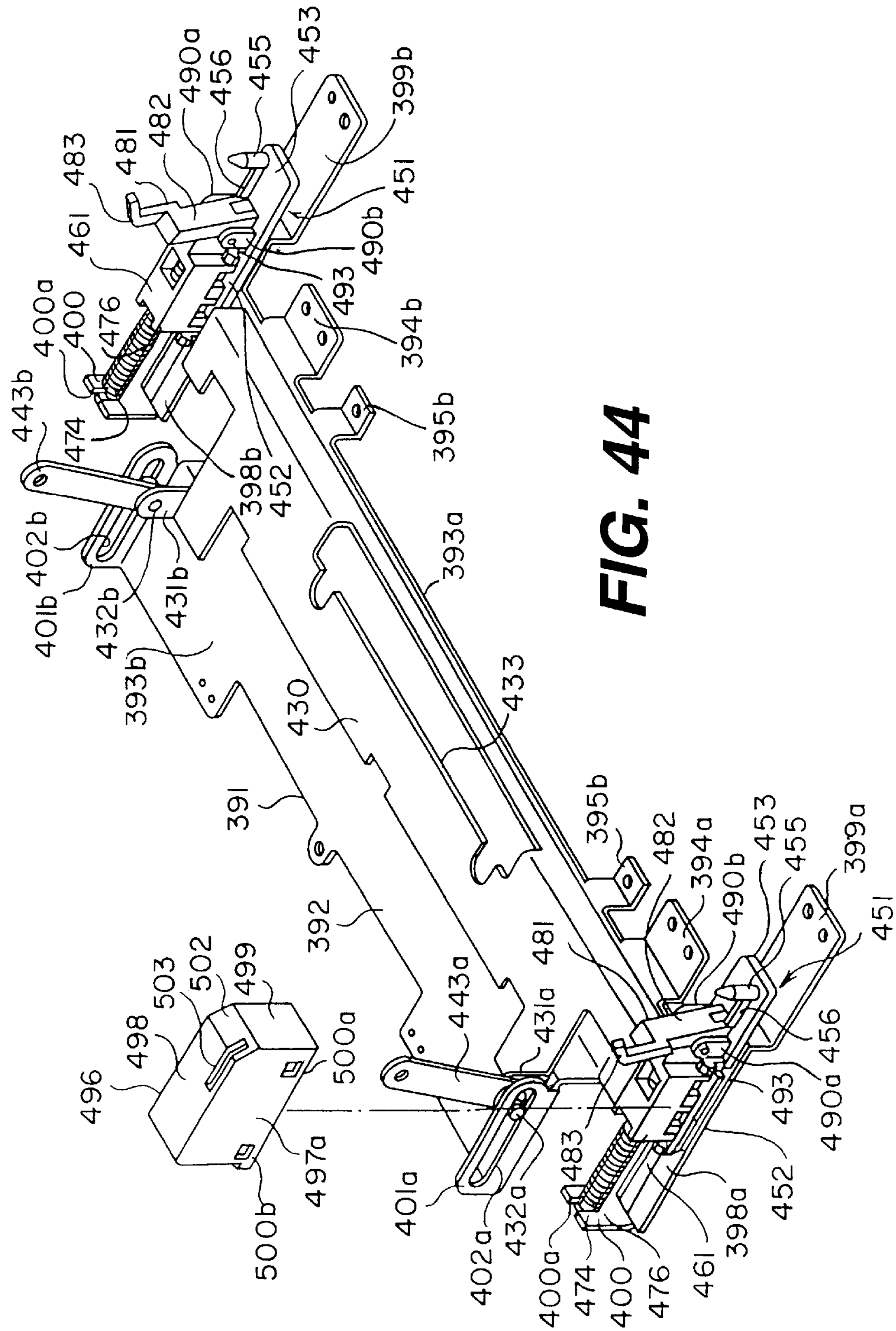
FIG. 44 is a perspective view showing a slide plate which is supported to a frame and the hook arm unit which is supported to the slide plate.
Figure 52:
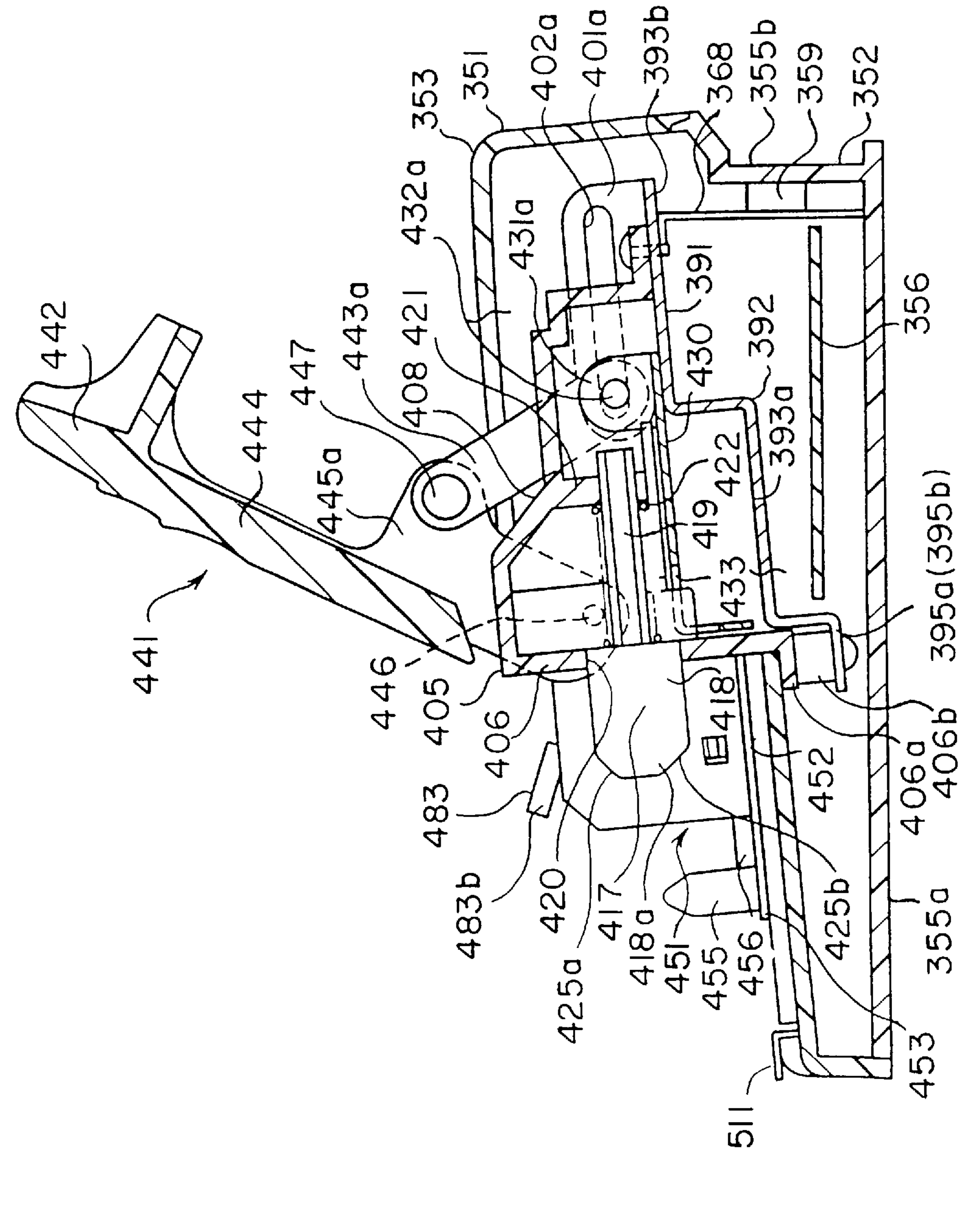
FIG. 52 is an exploded view showing a mounting portion of the external expansion unit.

As shown FIGS. 42 and 52, a metal frame 391 is supported on the lower housing 352. As shown in FIG. 44, the metal frame 391 has a main body 392. The main body 392 includes a front half portion 393*a* and a rear half portion 393*b*. The front and rear half portions 393*a* and 393*b* are located above the PCB 356. As shown FIG. 53, the front and rear half portions 393*a* and 393*b* are inclined toward the operator side to conform to the inclination of the mounting surface 381.

Figure 51:
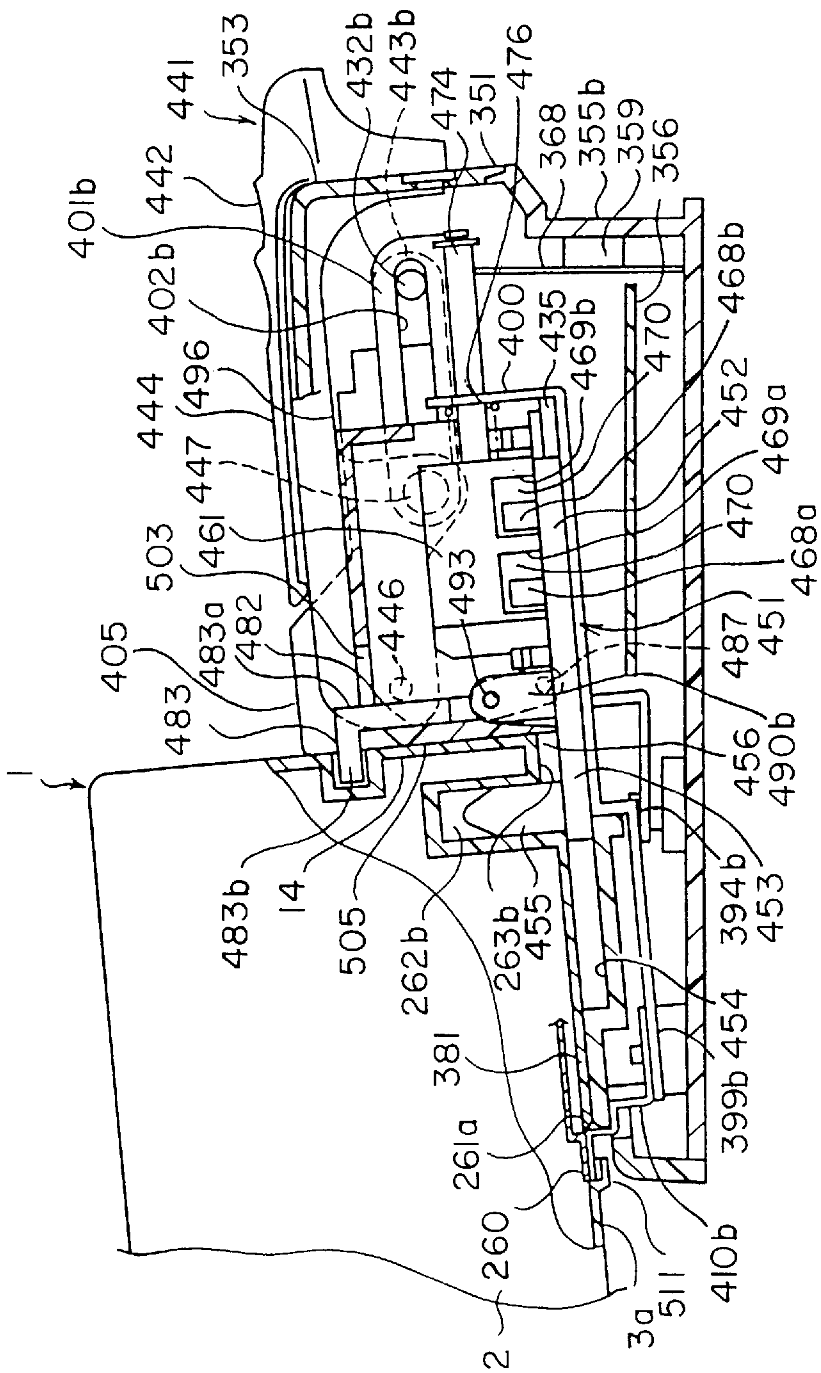
FIG. 51 is an exploded view showing a state wherein the computer is connected to the external expansion unit.

A pair of left and right first support pieces 394*a* and 394*b* are integrally formed on the front edge portion of the front half portion 393*a*. As shown in FIGS. 49 and 51, the first support pieces 394*a* and 394*b* are screwed to the bottom wall 355*a* of the lower housing 352. A pair of left and right second support pieces 395*a* and 395*b* are integrally formed on the front edge portion of the front half portion 393*a*. The second support pieces 395*a* and 395*b* are located between the first support pieces 394*a* and 394*b*. The rear edge portion of the main body 392 is located above the ports 360, 361 and 364 and the connectors 358, 359, 362 and 363. The rear edge portion of the rear half portion 393*b* is screwed to the upper end portion of the connector panel 368. With this structure, the rear half portion 393*b* of the metal frame 391, together with the connector panel 368, surrounds the ports 360, 361 and 364 and the connectors 358, 359, 362 and 363, thereby preventing leakage of high-frequency noise from the ports 360, 361 and 364 and the connectors 358, 359, 362 and 363.

As shown in FIGS. 44 and 49, a pair of left and right slide guide portions 398*a* and 398*b* are integrally formed on the front half portion 393*a* of the main body 392, and extend in the front-to-back direction of the lower housing 352. The slide guide portions 398*a* and 398*b* are continuous with the front half portion 393*a* of the main body 392 on the same plane. The front edge portions of the slide guide portions 398*a* and 398*b* are located below the mounting surface 381. A pair of third support portions 399*a* and 399*b* are integrally formed on the slide guide portions 398*a* and 398*b*. The third support portions 399*a* and 399*b* are respectively bent downward at the front portions of the slide guide portions 398*a* and 398*b*. The third support portions 399*a* and 399*b* are screwed to the bottom wall 355*a* of the lower housing 392.

A pair of spring support portions 400 are integrally formed on the end edge portions of the slide guide portions 398*a* and 398*b*. The spring support portions 400 respectively have a cut portion 400*a* cutting the upper edge of the spring support portions 400.

As shown in FIG. 44, guide walls 401*a* and 401*b* are integrally formed on the rear half portion 393*b* of the metal frame 391. The guide walls 401*a* and 401*b* are bent upward at the left and right side portions of the rear half portion 393 of the metal frame 391. The guide walls 401*a* and 401*b* extend in the front-to-back direction of the lower housing 352. The guide walls 401*a* and 401*b* respectively have guide holes 402*a* and 402*b* extending in the back-and-forth direction. The guide holes 402*a* and 402*b* are inclined toward the operator side to be parallel to the mounting surface 381.

As shown in FIG. 42, a connector cover 405 made of a synthetic resin is fixed to the metal frame 391. As shown in FIG. 40, the connector cover 405 is located between the left and right stopper portions 382 and 383. The connector cover 405 is inserted in the opening portion 388. The connector cover 405 has a substantially vertical connector mounting surface 406 which is continuous with the rear end portion of the mounting surface 381 and an upper surface 407 which is continuous with the upper edge portion of the connector mounting surface 406. A recess portion 408 which is continuous with the coupling wall 387 is formed on the rear portion of the upper surface 407. As shown FIG. 53, a boss 409 projects from the inner surface of the recess portion 408. The boss 409 and the rear edge portion of the connector cover 405 are screwed to the rear half portion 393*b* of the metal frame 391.

Figure 41:
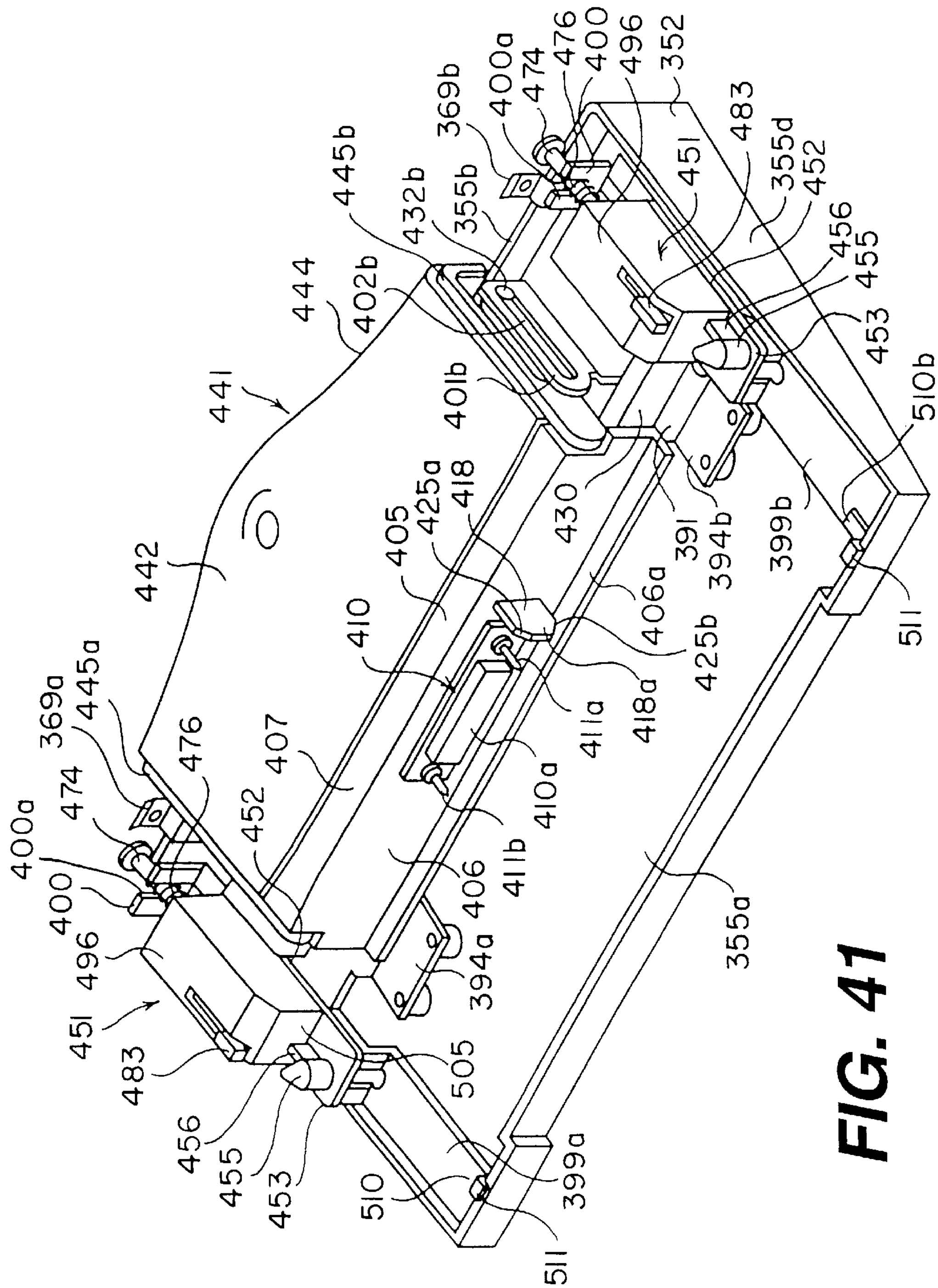
FIG. 41 is a perspective view showing the external expansion unit in a state wherein an upper housing is removed.

As shown in FIGS. 41 and 52, the under edge portion of the connector mounting surface 406 has a flange portion 406*a* which extends forward from the connector mounting surface 406. A pair of left and right bosses 406*b* project from the under surface of the flange portion 406*a*. The bosses 406*b* are screwed to the second support portions 395*a* and 395*b* of the metal frame 391. The connector mounting surface 406 is continuous with the stopper surfaces 384 of the stopper portions 382 and 383 on the same plane. A second expansion connector 410 is arranged on the center portion of the connector mounting surface 406. The first expansion connector 49 of the computer 1 is detachably connected to the second expansion connector 410. The second expansion connector 410 has a connector body 410*a* and a pair of positioning pins 411*a* and 411*b*. The positioning pins 411*a* and 411*b* are located on the left and right sides of the connector body 410*a* The positioning pins 411*a* and 411*b* are removably inserted to in the positioning holes 266*a* of the first expansion connector 49. With this insertion, the first expansion connector 49 and the second expansion connector 410 are positioned.

Figure 53:
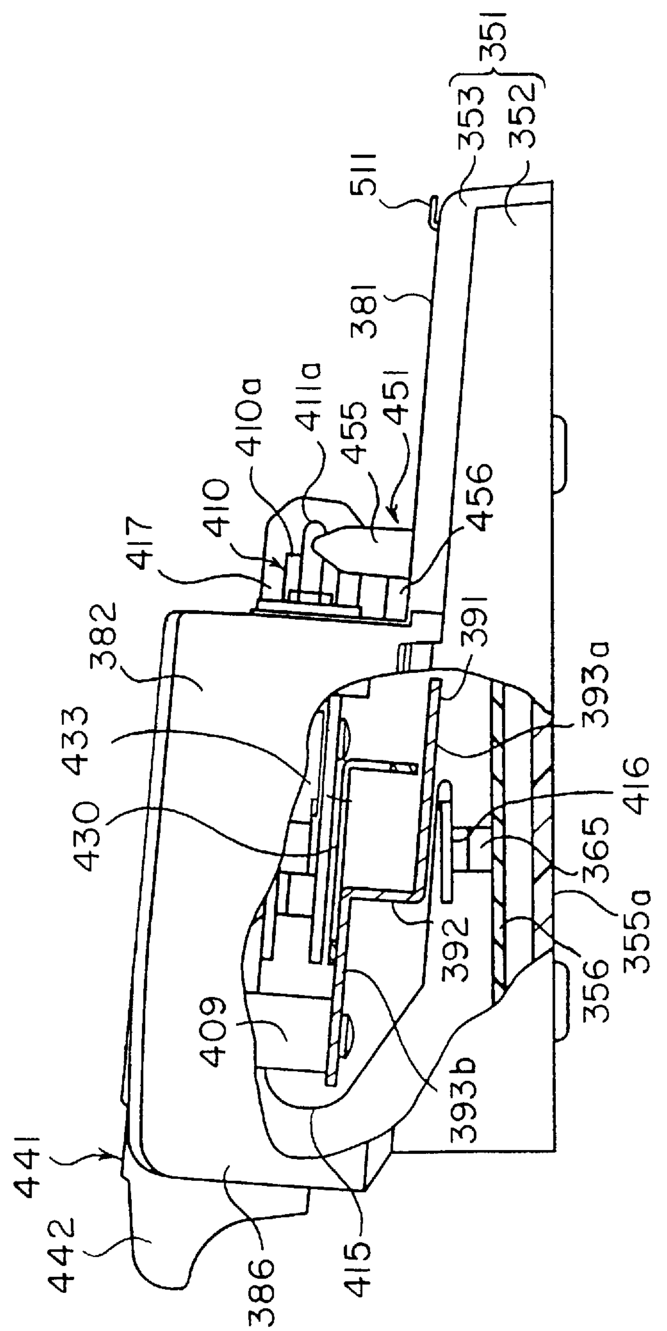
FIG. 53 is a partial sectional side view showing the mounting portion of the hook arm unit.
Figure 54:
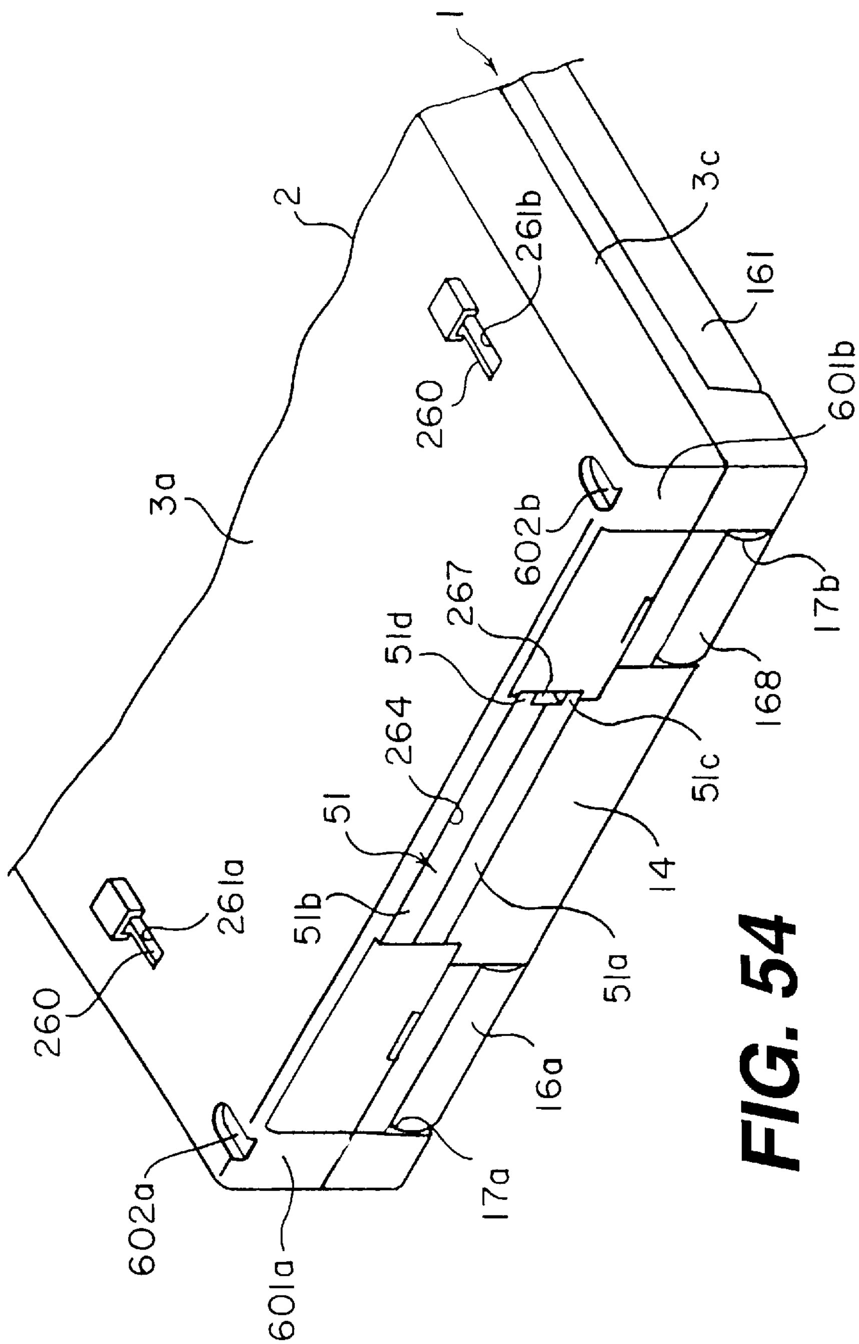
FIG. 54 is a perspective view showing the rear end portion of the computer when viewed from the bottom side of the computer.

The second expansion connector 410 is supported on the connector cover 405. As shown in FIG. 53, a flexible wiring board 415 is arranged in the housing 351, and connected to the second expansion connector 410.

A second relay connector 416 is detachably connected to the end portion of the wiring portion 415. The second relay connector 416 is detachably connected to the first relay connector 365.

With this structure, the second expansion connector 410 is connected to the ports 360, 361 and 364 and the connectors 358, 359, 362 and 363 via the wiring board 415 and the PCB 356. Signals input to the second expansion connector 410 are distributed to the ports 360, 361 and 364 and the connectors 358, 359, 362 and 363.

As shown in FIG. 40, a cover opening member 417, for opening the upper and lower covers 51*a* and 51*b* of the connector unit 51, is arranged on the connector mounting surface 406. The cover opening member 417 is adjacent to the second expansion connector 410. As shown in FIGS. 31 and 52, the cover opening member 417 includes a plate-like pushing piece 418 and a bar portion 419 which is continuous with the pushing piece 418.

An opening 420 is opened to the connector mounting surface 406. The pushing piece 418 is slidably supported in the opening 420. The bar portion 419 is arranged inside of the connector cover 405. A support portion 421, for slidably supporting the bar portion 419 in the front-to-back direction, is arranged inside of the connector cover 405. With this structure, the cover opening member 417 is supported on the connector cover 405. The cover opening member 417 is always biased toward projection from the connector mounting surface 406 by a spring 422. The cover opening member 417 always projects from the connector mounting surface 406.

As shown in FIG. 53, a top portion of the cover opening member 417 projects further forward from the connector mounting surface 406 than the positioning pins 411*a* and 411*b*.

As shown in FIGS. 31(*a*) and 31(*b*), the cover opening member 417 has cam surfaces 425*a* and 425*b* in the upper and lower corner portions of the cover opening member 417. The top portion 418 of the cover opening member 417 is formed in an arrow shape so as to be insertable to the insert port 267 of the connector cover 51. When the top portion 418 of the cover opening member 417 is inserted into the insert port 267, the cam surfaces 425*a* and 425*b* are slidably attached to the guide surfaces 278*a* and 278*b* of the guide portions 51*c* and 51*d*, respectively. With this attachment, the upper and lower cover 51*a* and 51*b* are rotated to the up and down direction about the axis portions 273*a*, 273*b*, 274*a* and 274*b*.

As shown in FIG. 44, a metal slide plate 430 is mounted on the upper surface of the metal frame 391 to be slidable in the front-to-back forth direction. The slide plate 430 has a pair of support walls 431*a* and 431*b* opposite to the guide walls 401*a* and 401*b*. The support walls 431*a* and 431*b* are located on the left and right side portions of the rear end of the slide plate 430. Guide pins 432*a* and 432*b* are mounted on the support walls 431*a* and 431*b*, respectively. The guide pins 432*a* and 432*b* are slidably engaged to the slide holes 402*a* and 402*b*.

With this structure, the slide plate 430 is supported on the frame 391 to be guided by the fitting portions between the guide pins 432*a* and 432*b* and the guide holes 402*a* and 402*b* so as to be slidable in the front-to-back direction. An opening 433 is formed on the slide plate 430, for passing the second expansion connector 410.

Figure 50:
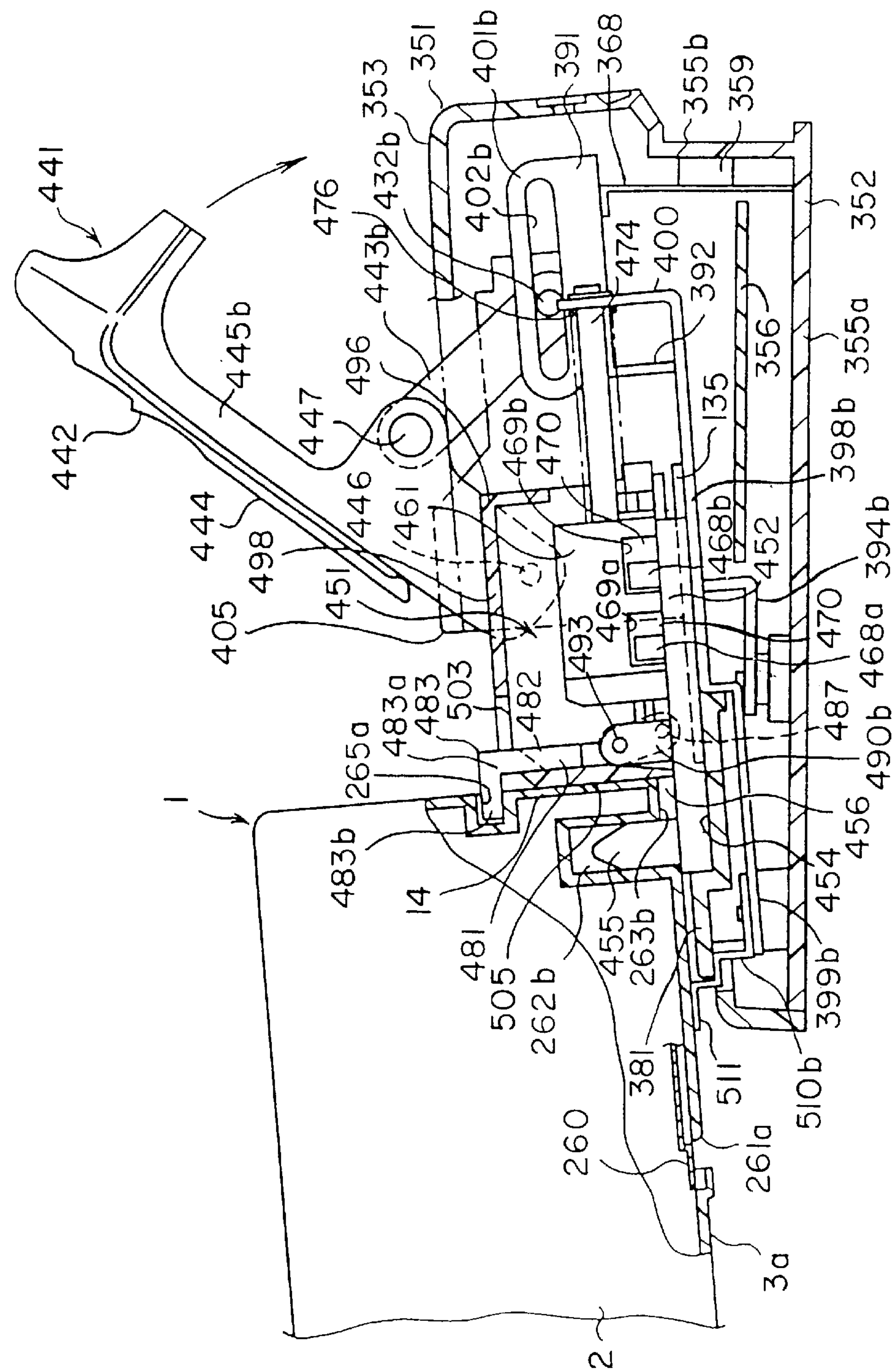
FIG. 50 is an exploded view showing a state wherein the computer is mounted on a mounting surface of the external expansion unit.

Flat plate like brackets 435 are integrally formed on the slide plate 430. As shown in FIGS. 49 to 51, the brackets 435 are slidably located on the slide guide portions 398*a* and 398*b* and inside of the stopper portions 382 and 383, respectively.

The external expansion unit 350 has an operation mechanism 441 which serves to move the slide plate 430 in the front-to-back direction. The operation mechanism 441 includes an operation lever 442 and a pair of toggle links 443*a* and 443*b* for pivotally linking the operation lever 442 to the slide plate 430. The operation lever 442 has a lever body 444 and a pair of arm portions 445*a* and 445*b*. The arm portions 445*a* and 445*b* are located on the left and right end portions of the lever body 444. The distal ends of the arm portions 445*a* and 445*b* are coupled to the connector cover 405 via pivot shafts 446 such that the arm portions 445*a* and 445*b* are pivotal in the vertical direction.

One end of each of the toggle link 443*a* and 443*b* are pivotally coupled to the intermediate portion of a corresponding one of the arm portions 445*a* and 445*b* via a pivot shaft 447, respectively. The other end of each of the toggle links 443*a* and 443*b* are pivotally coupled to a corresponding one of the guide pins 432*a* and 432*b*. As shown in FIGS. 49, 50 and 51, the coupling portions between the operation lever 442 and toggle links 443*a* and 443*b* are located behind the coupling portion between the operation lever 442 and the connector cover 405, and the pivot range of the operation lever 442 is determined by the toggle links 443*a* and 443*b*.

That is, as shown in FIG. 49, when the operation lever 442 is pivoted upward, the coupling portions between the operation lever 442 and the toggle links 443*a* and 443*b* are moved upward and also pulled forward. For this reason, the raising angle of the toggle links 443*a* and 443*b* increases, and the guide pins 432*a* and 432*b* are slid forward along the slide holds 402*a* and 402*b*. This upward pivoting movement of the operation lever 442 is stopped, when the guide pins 432*a* and 432*b* reach the front ends of the slide holes 402*a* and 402*b*. At this time, the raising angle of the operation lever 442 is maximized.

As shown in FIGS. 50 and 51, when the operation lever 442 is pivoted downward, the coupling portions between the operation lever 442 and toggle links 443*a* and 443*b* are moved downward and also pushed backward. For this reason, the toggle links 443*a* and 443*b* are tilted to almost a near-horizontal position to be parallel to the slid plate 430, and the guide pins 432*a* and 432*b* are slide backward along the slide holds 402*a* and 402*b*. The downward pivoting movement of the operation lever 442 is stopped when the guide pins 432*a* and 432*b* reach the rear ends of the slide holes 402*a* and 402*b*. At this time, the raising angle of the operation lever 442 is minimized.

That is, the operation lever 442 is rotatably supported on the connector unit 350 between a release position where it is rotated above the connector cover 405 and a coupling position where it is inclined to be almost horizontal so as to be continuous with the upper surface 407 of the connector cover 405.

Figure 45:
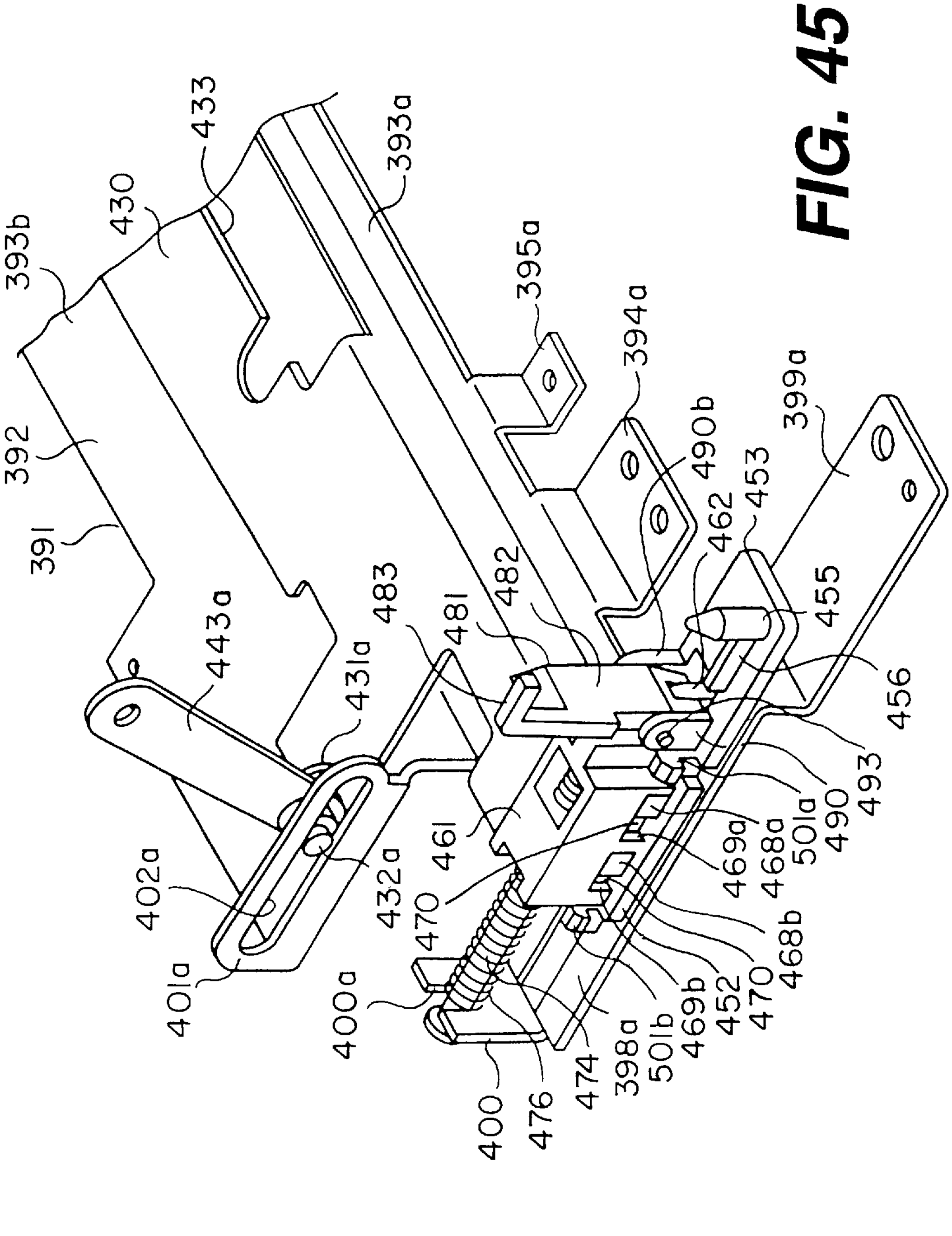
FIG. 45 is a perspective view showing a state wherein the hook arm unit is slid toward the first position from the second position and a hook arm is erect.
Figure 46:
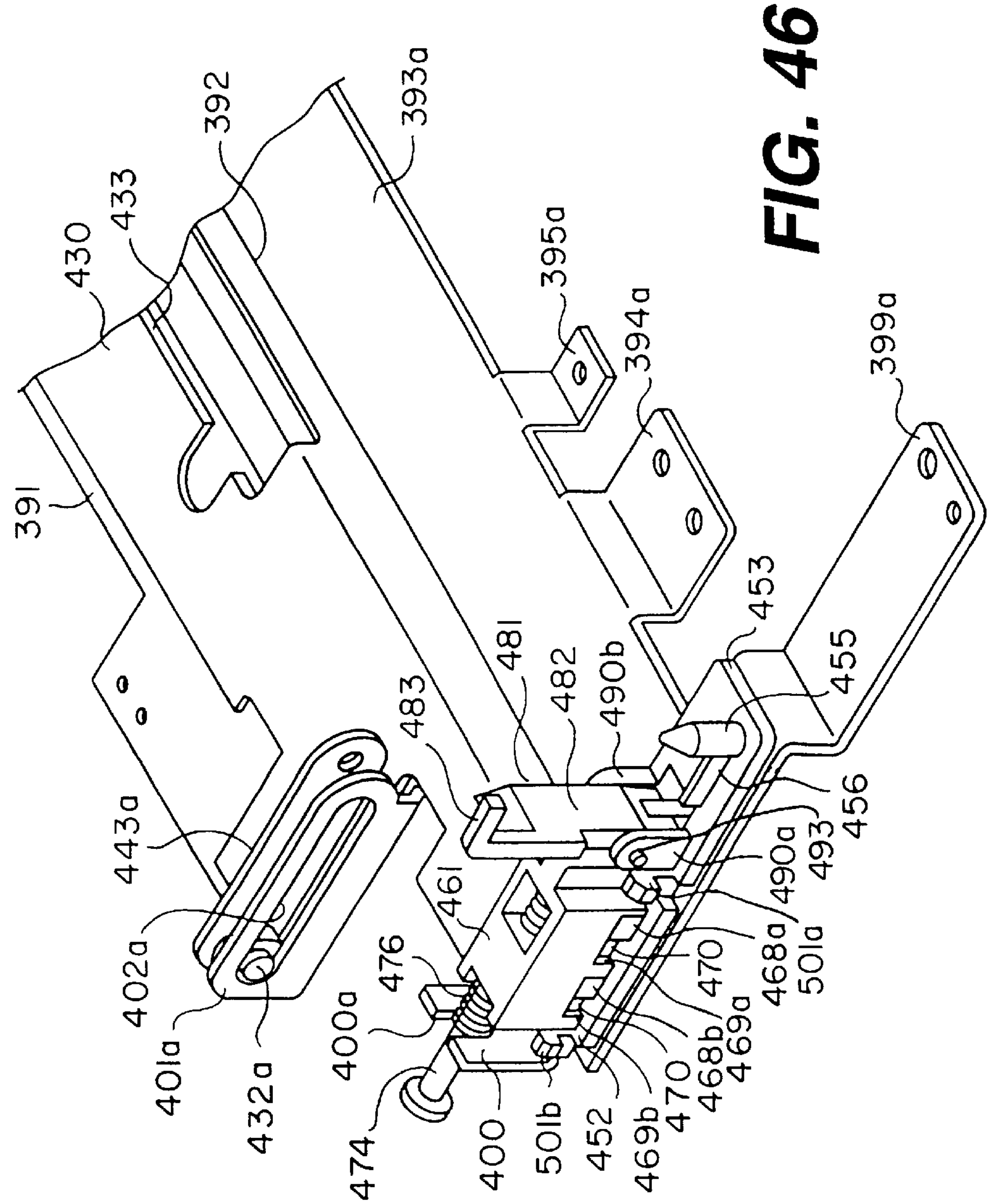
FIG. 46 is a perspective view showing a state wherein the hook arm unit is slid toward the first position.

As shown in FIG. 45, while the operation lever 442 is pivoted to the release position, the slide plate 430 is slid forward and located above the front half portion 393*a* of the frame 391. As shown in FIG. 46, while the operation lever 442 is rotated to the coupling position, the slid plate 430 is slide backward and located above the rear half portion 393*b* of the frame 391.

As shown in FIGS. 49 to 51, a pair of left and right hook arm units 451 are mounted on the left and right brackets 435 of the slide plate 430, respectively. The hook arm units 451 are hooked to the base unit 2 of the computer 1, when the computer 1 is mounted on the mounting surface 381. The hook arm units 451 are located on the left and right portions of the rear end portion of the mounting surface 381. The hook arm units 451 are mostly stored in the stopper portions 382 and 383 of the upper housing 353. Since the hook arm units 451 have the same structure and size, one hook arm unit 451 will be described as representative.

Figure 47:
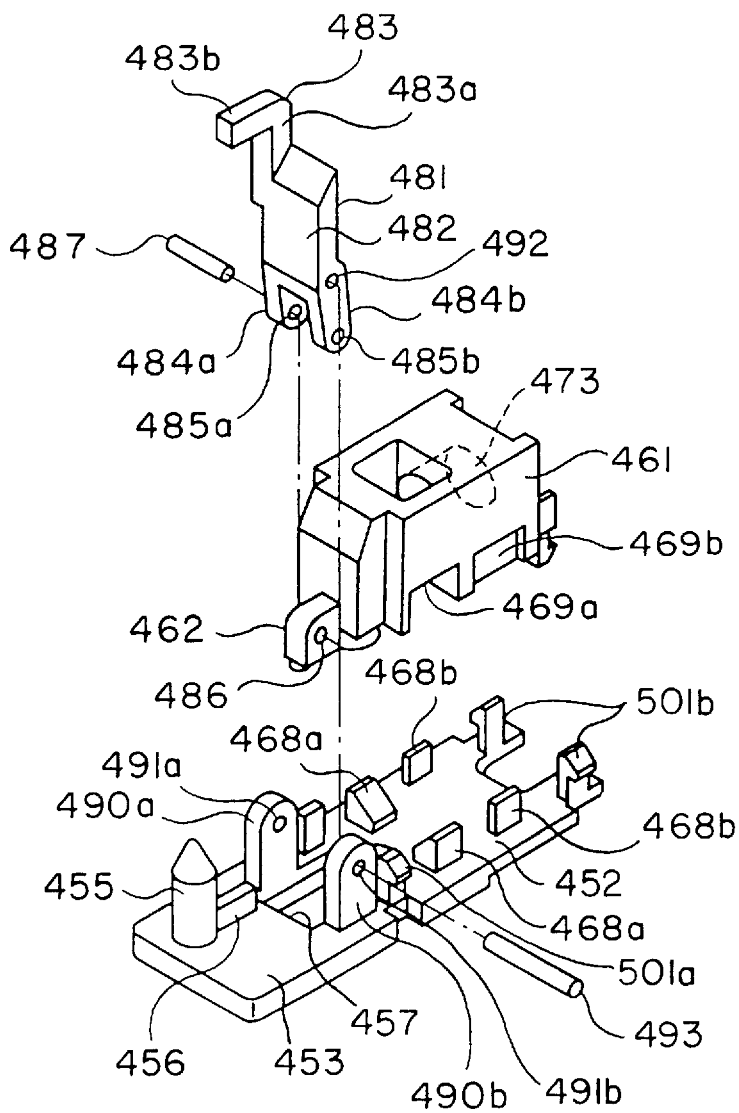
FIG. 47 is an exploded view showing the hook arm unit, FIG. 48(*a*) is a partial sectional side view showing the hook arm unit, FIG. 48(*b*) is an exploded view showing the mounting portion of the hook arm unit, FIG. 48(*c*) is an exploded view showing a sectional view taken along a line C—C in FIG. 48A.
Figure 48A:
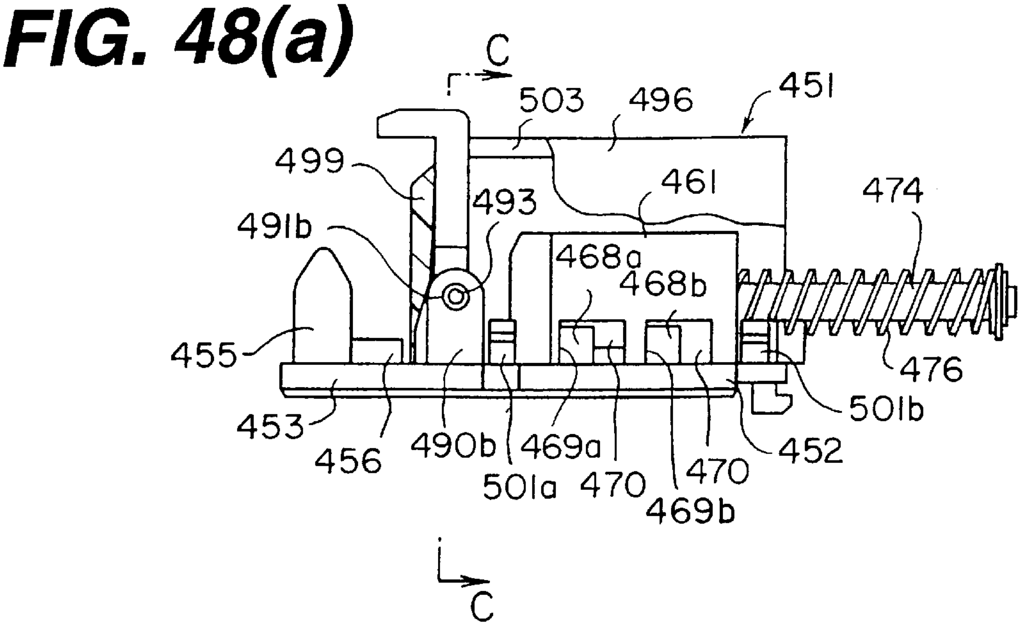
Figure 48B:
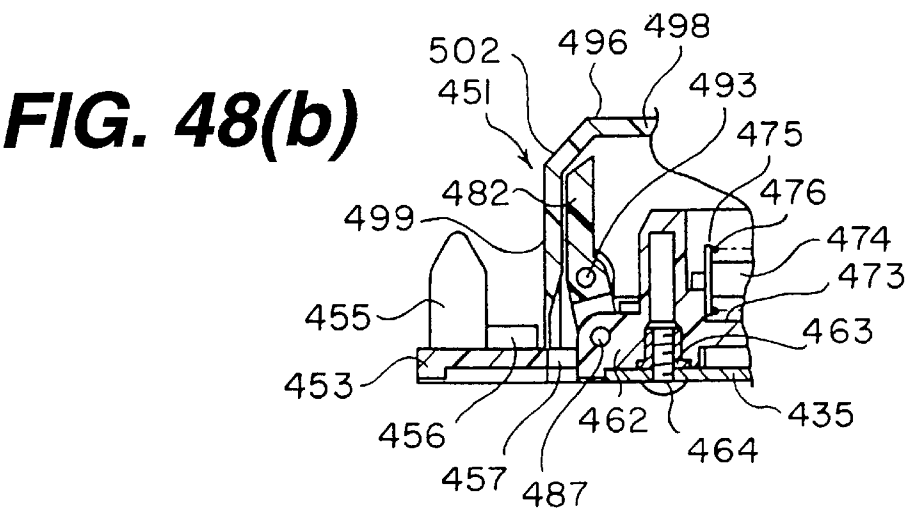
Figure 48C:
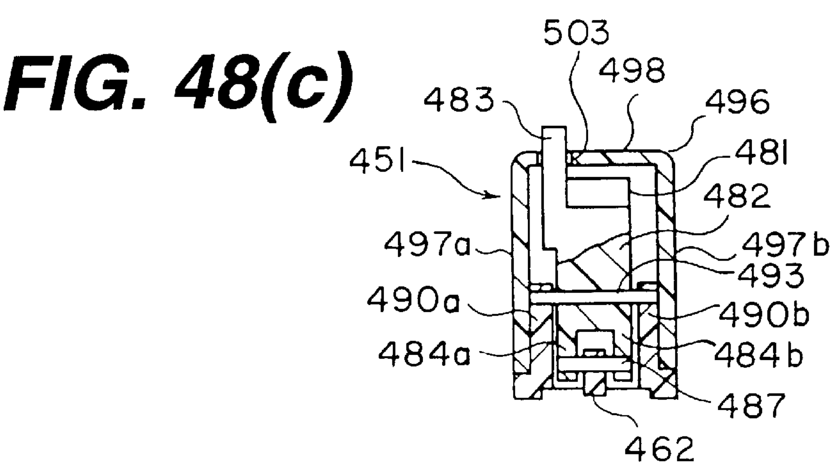

As shown in FIGS. 47 and 48(*a*)–(*c*), the hook arm unit 451 has a base 452 made of a synthetic resin material. The base 452 has a flat, rectangular, plate-like shape. The base 452 is slidably located on the bracket 435 in the front-to-back direction. A receiving portion 453 is arranged on the front edge portion of the base 435. The receiving portion 453 is exposed on the mounting surface 381. In this case, as shown in FIG. 40, guide recesses 454 are formed on the left and right end portions of the mounting surface 381. The receiving portions 453 are slidably engaged on the guide recesses 454. The upper surfaces of the receiving portions 453 are continuous with the upper surfaces of the left and right end portions of the mounting surface 381.

An engaging projection 455 and an engaging wall 456 are arranged on the upper surface of the receiving portions 453. The engaging projections 455 detachably engage the engaging holes 262*a* and 262*b* of computer 1, respectively. The engaging walls 456 detachably engage the engaging slits 263*a* and 263*b* of the computer 1, respectively. Therefore, the computer 1 is easily positioned on the mounting surface 381. As shown in FIGS. 47 and 48, a through hole 457 formed on the front portion of the base 452 is continuous with the receiving portion 453.

As shown in FIG. 47, a holder 461 is mounted on the upper surface of the base 452. The holder 461 is made of a synthetic resin material. The holder 461 is located behind the engaging projection 415 and the engaging wall 456. The holder 461 has a mounting portion 462 protruding from the front surface of the holder 462. As shown in FIG. 48(*b*), the mounting portion 462 of the holder 461 is inserted in the through hole 457, and attached to the upper surface of the bracket portion 435. The mounting portion 462 has a screw hole 463 in the under surface there of. A screw 464 is screwed into the screw hole 463 via the bracket portion 435.

With this structure, the base 452 is fixed to the bracket portion 435 of the slide plate 430 via the screw 464. The base 452 is slidably arranged to the front-to-back direction between the base 452 and the bracket portion 435. In this embodiment, the base 452 and the holder 461 are slidably supported to the bracket portion 435.

As shown in FIGS. 47 and 48(*a*), a pair of left and right projecting portions 468*a* and 468*b* are formed on the left and right end of the base 452, respectively. The projecting portions 468*a* and 468*b* are arranged to be spaced apart from each other in the front-to-back direction. A pair of left and right recesses 469*a* and 469*b* are formed on the left and right side surfaces of the holder 461, respectively. The recesses 469*a* and 469*b* are arranged to be spaced apart from each other on the front-to-back direction. The size of the front-to-back direction he of the recesses 469*a*, 469*b* are longer than that of the project portions 468*a* and 468*b*. Therefore, as shown in FIGS. 45, 46 and 48(*a*), a space 470 is formed along the front-to-back direction between the project portions 468*a* and 468*b* and the recesses 469*a* and 469*b*. The base 452 is slidable with respect to the holder 160 between the space 470.

As shown in FIG. 44, the holder 461 is located forward of the spring receiving portion 400 of the frame 391. As shown FIG. 7, the holder 461 has a rod insert port 473 which open on the rear surface opposite to the spring receiving portion 400. A guide rod 474 is arranged on between the holder 461 and spring receiving portion 400.

As shown in FIG. 48(*b*), the front end of the guide lod 474 is inserted into the rod insert port 473. A spring receiver 475 is arranged on the front end of the guide rod 474. The spring receiver 475 is supported to the front end of the rod insert port 473.

The end portion of the guide rod 474 is engaged to the cut portion 400*a* of the spring receiving portion 400. The guide rod 474 is slidable in the front-to-back direction. A coil spring 476 for releasing, is arranged on the circumferential surface of the guide rod 474. The coil spring 476 provides pressure between the spring receiver 475 and the receiving portion 400. The coil spring 476 biases the holder 461 forward to the external expansion unit 350.

According to the above arrangement, the slide plate 430 with the holder screwed there to is forward biased to the external expansion unit 350 by the coil spring 476. The base 452 and the holder 461 are slidable between a first position wherein the first expansion connector 49 engages the second expansion connector 410, when the slide plate 430 slides in the backward direction and second position in which engagement between the first and second expansion connectors 49 and 410 is released, when the slide plate 430 slides to the forward direction, via the operation lever 442.

As shown in FIG. 47, a hook arm 481 is supported on the mounting portion 462 of the holder 461. The hook arm 481 is made of a synthetic resin material. The hook arm 481 includes a plate-like body 482 and a hook portion 483 is continuous with the body 483. A pair of leg portions 484*a* and 484*b* are formed on the under portion of the body 482. The mounting portion 462 is arranged between the leg portions 484*a* and 484*b*. A pair of first pivot holes 485*a* and 485*b* open on the leg portions 484*a* and 484*b*, respectively. A second pivot hole 486 opens on the mounting portion 462. The second hole 486 is continuous with the first pivot holes 484*a* and 48*b*. A first pivot pin 487 is inserted in the first and second pivot holes 484*a*, 484*b* and 486. The hook arm 481 is rotatably supported to the holder 461 via the first pin 487.

As shown in FIG. 47, a pair of support walls 490*a* and 490*b* are formed on the upper surface of the base 452. The support walls 490*a* and 490*b* extending to the upward direction from the upper surface of the base 452. The support walls 490*a* and 490*b* is located on the left and right side positions of the through hole 457. The mounting portion 462 and the leg portions 484*a* and 484*b* are located in the support walls 490*a* and 490*b*.

With this structure, as shown in FIG. 48(*c*), the support walls 490*a* and 490*b* are located on the left and right side portions of the first pivot pin 487. The first pivot pin 487 is supported to the support walls 490*a* and 490*b*. Accordingly, the number of components of the computer 1 can be decreased, and the shape of the first pivot pin 487 can be simplified.

The upper edge portion of the support walls 490*a* and 490*b* extend above the mounting portion 462 and the leg portions 484*a* and 484*b*. A pair of third pivot holes 491*a* and 491*b* open to the upper edge portion of the support walls 490*a* and 490*b*, respectively. A fourth pivot hole 492 opens on the body 482 of the hook arm 481, and is continuous with the third pivot holes 491*a* and 491*b*. A second pivot pin 493 is inserted in the third and fourth holes 491*a*, 491*b* and 492. The second pivot pin 493 is rotatably inserted in the fourth pivot hole 492 above the first pivot pin 487. With this structure, the hook arm 481 is rotatably supported on base 452 in the front-to-back direction.

According to the above arrangement, the hook arm 481 is rotatable supported on the base 452 and the holder 461. The pivotal portion between the hook arm 481 and the base 452 is located above the pivotal portion between the hook arm 481 and the holder 461.

The hook portion 483 includes an arm portion 483*a* which extends upward from the body 482 and an engaging claw 483*b* which extends forward from the arm portion 483*a*. The engaging claw 483*b* protrudes forward of the front surface of the body 482. The engaging claw 483*b* is detachably engaged to the engaging recesses 265*a* and 265*b* of the rear surface 14 of the computer 1.

As shown in FIG. 44, the base 452 is covered with a cover 496 which is made of a synthetic resin material. The rear surface and the under surface of the cover 496 are opened. The cover 496 covers the holder 461 and the hook arm 481. As shown in FIG. 49, the cover 496 includes a pair of left and right side walls 497*a*, 497*b*, an upper wall 498 which is continuous with the upper edge of the side walls 497*a*, 497*b* and a front wall 499 which is continuous with the front edge of the side walls 497*a*, 497*b* and the upper wall 498.

A pair of engaging holes 500*a* and 500*b* are opened on the side walls 497*a* and 497*b*, respectively. The engaging holes 500*a* and 500*b* are arranged to be spaced apart from each other in the front-to-back direction. A pair of engaging pieces 501*a* and 501*b* corresponding to the engaging holes 500*a* and 500*b* protrude from the upper surface of the base 452, respectively. The engaging pieces 501*a* and 501*b* are detachably engaged to the engaging holes 500*a* and 500*b*, respectively. With this engagement, the cover 496 is mounted on the base 462.

As shown in FIG. 48(*c*), when the cover 496 is mounted on the base 462, the inner surfaces of the side walls 497*a* and 497*b* are adjacent to the left and right side of the support walls 490*a* and 490*b*. With this structure, the side walls 497*a* and 497*b* are located on the left and right position of the second pivot pin 493, and support the left and right portion of the second pin 493. Accordingly, the number of components of the computer 1 can be decreased, and the shape of the second pivot pin 493 can be simplified.

As shown in FIG. 48(*b*), the front wall 499 is located behind the engaging projection 455 and engaging wall 456. An inclined wall 502 is arranged at a corner portion defined by the front wall 499 and the upper wall 498. The inclined wall 502 is inclined toward the operator side. A slit-like port 503 is formed between the inclined wall 502 and front portion of the upper surface 498. The hook portion 483 of the hook arm 481 passes from the inside of the cover 496 via the port 503.

As shown in FIG. 40, while the hook arm units 451 are located in the first position, the hook arm units 451 contained in the cover 496 are almost stored inside of the stopper portions 382 and 383 of the upper housing 353, respectively. The left and right stopper surfaces 384 of the stopper portions 382 and 383 have openings 504, respectively. The hook arm units 451 are slidably moved via the openings 504, respectively. When the hook arm units 451 are moved to the first position, the front surfaces of the front walls 499 of the cover 499 are continuous with the stopper surfaces 384 on the same plane, respectively. For this reason, when the computer 1 is mounted on the mounting surface 381 of the external expansion unit 350, the front surface of the front wall 499 is forms a guide surface 505 which contacts to the rear surface 14 of the computer 1, respectively. While the hook arm unit 451 moves to the second position, the first pivot pin 487 which is pivotally supported to the hook arm 481 and the holder 461 is located in the forward of the second pivot pin 493 which is pivotally supported to the hook arm 481 and the holder 461. For this reason, the under end of the hook arm 481 is pushed forward and held in the release position wherein the hook portion 483 tilts backward.

As shown in FIG. 50, when the operation lever 442 is rotated toward the coupling position, the hook arm unit 451 is moved to the first position, and the base 452, the holder 461 and the slide plate 430 are moved toward the back. In this case, when the engaging projections 45 of the base 452 are engaged to the engaging hole 262*a* and 262*b*, a weight of the computer 1 is transferred to the receiving portions 453. The base 452 pressed against the computer 1. The base 452 is slidable in the space 470 with respect to the holder 461 which is fixed to the bracket 435. Accordingly, as shown in FIG. 45, only the holder 461 is moved backward with the slide plate 430. With this movement, the first pivot pin 487 is located below the second pivot pin 493. For this reason, the under edge portion of the hook arm 481 is pulled backward.

Accordingly, the hook arm 481 is rotated into the engaging position wherein it is erect, at the second pivot pin 493. The body 482 attaches to the front wall 499 of the cover 496. The hook portion 483 is engaged to the engaging recesses 265*a* and 265*b* of the rear surface 14 of the computer 1. With this engagement, the rear end portion of the computer 1 is clamped between the mounting surface 381 and the hook portion 483. Therefore the computer 1 and the mounting surface 381 are positioned.

As shown in FIG. 51, when the operation lever 442 is rotated above more than the rotate position, the recesses 469*a* and 469*b* of the holder 461 hook the project portions 468*a* and 468*b*, respectively. The holder 461 is moved with the base 452. Therefore, the hook arm 481 is still held in the engaging posture, and slid toward the first position.

In addition, as shown in FIG. 41 and 49, conductive engaging pieces 510*a* and 510*b* are arranged on the upper surface of the front edge of the third support pieces 399*a* and 399*b* of the frame 391, respectively. The conductive engaging pieces 510*a* and 510*b* are screwed to the bottom wall 355*a* of the lower housing 352 with the third support pieces 99*a* and 99*b*. The conductive engaging pieces 510*a* and 510*b* are electrically connected to the frame 391.

The engaging pieces 510*a* and 510*b* each have a contact portion 511. The contact portions 511 extend upward. The contact portions 511 are exposed on the mounting surface 381 via the front end of the mounting surface 381. The contact portions 511 project forward from the front end of the mounting surface 381. When the computer 1 which is mounted on the mounting surface 381 is moved toward the connector mounting surface 406, the contact portions 511 are inserted in the engaging ports 261*a* and 261*b* and electrically connected to the metal terminals 260, respectively.

The procedure for connecting the computer 1 to the external expansion unit 350 having the above arrangement will be described next.

Prior to connection of the computer 1, the operation lever 442 of the external expansion unit 350 is kept pivoted to the release position. With this pivot operation, since the left and right hook arm units 451 are moved to the second position, the front half portion of the cover 496 is projected forward from the opening 403 of the stopper surface 384 with the receiving portion 453. At this time, as shown in FIG. 44, hook arm 481 is pivoted to the release position about the second pivot pin 493, and located rearward of the guide surface 505 of the cover 496. Therefore, when the computer 1 is mounted on the mounting surface 381, the hook arms 481 are not hooked on the computer 1, and can be prevented to attaching to the computer 1.

Next, as-shown in FIG. 49, the rear end of the computer 1 mounts on the mounting surface 381 and the upper surfaces of the receiving portions 453 of the hook arm units 451. In this case, the engaging holes 262*a* and 262*b* of the bottom surface 3*a* of the computer 1 engage the engaging projections 455 of the receiving portions 453, and the engaging walls 456 engage the engaging slits 263*a* and 263*b* of the bottom surface 3*a*. In this case, the front surface 499 of the cover 496 projects on the mounting surface 381, and has the guide surfaces 505 which are attached to the rear surface 14 of the computer 1. Therefore, the engaging holes 262*a* and 262*b* and the engaging projections 455, and the engaging slits 263 and 263*b* and the engaging walls 456 can be easily positioned by the rear surface 14 of the computer 1 mounted on the mounting surface 381 along the guide surfaces 505. With this engaging operation, the computer 1 can be positioned in the front-to-back and the left and right direction with respect to the mounting surface 381 and the connector mounting surface 406.

As shown in FIG. 50, when the position of the computer 1 on the mounting surface 381 is determined, the operation lever 442 is rotated downward to the coupling position. With this rotating operation, the hook arm units 451 are slid toward the first position. In this case, since computer 1 is mounted on the receiving portions 453 of the bases 452 of the hook arm units 451, the computer 1 rests on the receiving portions 453. Therefore, the bases 452 are held in a position which restrain the sliding movement of the bases 452 by the computer 1. Accordingly, in a first step in which the hook arm units 451 start the slide movement, only the holders 461 are slid backward with the slide plate 430, and the under edges of the hook arms 481 are pulled backward. As shown in FIG. 45, since the hook arms 481 are pivoted to approximately the erect position, and the hook portions 483 are moved forward, the engaging portions 483*a* and 483*b* of the hook portions 483 are engaged to the engaging recesses 265*a* and 265*b* of the rear surface 14 of the computer 1, respectively.

With this engaging operation, the rear end of the computer 1 is prevented from separating from the mounting surface 381 by clamping between the mounting surface 381 and the hook portions 483. Accordingly, the computer 1 is positioned in the vertical direction.

Figure 34:
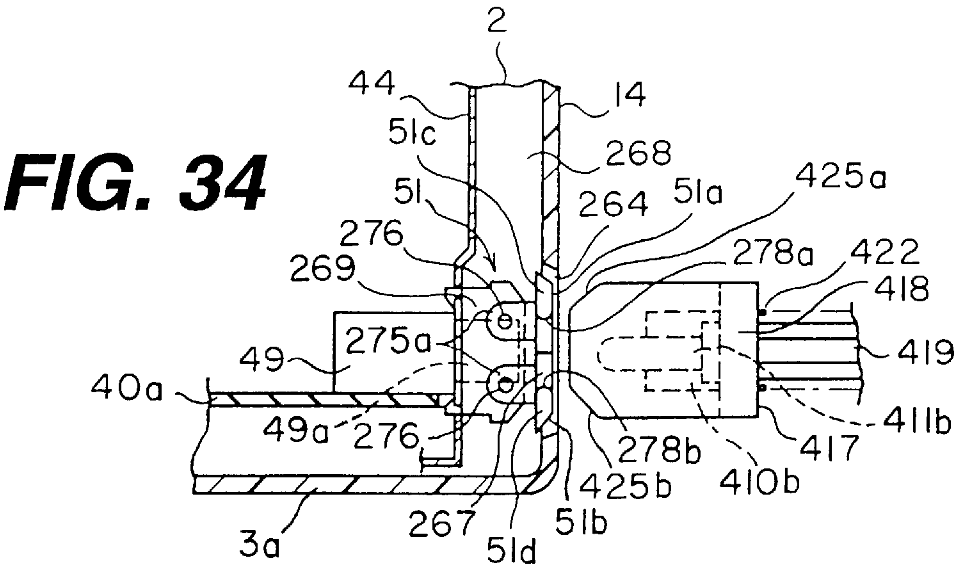
FIG. 34 is an exploded view showing the computer in a state wherein the cover opening member is adjacent to the cover unit.
Figure 35:
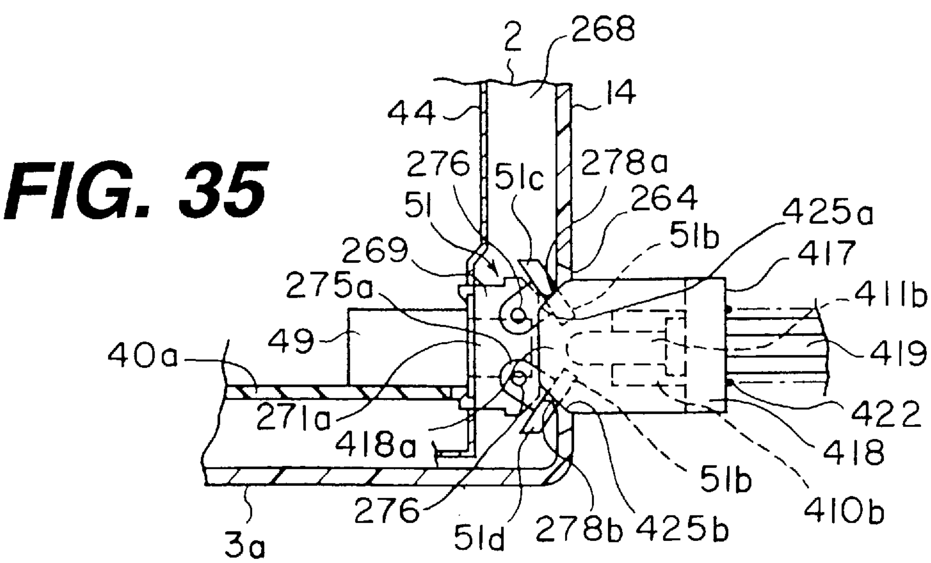
FIG. 35 is an exploded view showing the computer in a state wherein a pushing piece of the cover opening member is inserted in an opening guide.

Furthermore, when the operation lever 442 rotates to the downward direction from the position shown in FIG. 50, the recess 469*a* and 469*b* of the holders 461 are hooked to the project portions 468*a* and 468*b*, respectively. From this time, the holders 461 are integrally moved with the bases 452. With this movement, the computer 1 is pulled toward the connector mounting surface 40. In this case, the cover opening member 417 is arranged on the connector mounting surface 406. The cover opening member 417 is arranged adjacent to the second expansion connector 410. As shown in FIGS. 34 and 53, the pushing portion 418 of the cover opening member 417 projects further forward of the connector mounting surface 406 than the second expansion connector 410. The top portion 418*a* of the pushing member 418 face to the insert port 267 of the connector cover unit 51 which covers the first expansion connector 49. Therefore, when the computer 1 is pulled toward of the connector mounting surface 406, first, the top portion 8*a* the cover opening member 418 is inserted in the insert port 267. In this case, the upper and lower cam surfaces 425*a*, 425*b* which are continuous with the top portion 418*a* are attached to the guide surfaces 278*a* and 278*b* of the guide portions 51*c* and 51*d*. The upper and lower covers 51*a* and 51*b* are rotated above and below the frame 269.

The pushing piece 418 is inserted between the guide surfaces 278*a* and 278*b* of the opening guide 51*c* and 51*d* corresponding to the pull operation of the computer 1.

Figure 36:
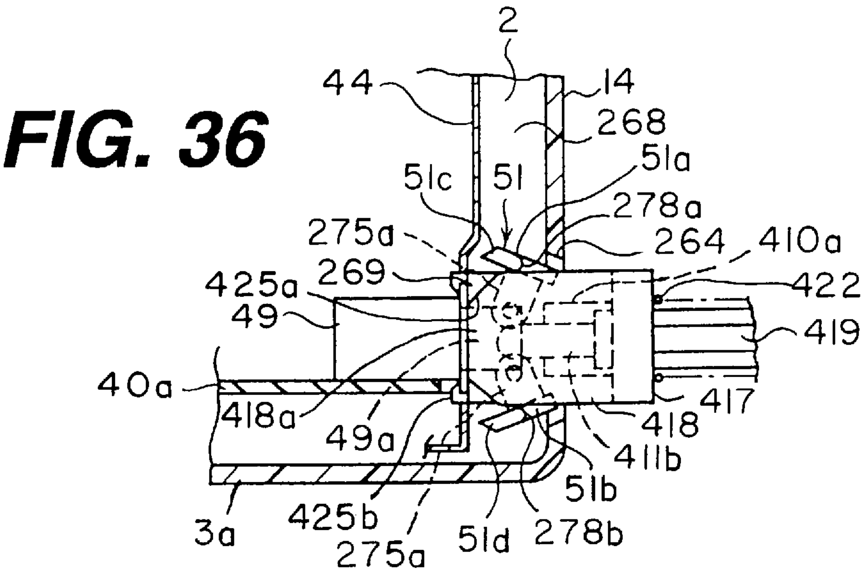
FIG. 36 is an exploded view showing the computer in a state wherein the cover unit is opened by the opening piece of the cover opening member.

As shown in FIG. 36, when the guide surface 278*a* and 278*b* are moved over the cam surfaces 425*a* and 425*b*, the covers 51*a* and 51*b* are completely opened, and are located in the upper and lower side of the frame 269.

As a result, as shown in FIG. 3, the connector port 264 is exposed, and the first expansion connector 49 is exposed in the rear surface 14 via the connector port 264.

At this time, as shown in FIG. 36, the connector body 49*a* of the first expansion connector 49 is separated from the connector 410a of the second expansion connector 410. The positioning pins 411a and 411b are fitted to the positioning holes 266a and 266b, respectively, before the connection of the connector body 49a and the connector body 410a. With this fitting operation, the first and second expansion connectors 49 and 410 are finally positioned. After the covers 51a and 51b are fully opened, furthermore, the pushing piece 418 is inserted between the opening guides 51c and 51d as corresponding to pulling of the computer 1. When the positioning pins 411a and 411b are fitted to the positioning holes 266a and 266b, the top portion 418a of the pushing piece 418 is attached to the connector panel 44.

In this case, as shown in FIG. 52, the cover opening member 417 is slidably supported on the connector cover 405 of the external expansion unit 350, and is drawn in the connector mounting surface 406.

Figure 37:
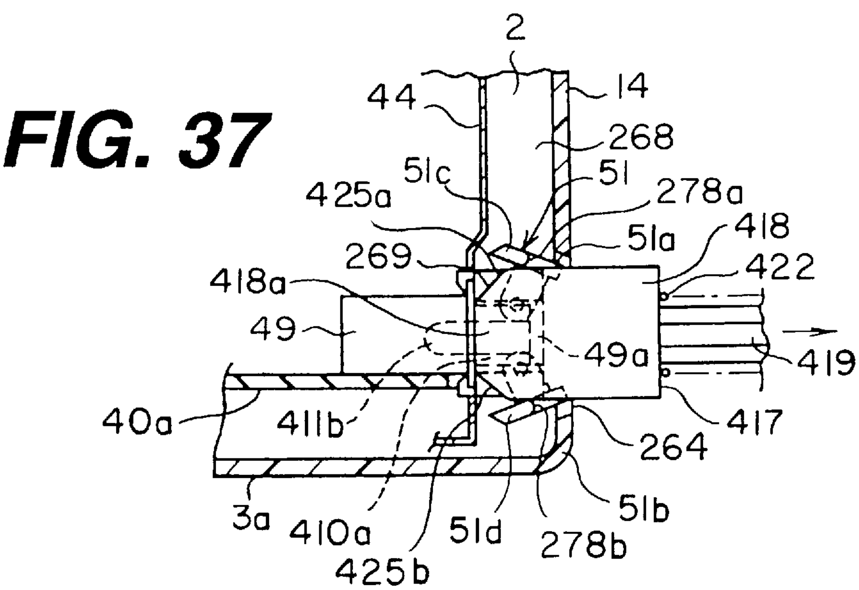
FIG. 37 is an exploded view showing the computer in a state wherein the first expansion connector is connected to a second expansion connector.

Therefore, as shown in FIGS. 36 and 37, after the top portion 418a of the pushing piece 418 is attached to the connector panel 44, against the spring 122, the pushing piece 418 is pushed into the connector cover 405 by the computer 1. As a result, the computer 1 is smoothly pulled.

As shown in FIGS. 40 and 51, when the hook arm units 451 are slid to the first position, the covers 496 are stored inside of the stopper portions 382 and 283, and the guide surfaces 505 are communicated with the connector mounting surface 406 and the stopper surfaces 384 at the same plane, respectively.

As shown in FIG. 37, in this case, the first expansion connector 49 is electrically connected to the second expansion connector 410, and the computer 1 is electrically connected to the external expansion unit 350 via the first and second expansion connector 49 and 410.

As a result, the ports 360, 361 and 364 and the connectors 358, 359, 362 and 363 are electrically connected to the first and second expansion connectors 49 and 410.

Accordingly, the computer 1 can be electrically connected to a plurality of peripheral devices such as a HDD, an external printer, an external CRT display and an external keyboard at the same time.

As shown in FIG. 50, when the hook arm units 451 are slid to the first position, and when the computer 1 is completely connected to the external expansion unit 350, the engaging engaging pieces 510a and 510b are engaged to the engaging ports 261a and 261b of the bottom surface 2d of the computer 1, respectively. The top portions 511 of the engaging pieces 510a and 510b are electrically attached to the metal terminals 260, respectively, and the computer 1 is grounded on the external expansion unit 350.

To release the external expansion unit 350 the computer 1, the operation lever 442 is rotated from the coupling position to the release position. With this rotating operation, the slide plate 430 is slid forward and, the hook arm units 451 are pushed to the second position. With this pushing operation, the computer 1 is moved toward separation from the connector mounting surface 406, and the connection between the first and second expansion connectors 49 and 410 is released.

When the slide plate 430 is pushed forward, since the slide plate 430 is always biased forward by the springs 476 of the hook arm units 451, the operation lever 442 receives the pushing force of the spring 476. Therefore, when the connection between the first second expansion connectors 49 and 410 is released, the operation lever 442 can be easily rotated with minimum power.

After the release operation for releasing the connection between the first and second expansion connectors 49 and 410, the pushing piece 418 of the cover opening member 417 is drawn from between the opening guide portions 51c and 51d. Therefore, the covers 51a and 51b are compulsory rotated toward the closed position by the spring 277a and 277b, and the covers 51a and 51b communicate with each other in the same plane.

Accordingly, the connector port 264 of the computer 1 is closed, and the first expansion connector 49 is covered with the covers 51a and 51b.

According to the above embodiment, when the computer 1 mounted on the mounting surface of the external expansion unit 350 is pulled toward the connector mounting surface 406, the hook arms 481 of the hook arm units 451 are hooked to the engaging recesses 265a and 265b of the rear surface 14 of the computer 1, respectively, before the first expansion connector 49 of the computer 1 is connected to the second expansion connector 410 of the external expansion unit 350.

Therefore, the rear end portion of the computer 1 is clamped between the mounting surface 381 and the hook arms 481, and positioned with respect to the connector mounting surface 406. When the first expansion connector 49 is connected to the second expansion connector 410, the rear end portion of the computer 1 is prevented from separation from the mounting surface 381. Accordingly, the first and second expansion connectors 49 and 410 can be certainly connected to each other. When the computer 1 is mounted on the mounting surface 381 in a state where an object such as a pencil, a pen and an eraser is on the mounting surface 381, if the computer 1 is pulled toward connector mounting surface 406 via the hook arm units 451, the hook arms 481 are not hooked to the engaging recesses 265a and 265b. Therefore, since the engaging portions 483a and 483b bump against the rear surface 14 of the computer 1, the computer 1 cannot be pulled toward the connector mounting surface 381. The operator can recognize an obstruction between the computer 1 and the mounting surface 14.

In this time, since the front walls 499 of the cover 496 of the hook arm units 481 are in a state where projected from the connector mounting surface 406, the guide surfaces 505 and the connector mounting surface 406 are not communicated with each other at the same plane. For this reason, the operator can recognize the accident between the computer 1 and the connector mounting surface 381.

Accordingly, the computer 1 is not subjected to a forced pull operation, and this prevents break age a poor connection of the first and second expansion connectors 49 and 410.

With the above structure, since the hook arm units 451 which pull toward the connector mounting surface 406 to the computer 1 are located on the left and right side positions of the second expansion connector 410, when the computer 1 is to be pulled, the computer 1 is not rotated laterally, and the rear surface 14 of the computer 1 can be kept parallel to the connector mounting surface 406.

Accordingly, the first and second expansion connectors 49 and 410 are parallel and confront each other, and can be certainly connected. Therefore, no excessive force is applied to the connecting portion between the first and second expansion connectors 49 and 410.

Furthermore, since the rear surface 14 of the computer 1 has engaging recesses 265a and 265b which engage the hook portions. 483 of the hook arms 481, an engaging state between the first and second expansion connectors 49 and 410 is stable. For this reason, the hook portions 483 of the hook arms 481 can cooperate with the mounting surface 381, and the first and second expansion connectors 49 and 410 can be certainly positioned.

As shown in FIG. 51, when the computer 1 is completely set to the external expansion unit 350, the engaging pieces 51*a* and 51*b* of the mounting surface 381 are inserted in the engaging ports 261*a* and 261*b* of the bottom surface 3*a* of the computer 1, and attached to the metal terminals 260 of the engaging ports 261*a* and 261*b*, respectively. Since the engaging pieces 510*a* and 510*b* are screwed the metal frame 391 of the external expansion unit 350, the computer 1 is grounded to the external expansion unit 250 via the engaging pieces 510*a* and 510*b* and the metal terminals 260 for grounding. Therefore, when the computer 1 is to be connected to the external expansion unit 350 and used, no special lead lines and connectors for grounding the computer 1 are required.

According to the above arrangement, when peripheral devices such as an external keyboard and a printer are to be disconnected from the computer 1, the operation lever 442 may be rotated to the release position break the connection between the first and second expansion connectors 49 and 410. That is, a plurality of peripheral devices need not be disconnected from the computer 1 one by one, and this disconnecting operation can be quickly performed within a short period of time. Therefore, this arrangement, is suitable for a computer 1 for which portability attaching important, like the portable computer 1.

In the above embodiment, the computer has engaging recesses on the surface thereof, and the hook portions of the hook arms are engaged to the engaging recesses. However, the hook portions of hook arms may be directly hooked on the upper surface of the rear end of the computer.

In the above embodiment, the external expansion unit serves as an attachment for connecting peripheral devices to the computer. However, the present invention is not limited to this. For example, a floppy disk drive or a CD-ROM may be housed in the housing of an external expansion unit so that the external expansion unit itself may be used as a peripheral device.

As shown in FIGS. 54 to 58, the external expansion unit 350 as a second embodiment is described. Since the external expansion unit 350 as second embodiment and the external expansion unit 350 as the first embodiment have the same structure remove the hook arm units 451 and A hook arm units 600. The hook arm units 600 have the same structure and size, one hook arm unit 600 will be described as representative.

The hook arm unit 600 includes the base 452, the receiving portion 453 and the cover 496. An engaging projection 605 is arranged on the upper surface of the receiving portion 453. The projection 605 is formed in a square pillar. The projection 605 is engaged to the engaging hole 602*a* of the computer 1.

Figure 57:
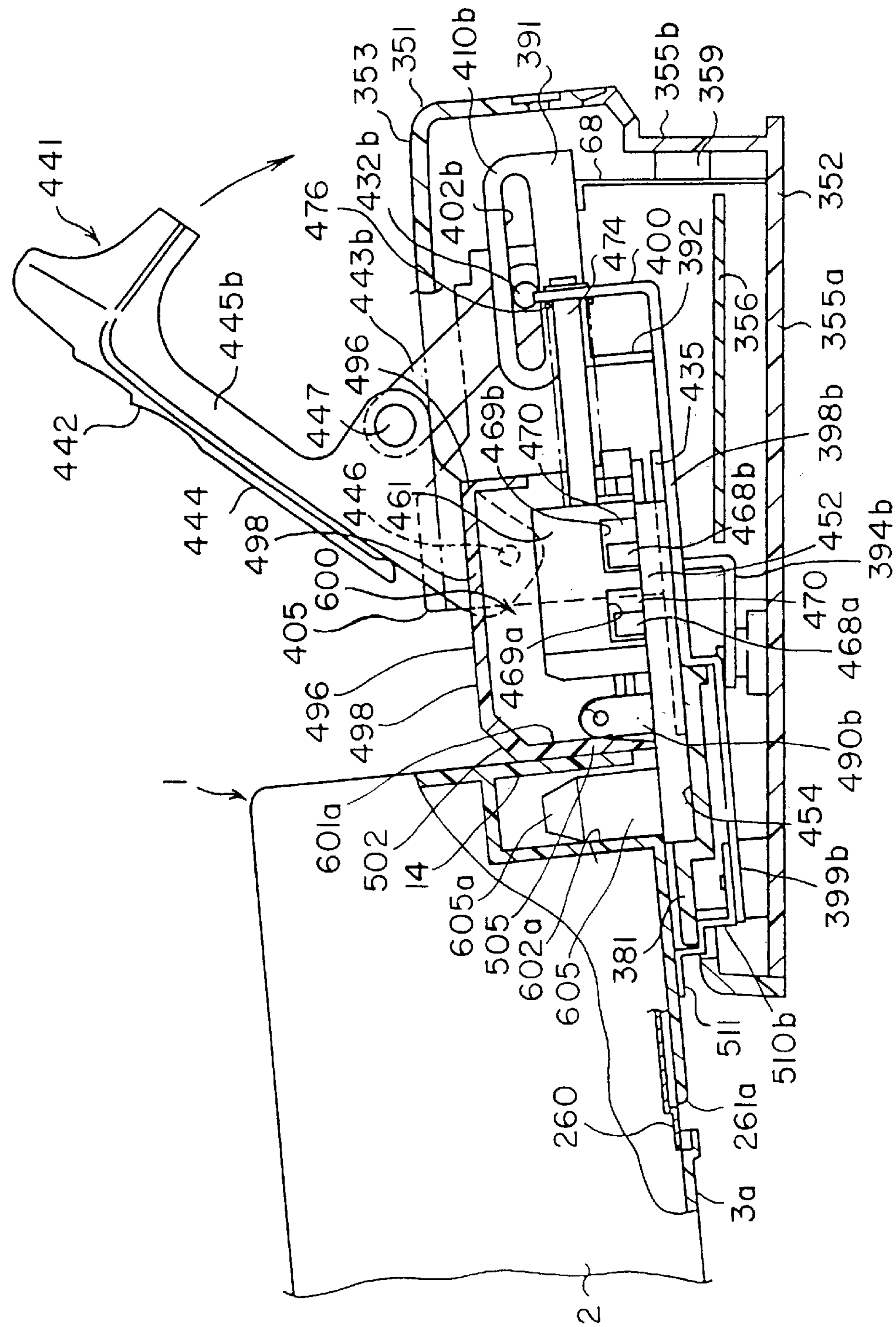
FIG. 57 is an exploded view showing a state wherein the computer is mounted on a mounting surface of the external expansion unit.
Figure 58:
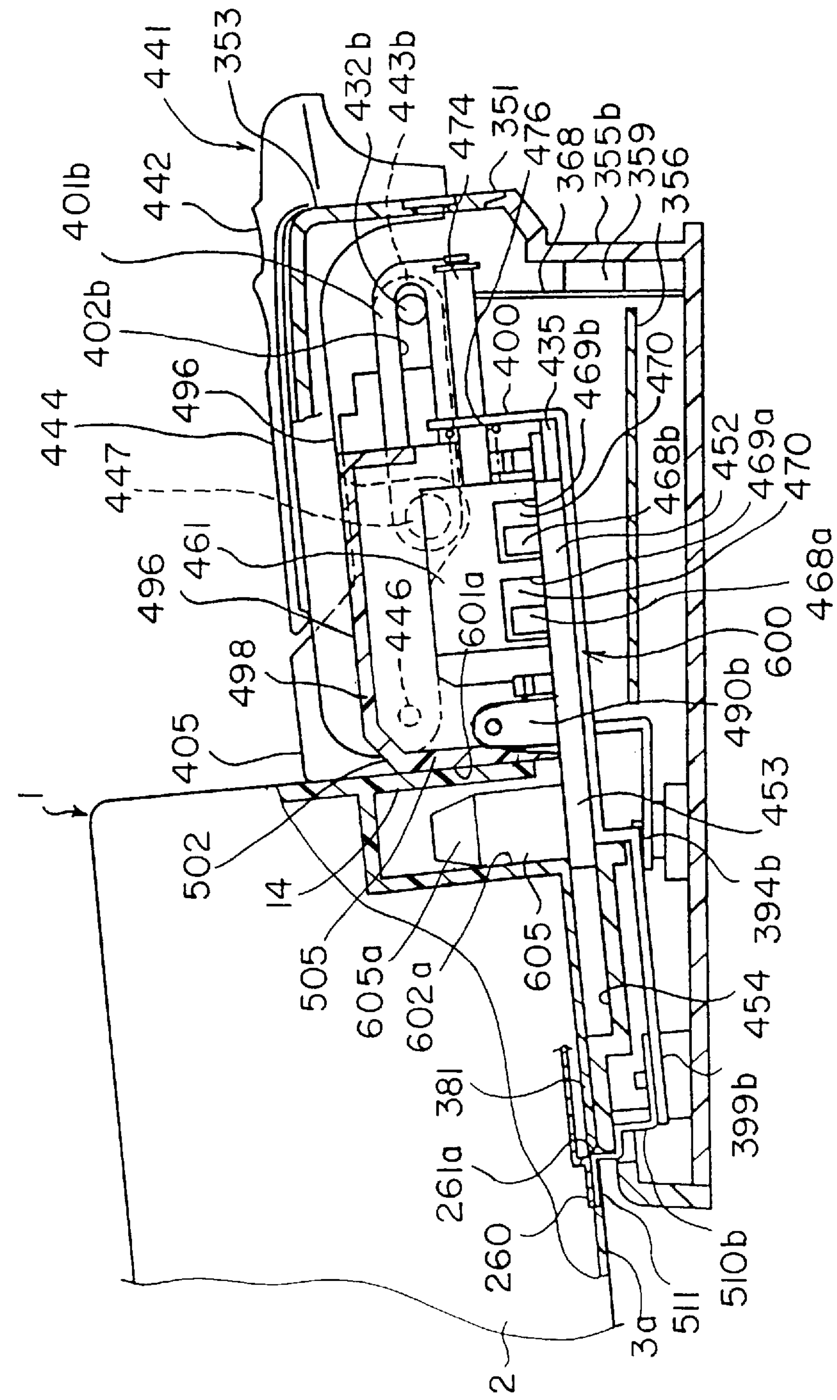
FIG. 58 is an exploded view showing a state wherein the computer is connected to the external expansion unit.

As shown in FIGS. 57 and 58, When the operation lever 442 is rotated toward the release position, the hook arm unit 600 is moved to forward. When the computer 1 is mounted on the mounting surface 381, the projection 605 is engaged to the engaging hole 602*a*. When the operation lever 442 is rotated toward the coupling position, the hook arm unit 600 is pulled to backward. Therefore, the first expansion connector 49 is connected to the second expansion connector 410.

Figure 55:
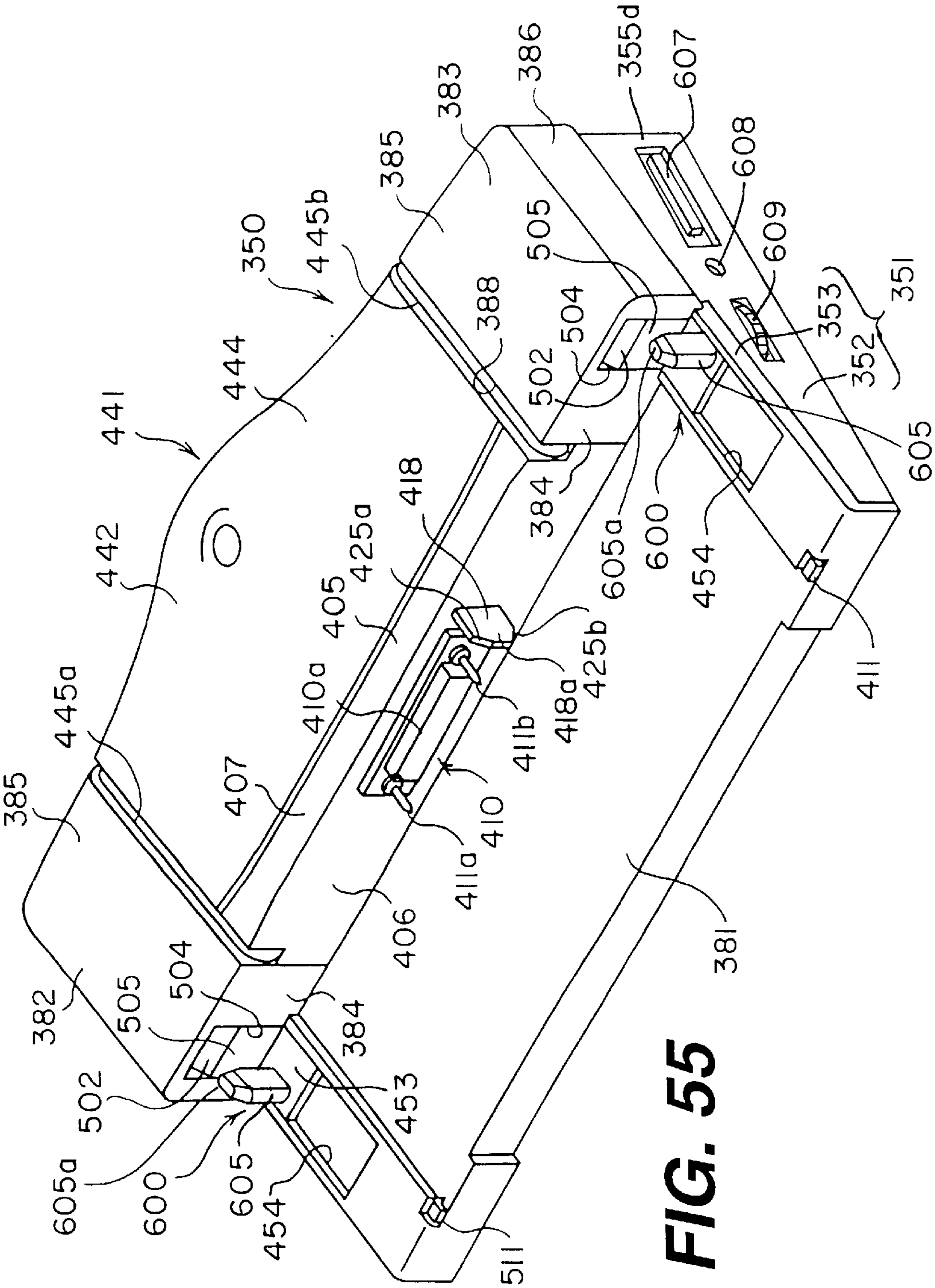
FIG. 55 is a perspective view showing the external expansion unit in a state wherein a hook arm unit is slide to a first position.
Figure 56:
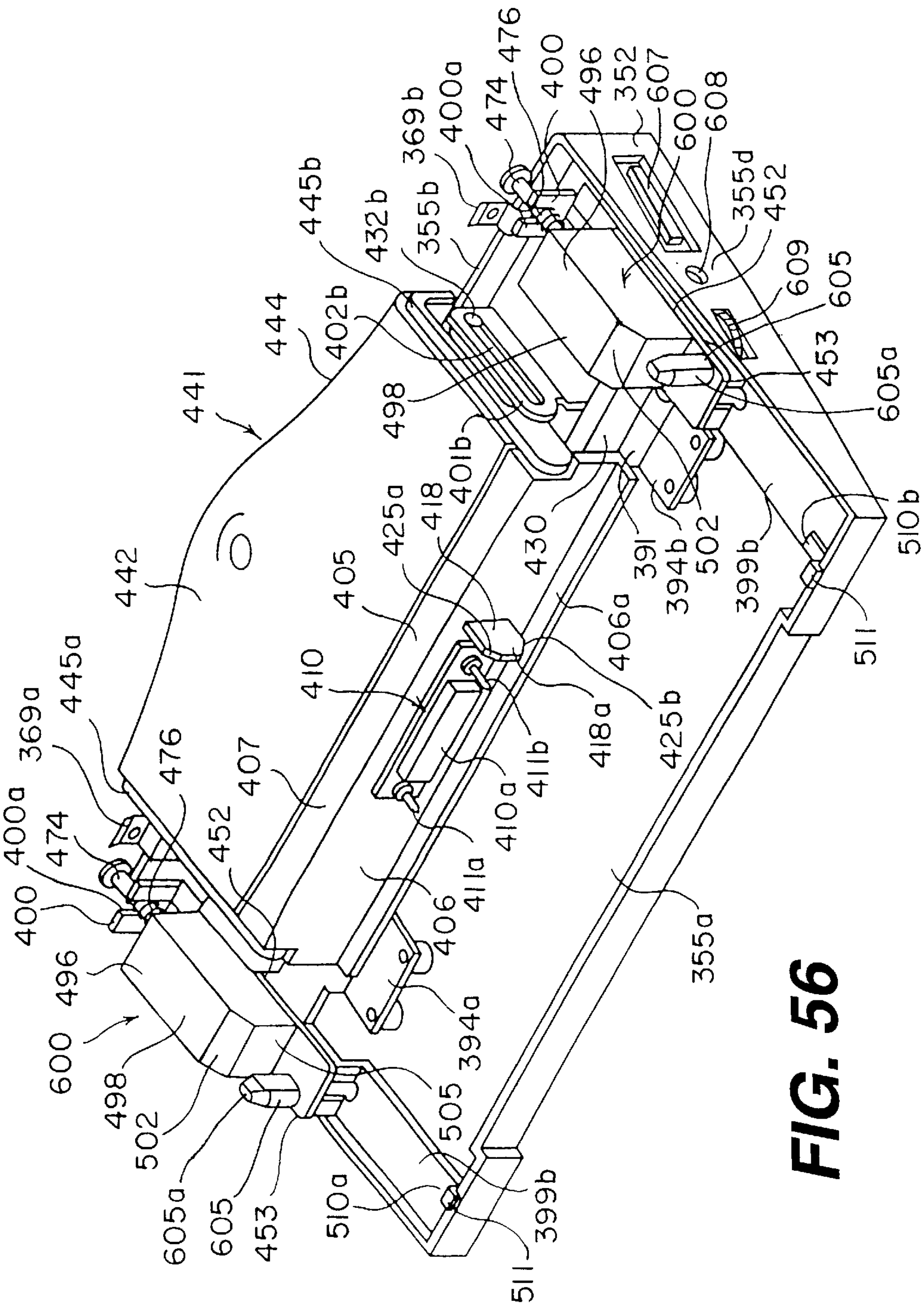
FIG. 56 is a perspective view showing the external expansion unit in a state wherein an upper housing is removed.

As shown in FIG. 55, the external expansion unit 350 has a connector 607 to connect a optical disk drive (ODD) such as a CD-ROM drive, a plug 608 to connect an external speaker for the computer 1 or ODD and a dial 609 to regulate a volume of the speaker.

In this structure, the speaker can be easily connected to the computer 1 and can regulate the volume.

Additional advantages and modifications will readily occur to those skilled in the art. The invention in its broader aspects is therefore not limited to the specific details, representative apparatus and method, and illustrative examples shown and described.

Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. A portable electronic apparatus comprising:

a lower housing including a front portion and a rear portion;

a rear upper housing detachably fixed on the rear portion, and including a keyboard mounting portion having a rear receiving portion and a front receiving portion;

a keyboard detachably mounted on the keyboard mounting portion, the keyboard including a plurality of keys, a rear engaging piece engaged to the rear receiving portion and a front engaging piece engaged to the front receiving portion; and a front upper housing detachably fixed to the front portion, and including a retaining portion cooperating with the front receiving portion for retaining the front engaging piece.

2. A portable electronic apparatus according to claim 1, wherein the rear engaging portion of the keyboard mounting portion has an opening, and the rear engaging piece is inserted in the opening.

3. A portable electronic apparatus according to claim 2, wherein the front engaging portion of the keyboard mounting portion has a recess, the front engaging piece is engaged to the recess, and the attached portion has a clamping wall extending downward, the clamping wall having a top portion, the top portion is cooperated to the recess for clamping the engaging piece.

4. A portable electronic apparatus comprising:

a lower housing including a front portion and a rear portion;

a rear upper housing detachably fixed on the rear portion, and including a keyboard mounting portion having a rear receiving portion;

a keyboard detachably mounted on the keyboard mounting portion, the keyboard including a plurality of keys, a rear engaging piece engaged to the rear receiving portion and a front edge portion; and a front upper housing detachably fixed to the front portion, and including a retaining portion cooperating with the keyboard mounting portion for retaining the front edge portion.

5. A portable electronic apparatus according to claim 4, wherein the rear receiving portion has an opening and the rear engaging piece is inserted in the opening.

6. A portable electronic apparatus according to claim 5, wherein the keyboard mounting portion has a receiving recess, the front edge portion of the keyboard has a front engaging piece engaged to the receiving recess, the retaining portion cooperating with the receiving recess for clamping the engaging piece.

7. A portable electronic apparatus comprising:

a body including a lower housing, a printed circuit board disposed in the lower housing, and a first cover engaged to the lower housing for covering the printed circuit board, the first cover including a keyboard mounting portion having a receiving portion;

a keyboard unit detachably mounted on the keyboard mounting portion, and including a plurality of keys thereon, an engaging piece engaged to the receiving portion, and an edge portion; and a second cover detachably fixed to the body, and including a retaining portion cooperating with the keyboard mounting portion for retaining the edge portion;

wherein the keyboard unit is detachably fixed on the keyboard mounting portion without a screw.

* * * * *